US010093232B2

(12) United States Patent
Troutman et al.

(10) Patent No.: US 10,093,232 B2
(45) Date of Patent: Oct. 9, 2018

(54) TELEMATICS ROAD READY SYSTEM

(71) Applicant: Truck-Lite Co. LLC, Falconer, NY (US)

(72) Inventors: Scott Troutman, Falconer, NY (US); Roger Elmer, Russell, PA (US); Brett Jackson, Hendersonville, TN (US)

(73) Assignee: Truck-lite Co., LLC, Falconer, NY (US)

( * ) Notice: Subject to any disclaimer, the term of this patent is extended or adjusted under 35 U.S.C. 154(b) by 0 days.

(21) Appl. No.: 15/460,166

(22) Filed: Mar. 15, 2017

(65) Prior Publication Data

US 2018/0009377 A1 Jan. 11, 2018

Related U.S. Application Data

(63) Continuation-in-part of application No. 14/855,842, filed on Sep. 16, 2015.
(Continued)

(51) Int. Cl.
*B60Q 11/00* (2006.01)
*B60T 17/22* (2006.01)
(Continued)

(52) U.S. Cl.
CPC .......... *B60Q 11/005* (2013.01); *B60R 16/023* (2013.01); *B60T 17/221* (2013.01);
(Continued)

(58) Field of Classification Search
CPC .... B60Q 11/005; B60Q 11/007; B60Q 1/305; B60R 16/0315; B60R 1/12
USPC ............... 340/431, 641, 642, 458, 449, 501, 340/870.17, 636.18; 700/153, 205, 299; 73/204.19; 315/185 R, 119, 129, 117, 315/125, 294, 192, 310, 77, 121
See application file for complete search history.

(56) References Cited

U.S. PATENT DOCUMENTS 4,745,339 A 5/1988 Izawa et al.
5,142,278 A 8/1992 Moallemi et al.
(Continued)

FOREIGN PATENT DOCUMENTS

EP 1744602 A2 7/2007
EP 1830607 A1 9/2007
(Continued)

*Primary Examiner* — Hoi Lau
(74) *Attorney, Agent, or Firm* — The Bilicki Law Firm, PC

(57) ABSTRACT

A system for monitoring a trailer having a plurality of light emitting diode devices includes a master control unit attached to an outside surface of the trailer. The master control unit includes a solar panel, a GPS receiver module, a cellular data transceiver module for communicating with a central tracking computer via a cellular data network interfaced to the Internet, and a local wireless network master transceiver module in wireless communication with a plurality of wireless sensors and a light out detection system. A microcontroller is provided for controlling the local wireless network master transceiver module to periodically obtain sensor data from the wireless sensors and light out detection system, and for controlling the cellular data transceiver module to transmit the location and the sensor data to the central tracking computer for storage in the tracking database.

14 Claims, 85 Drawing Sheets

Related U.S. Application Data

(60) Provisional application No. 62/463,635, filed on Feb. 25, 2017.

(51) Int. Cl.
*B60R 16/023* (2006.01)
*H05B 37/03* (2006.01)
*G08B 13/08* (2006.01)

(52) U.S. Cl.
CPC ........ *H05B 37/03* (2013.01); *B60Y 2200/147* (2013.01); *G08B 13/08* (2013.01)

(56) References Cited

U.S. PATENT DOCUMENTS 5,157,376 A * 10/1992 Dietz .................. B60Q 11/007 307/10.8
6,084,870 A 7/2000 Wooten et al.
6,130,487 A 10/2000 Bertalan et al.
6,198,390 B1 3/2001 Schlager et al.
6,218,952 B1 * 4/2001 Borland ................ B60Q 1/305 340/641
6,278,936 B1 8/2001 Jones
6,292,724 B1 9/2001 Apsell et al.
6,295,449 B1 9/2001 Westerlage et al.
6,317,029 B1 11/2001 Fleeter
6,346,876 B1 2/2002 Flick
6,392,364 B1 5/2002 Yamamoto et al.
6,442,485 B2 8/2002 Evans
6,484,035 B2 11/2002 Allen, Jr.
6,490,512 B1 12/2002 Niggemann
6,611,686 B1 8/2003 Smith et al.
6,651,001 B2 11/2003 Apsell
6,674,288 B2 1/2004 Gumbel et al.
6,687,609 B2 2/2004 Hsiao et al.
6,735,150 B2 5/2004 Rothman
6,744,352 B2 6/2004 Lesesky et al.
6,788,195 B1 * 9/2004 Stegman ............. B60Q 11/005 307/10.8
6,804,602 B2 10/2004 Impson et al.
6,832,153 B2 12/2004 Thayer et al.
6,850,839 B1 2/2005 McGibney
6,858,986 B2 2/2005 Monk
6,907,253 B2 6/2005 Parisi
7,040,435 B1 5/2006 Lesesky
7,042,165 B2 5/2006 Madhani et al.
7,046,132 B2 5/2006 Carpenter
7,064,658 B2 6/2006 Burlak et al.
7,072,668 B2 7/2006 Chou
7,098,784 B2 8/2006 Easley et al.
7,126,464 B2 10/2006 Harvey
7,250,872 B2 * 7/2007 Klinger ................ B60Q 11/005 324/523
7,257,472 B2 8/2007 Hauer et al.
7,339,460 B2 3/2008 Lane et al.
7,339,465 B1 3/2008 Cheng et al.
7,394,363 B1 7/2008 Ghahramani
7,415,325 B2 8/2008 Knosmann et al.
7,429,917 B2 9/2008 Fredricks et al.
7,430,464 B2 9/2008 Bell et al.
7,430,471 B2 9/2008 Simon
7,460,871 B2 12/2008 Humphries et al.
7,498,925 B2 3/2009 Battista
7,528,553 B2 5/2009 Ito et al.
7,535,375 B2 5/2009 McDermott, Sr.
7,545,266 B2 6/2009 Brosius
7,554,441 B2 6/2009 Viegers et al.
7,589,471 B2 9/2009 Kaczorowski
7,649,455 B2 1/2010 Easley et al.
7,702,358 B2 4/2010 Meyers
7,714,719 B2 5/2010 Duff
7,784,707 B2 8/2010 Witty et al.
7,843,335 B2 11/2010 Furey et al.
7,876,103 B2 1/2011 Mihai et al.
7,904,260 B2 3/2011 Burlak et al.
7,932,815 B2 4/2011 Martinez et al.
7,965,181 B2 6/2011 Rana et al.
7,978,065 B2 7/2011 Schnitz et al.
7,991,357 B2 8/2011 Meyers et al.
8,000,843 B2 8/2011 Kim
8,010,127 B2 8/2011 Burtner et al.
8,032,278 B2 10/2011 Flick
8,223,009 B2 7/2012 Anderson et al.
8,307,667 B2 11/2012 Rusignuolo et al.
8,334,662 B2 12/2012 Jin et al.
8,362,886 B2 1/2013 Flick
8,362,888 B2 1/2013 Roberts, Sr. et al.
8,374,824 B2 2/2013 Schwiers et al.
8,378,843 B2 2/2013 MacKenzie et al.
8,390,464 B1 3/2013 Slifkin et al.
8,416,067 B2 4/2013 Davidson et al.
8,461,958 B2 6/2013 Saenz et al.
8,471,498 B2 6/2013 Aboulnaga
8,503,145 B2 8/2013 Hulett
8,559,937 B2 10/2013 Ram et al.
8,575,839 B2 11/2013 Inoue et al.
8,577,358 B2 11/2013 Wesby
8,620,623 B2 12/2013 Meyers et al.
8,633,813 B2 1/2014 Shank et al.
8,635,035 B2 1/2014 De Otto
8,653,539 B2 2/2014 Tischler et al.
8,660,745 B2 2/2014 Risse et al.
8,665,083 B2 3/2014 Easley et al.
8,680,976 B2 3/2014 Lesesky
8,717,163 B2 5/2014 Easley et al.
8,749,142 B2 6/2014 Nguyen et al.
8,751,098 B2 6/2014 Faus et al.
8,760,274 B2 6/2014 Boling et al.
8,803,683 B2 8/2014 Schnitz et al.
8,816,697 B2 8/2014 Miller et al.
8,853,965 B2 10/2014 Bouws et al.
8,855,626 B2 10/2014 O'Toole et al.
8,890,683 B2 11/2014 Schnitz et al.
8,896,430 B2 11/2014 Davidson et al.
8,902,590 B2 12/2014 Tom et al.
8,947,096 B1 2/2015 Wolf
8,964,431 B2 2/2015 Sato et al.
8,981,647 B2 3/2015 Ding et al.
9,002,538 B2 4/2015 Hergesheimer et al.
9,043,078 B2 5/2015 Johnson et al.
9,073,446 B2 7/2015 Brown et al.
9,082,103 B2 7/2015 Breed
9,103,521 B2 8/2015 Nishitani et al.
9,119,270 B2 8/2015 Chen et al.
9,127,945 B2 9/2015 Telang et al.
9,144,026 B2 9/2015 Sanders et al.
9,147,335 B2 9/2015 Raghunathan et al.
9,161,414 B2 10/2015 Brancken et al.
9,171,460 B2 10/2015 Chen et al.
9,189,661 B1 11/2015 Meyers
9,237,627 B2 1/2016 Takata et al.
9,251,694 B2 2/2016 Kleve et al.
9,370,082 B2 6/2016 Yoneoka et al.
9,374,873 B2 6/2016 Kim et al.
9,406,222 B2 8/2016 Hergesheimer et al.
9,415,759 B2 8/2016 Greene et al.
9,428,127 B2 8/2016 Cooper et al.
9,434,308 B2 9/2016 Bean
9,472,030 B2 10/2016 Davidson et al.
9,489,778 B2 11/2016 Hering
9,499,109 B2 11/2016 Armacost et al.
9,500,691 B2 11/2016 Yun
9,628,565 B2 4/2017 Stenneth et al.
9,668,317 B2 5/2017 LeSaffre
9,691,194 B2 6/2017 Davidson
9,704,303 B2 7/2017 Davidson et al.
9,717,066 B2 7/2017 Battista
2003/0204407 A1 10/2003 Nabors et al.
2004/0233041 A1 11/2004 Bohman et al.
2005/0187675 A1 * 8/2005 Schofield .................. B60R 1/12 701/2
2006/0139942 A1 6/2006 Pond et al.
2007/0108843 A1 5/2007 Preston et al.

(56) References Cited

U.S. PATENT DOCUMENTS

| | | | |
|---|---|---|---|
| 2007/0200765 A1 | 8/2007 | Meyers et al. | |
| 2007/0239346 A1 | 10/2007 | Hawkins et al. | |
| 2008/0231198 A1 | 9/2008 | Zarr | |
| 2008/0316012 A1 | 12/2008 | Paasche et al. | |
| 2009/0160646 A1 | 6/2009 | MacKenzie et al. | |
| 2009/0219148 A1* | 9/2009 | Thomas | B60R 16/0315 340/431 |
| 2010/0066501 A1 | 3/2010 | Ulrich et al. | |
| 2011/0169424 A1 | 7/2011 | Aboulnaga | |
| 2011/0169447 A1 | 7/2011 | Brown et al. | |
| 2011/0193484 A1 | 8/2011 | Harbers et al. | |
| 2011/0281522 A1 | 11/2011 | Suda | |
| 2012/0098430 A1 | 4/2012 | Inoue et al. | |
| 2012/0161633 A1* | 6/2012 | Nishitani | F21V 23/007 315/117 |
| 2012/0218790 A1 | 6/2012 | Sata et al. | |
| 2012/0187847 A1 | 7/2012 | Hamamoto et al. | |
| 2013/0147617 A1 | 6/2013 | Boling et al. | |
| 2014/0097761 A1 | 4/2014 | Chen et al. | |
| 2014/0139143 A1 | 5/2014 | Navabi-Shirazi et al. | |
| 2014/0347194 A1 | 11/2014 | Schnitz et al. | |
| 2015/0015143 A1 | 1/2015 | Inada | |
| 2015/0102726 A1 | 4/2015 | Yoneoka et al. | |
| 2015/0137679 A1 | 5/2015 | Gary | |
| 2015/0269366 A1 | 9/2015 | Bells | |
| 2015/0349977 A1 | 12/2015 | Risse et al. | |
| 2016/0027224 A1 | 1/2016 | Bankowski et al. | |
| 2016/0052453 A1 | 3/2016 | Orion et al. | |
| 2016/0086391 A1 | 3/2016 | Ricci | |
| 2016/0121792 A1 | 5/2016 | Christopherson et al. | |
| 2016/0125816 A1 | 5/2016 | Walker et al. | |
| 2016/0128168 A1 | 5/2016 | Walker et al. | |
| 2016/0197740 A1 | 6/2016 | Risse et al. | |
| 2016/0311273 A1 | 10/2016 | Zaroor et al. | |
| 2017/0006671 A1 | 1/2017 | LeSaffre | |
| 2017/0061171 A1 | 2/2017 | Lombardi et al. | |
| 2017/0072854 A1* | 3/2017 | Cornelius | B60Q 11/005 |
| 2017/0171952 A1* | 6/2017 | Troutman | H05B 37/03 |
| 2017/0193443 A1 | 7/2017 | Barcala et al. | |
| 2017/0195854 A1 | 7/2017 | Shi-Nash et al. | |
| 2017/0195958 A1 | 7/2017 | Korneluk et al. | |

FOREIGN PATENT DOCUMENTS

| | | |
|---|---|---|
| GB | 2511095 A | 8/2014 |
| WO | WO 2008135622 A1 | 11/2008 |
| WO | WO 2012077013 A3 | 8/2012 |

* cited by examiner

39 TS CUSTOMER ID ANDY KING

MAP

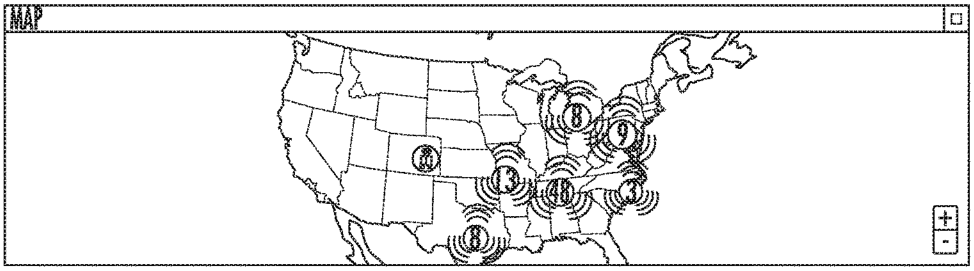

MAP

| TRAILER ID | GROUP | DATE/TIME | LOCATION | BATTERY LEVEL | POWER SOURCE | SENSORS | VALUE |
|---|---|---|---|---|---|---|---|
| 57594 | 6177569219 | 01-10-2017 02:50:09 | 100 WILLOW BROOK DR, MANCHESTER, TN 37355, USA | | SOLAR | LODS | CIRCUIT 5: OK |
| 53588 | 1720278577 | 01-23-2017 03:28:32 | 3076-3098 320th ST, LOHRVILLE, IA 51453, USA | | BATTERY | DOOR | OPEN |
| 59378 | 8548164796 | 01-19-2017 05:51:38 | 318 SEABOARD LN, FRANKLIN, TN 37067, USA | | SOLAR | ABS | ON |
| 57328 | 6177569219 | 01-16-2017 14:35:51 | US-95, LAS VEGAS, NV 89124, USA | | SOLAR | LODS | CIRCUIT 1: OK |
| 57710 | 7855597928 | 01-10-2017 02:56:52 | 5203 ILLINOIS AVE, NASHVILLE, TN 37209, USA | | BATTERY | LODS | CIRCUIT 3: OK |
| 57202 | 4217652032 | 01-10-2017 02:50:09 | 100 WILLOW BROOK DR, MANCHESTER, TN 37355, USA | | SOLAR | CARGO | LOADED |
| 53394 | 2945243156 | 01-10-2017 02:05:54 | 811 INDUSTRIAL AVE, CHESAPEAKE, VA 23324, USA | | BATTERY | DOOR | CLOSED |
| 57594 | 1224376417 | 01-23-2017 13:38:59 | 1834 W McEWEN DR, FRANKLIN, TN 37067, USA | | SOLAR | LODS | CIRCUIT 5: OK |
| 53588 | 1720278577 | 01-23-2017 03:28:32 | 3076-3098 320th ST, LOHRVILLE, IA 51453, USA | | BATTERY | DOOR | OPEN |
| 59378 | 8548164796 | 01-19-2017 05:51:38 | 318 SEABOARD LN, FRANKLIN, TN 37067, USA | | SOLAR | ABS | ON |
| 57328 | 6177569219 | 01-16-2017 14:35:51 | US-95, LAS VEGAS, NV 89124, USA | | SOLAR | LODS | CIRCUIT 1: OK |
| 57710 | 7855597928 | 01-10-2017 02:56:52 | 5203 ILLINOIS AVE, NASHVILLE, TN 37209, USA | | BATTERY | LODS | CIRCUIT 3: OK |
| 57202 | 4217652032 | 01-10-2017 02:50:09 | 100 WILLOW BROOK DR, MANCHESTER, TN 37355, USA | | SOLAR | CARGO | LOADED |
| 53394 | 2945243156 | 01-10-2017 02:05:54 | 811 INDUSTRIAL AVE, CHESAPEAKE, VA 23324, USA | | BATTERY | DOOR | CLOSED |
| 57594 | 1224376417 | 01-23-2017 13:38:59 | 1834 W McEWEN DR, FRANKLIN, TN 37067, USA | | SOLAR | LODS | CIRCUIT 5: OK |

FIRST | PREVIOUS | 1 | 2 | 3 | 4 | 5 | NEXT | LAST

FIG. 25

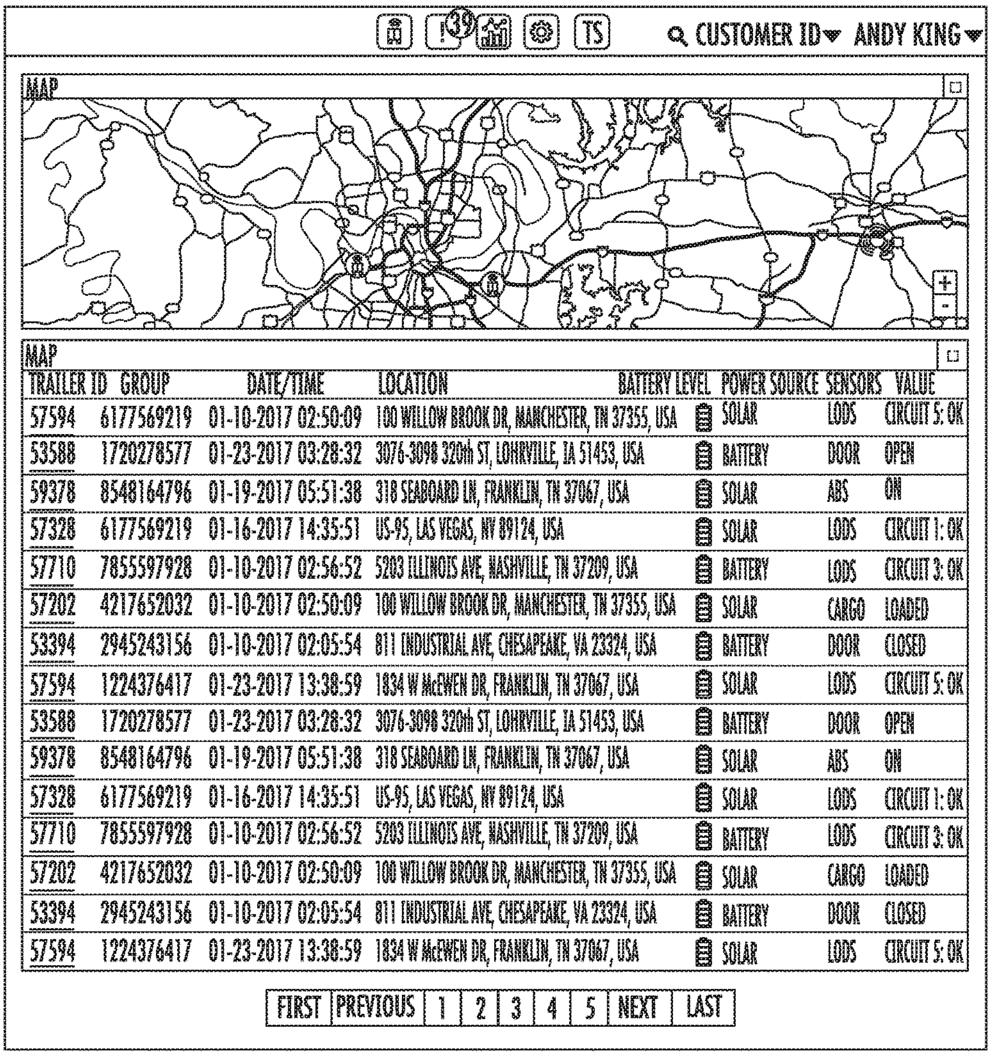

| TRAILER ID | GROUP | DATE/TIME | LOCATION | BATTERY LEVEL | POWER SOURCE | SENSORS | VALUE |
|---|---|---|---|---|---|---|---|
| 57594 | 6177569219 | 01-10-2017 02:50:09 | 100 WILLOW BROOK DR, MANCHESTER, TN 37355, USA | | SOLAR | LODS | CIRCUIT 5: OK |
| 53588 | 1720278577 | 01-23-2017 03:28:32 | 3076-3098 320th ST, LOHRVILLE, IA 51453, USA | | BATTERY | DOOR | OPEN |
| 59378 | 8548164796 | 01-19-2017 05:51:38 | 318 SEABOARD LN, FRANKLIN, TN 37067, USA | | SOLAR | ABS | ON |
| 57328 | 6177569219 | 01-16-2017 14:35:51 | US-95, LAS VEGAS, NV 89124, USA | | SOLAR | LODS | CIRCUIT 1: OK |
| 57710 | 7855597928 | 01-10-2017 02:56:52 | 5203 ILLINOIS AVE, NASHVILLE, TN 37209, USA | | BATTERY | LODS | CIRCUIT 3: OK |
| 57202 | 4217652032 | 01-10-2017 02:50:09 | 100 WILLOW BROOK DR, MANCHESTER, TN 37355, USA | | SOLAR | CARGO | LOADED |
| 53394 | 2945243156 | 01-10-2017 02:05:54 | 811 INDUSTRIAL AVE, CHESAPEAKE, VA 23324, USA | | BATTERY | DOOR | CLOSED |
| 57594 | 1224376417 | 01-23-2017 13:38:59 | 1834 W McEWEN DR, FRANKLIN, TN 37067, USA | | SOLAR | LODS | CIRCUIT 5: OK |
| 53588 | 1720278577 | 01-23-2017 03:28:32 | 3076-3098 320th ST, LOHRVILLE, IA 51453, USA | | BATTERY | DOOR | OPEN |
| 59378 | 8548164796 | 01-19-2017 05:51:38 | 318 SEABOARD LN, FRANKLIN, TN 37067, USA | | SOLAR | ABS | ON |
| 57328 | 6177569219 | 01-16-2017 14:35:51 | US-95, LAS VEGAS, NV 89124, USA | | SOLAR | LODS | CIRCUIT 1: OK |
| 57710 | 7855597928 | 01-10-2017 02:56:52 | 5203 ILLINOIS AVE, NASHVILLE, TN 37209, USA | | BATTERY | LODS | CIRCUIT 3: OK |
| 57202 | 4217652032 | 01-10-2017 02:50:09 | 100 WILLOW BROOK DR, MANCHESTER, TN 37355, USA | | SOLAR | CARGO | LOADED |
| 53394 | 2945243156 | 01-10-2017 02:05:54 | 811 INDUSTRIAL AVE, CHESAPEAKE, VA 23324, USA | | BATTERY | DOOR | CLOSED |
| 57594 | 1224376417 | 01-23-2017 13:38:59 | 1834 W McEWEN DR, FRANKLIN, TN 37067, USA | | SOLAR | LODS | CIRCUIT 5: OK |

FIG. 28

| TRAILER ID | GROUP | DATE/TIME | LOCATION | BATTERY LEVEL | POWER SOURCE | SENSORS | VALUE |
|---|---|---|---|---|---|---|---|
| 57594 | 6177569219 | 01-10-2017 02:50:09 | 100 WILLOW BROOK DR, MANCHESTER, TN 37355, USA | | SOLAR | LODS | CIRCUIT 5: OK |
| 53588 | 1720278577 | 01-23-2017 03:28:32 | 3076-3098 320th ST, LOHRVILLE, IA 51453, USA | | BATTERY | DOOR | OPEN |
| 59378 | 8548164796 | 01-19-2017 05:51:38 | 318 SEABOARD LN, FRANKLIN, TN 37067, USA | | SOLAR | ABS | ON |
| 57328 | 6177569219 | 01-16-2017 14:35:51 | US-95, LAS VEGAS, NV 89124, USA | | SOLAR | LODS | CIRCUIT 1: OK |

TELEMATICS ROAD READY SYSTEM

FIELD OF THE INVENTION

The present application is directed to a telematics system method for detecting failure of a lighting device, monitoring sensors on a vehicle, and transmitting a status of the systems to a master control unit.

BRIEF SUMMARY

A system for monitoring a trailer having a plurality of light emitting diode devices includes a master control unit attached to an outside surface of the trailer. The master control unit includes a solar panel, a GPS receiver module, a cellular data transceiver module for communicating with a central tracking computer via a cellular data network interfaced to the Internet, and a local wireless network master transceiver module in wireless communication with a plurality of wireless sensors and a light failure detection system. A microcontroller is provided for controlling the local wireless network master transceiver module to periodically obtain sensor data from the wireless sensors and light failure detection system, and for controlling the cellular data transceiver module to transmit the location and the sensor data to the central tracking computer for storage in the tracking database.

The light failure detection system is coupled to the plurality of light emitting diode lighting devices and includes a circuit board; a plurality of lighting circuits, each lighting circuit being coupled to the circuit board by an input wire; a plurality of voltage level monitoring circuits on the circuit board, each one of the plurality of voltage level monitoring circuits connected to one of the lighting circuits and adapted to measure the voltage of the one of the light circuits; a plurality of current monitoring circuits on the circuit board, each one of the plurality of current monitoring circuits connected to one of the lighting circuits and adapted to measure a current draw of the one of the lighting circuits; a voltage drop circuit for enabling the plurality of voltage level monitoring circuits and the plurality of current monitoring circuits to measure current and voltage at an adjusted input voltage; a temperature sensor for sensing a temperature; a switch for placing the light failure detection system into a learn mode wherein the lighting circuits are monitored with the plurality of voltage level monitoring circuits and the plurality of current monitoring circuits to determine threshold voltage and current levels for the lighting circuits; a microcontroller coupled to the circuit board for storing the threshold voltage and current levels and the temperature sensed by the temperature sensor, the microcontroller being adapted to calculate an adjusted threshold current based on a voltage sensitivity and the sensed temperature; a fault indicator for indicating a status of the light failure detection system if a measured current is above or below the adjusted threshold current by a predetermined value; and a transceiver coupled to the circuit board for sending information to a master control unit, the light failure detection system also including a housing coupled to a trailer at one end and a socket at a second end for coupling to a truck tractor with a wiring harness.

BRIEF DESCRIPTION OF THE DRAWINGS

FIG. 21C is a circuit diagram illustrating a main controller and transceiver for connection to a Zigbee network and communication with a MCU.

FIG. 25 is an additional overview screen shot showing an alternate view.

FIG. 28 is a screen shot of a user interface showing a table view of a trailer list.

DETAILED DESCRIPTION OF EMBODIMENTS OF THE INVENTION

Figure 1:
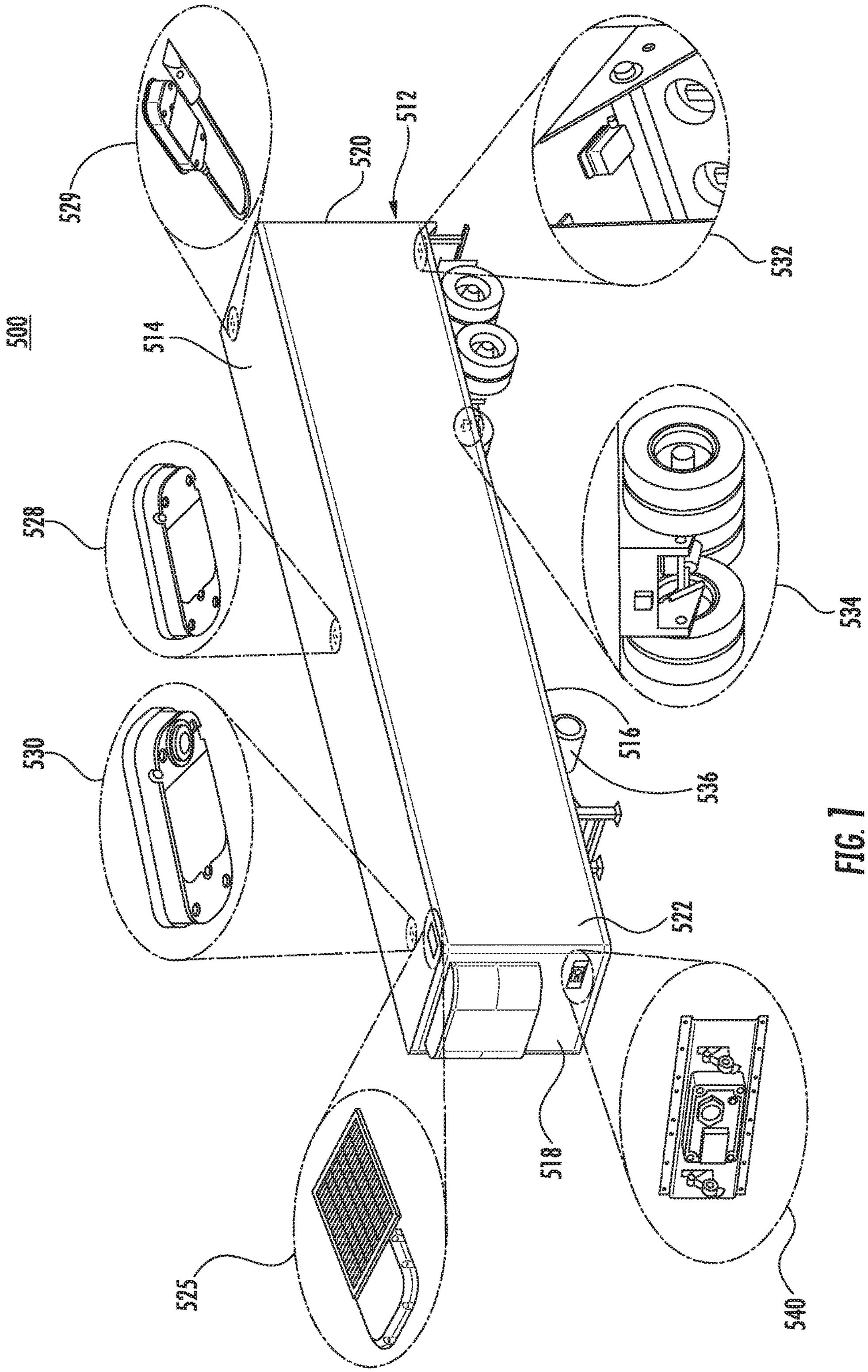
FIG. 1 illustrates a telematics Road Ready system including multiple sensing devices.

A telematics Road Ready system 500 sends, receives and stores data acquired from sensors attached to various systems and components of a trailer 512 and communicates the data to external display devices through radio frequency power line carrier or light communication, such as fiber optics. Sensors are configured to communicate with a telematics system master control unit or external device (such as a Tr/IPS™ MCU (Master Control Unit) by TrackPoint Systems, LLC of Nashville, Tenn.). The telematics system 500 also sends, receives and stores data acquired from a light failure detection system, as indicated at 540. Light failure detection system 540 is capable of multi-volt operation, such as 12V/24V, 10-30V, and 10-42V. Further, light failure detection system 540 includes LED and Incandescent Lamp capabilities (capable of determining current between LED/Incandescent), monitoring of Anti-Lock Brake System (On/Off), battery power for un-tethered operation to facilitate: Asset Location Determination and/or Asset Remote Diagnostic Check. The light failure detection system 540 may be used in conjunction with multiple trailer configurations (PUP's) and additional sensors including wireless (Radio Frequency (RF) or Optical) or hardwired sensors.

The nose box assembly of the trailer communication system includes a wireless transmitting device with a communication protocol such as Zigbee or Bluetooth that will transmit signals to the master control unit 525 or other remote device such as a laptop, tablet, or cell phone. The transmitted data is acquired from the various sensors installed on the trailer 520 or asset. In the embodiment shown, light failure detection system 540 acts as the nosebox assembly.

The telematics Road Ready system 500 uses a cellular-based trailer intelligence system to provide transportation companies with real-time updates of a trailer's roadside status. Telematics Road Ready system 500 includes interior and exterior sensors. The exterior sensors include at least light failure detection system 540, a warning sensor 532, such as an anti-lock braking system (ABS) monitoring sensor, and Tire pressure/inflation sensor. The interior sensors include at least a temperature sensor 528, cargo load detection sensor 530, and a door position detection sensor 529. A dispatcher evaluates the trailer's condition remotely, by utilizing an online dashboard, prior to dispatching a driver. If a failure occurs, the dashboard will instantly notify the dispatcher. If the trailer 520 is experiencing a failure, it will highlight the failure in red with a fault code. A wireless network is provided around the trailer using a solar-powered master control unit placed on the roof of the trailer. Wireless sensors are then placed inside and outside of the trailer. If a failure occurs, the telematics Road Ready system will instantly detect it and report the failure to an alert dashboard.

The ABS monitoring sensor 32 detects if the ABS light illuminates. When tethered to a tractor, the system and reports the failure to the alert dashboard. The tire pressure monitoring sensor detects if the tire pressure is too low or if the inflation system has been running too long. The information reported back to the alert dashboard depends on the type of tire system installed on the trailer. Real-time updates from the temp sensor, provides the customer with time and location stamped temp history during transit. Real-time updates from the cargo load detection sensor 530, allow the customer to know exactly when a trailer is loaded. The cargo detection zone is located directly under the sensor's location. Real-time updates are also provided from the door sensor to provide the customer with time and location stamped door positions. Custom alerts can be setup for unauthorized door openings to help detect theft and product contamination.

FIG. 1 shows the telematics Road Ready system 500 for use with a truck trailer 512 having top 514, bottom 516, front 518, and side surfaces 522 and 523. Doors 519 are positioned at a back end of truck trailer 512. Truck trailer 512 may be a dry-van semi-trailer shipping container or a refrigerated shipping container. Master control unit (MCU) 525 attached to top 514 of truck trailer 512. Wireless sensors, such as a temperature sensor 528, three-axis accelerometer door sensor or door position detection sensor 529, an ultrasonic load sensor or cargo load detection sensor 530 are positioned within trailer 512 and are in wireless communication with the local wireless network master transceiver module (described below) of the MCU 525. Warning sensor 532, smart bridge 534, and light failure detection system 540 are all located external to the trailer 512.

Figure 2:
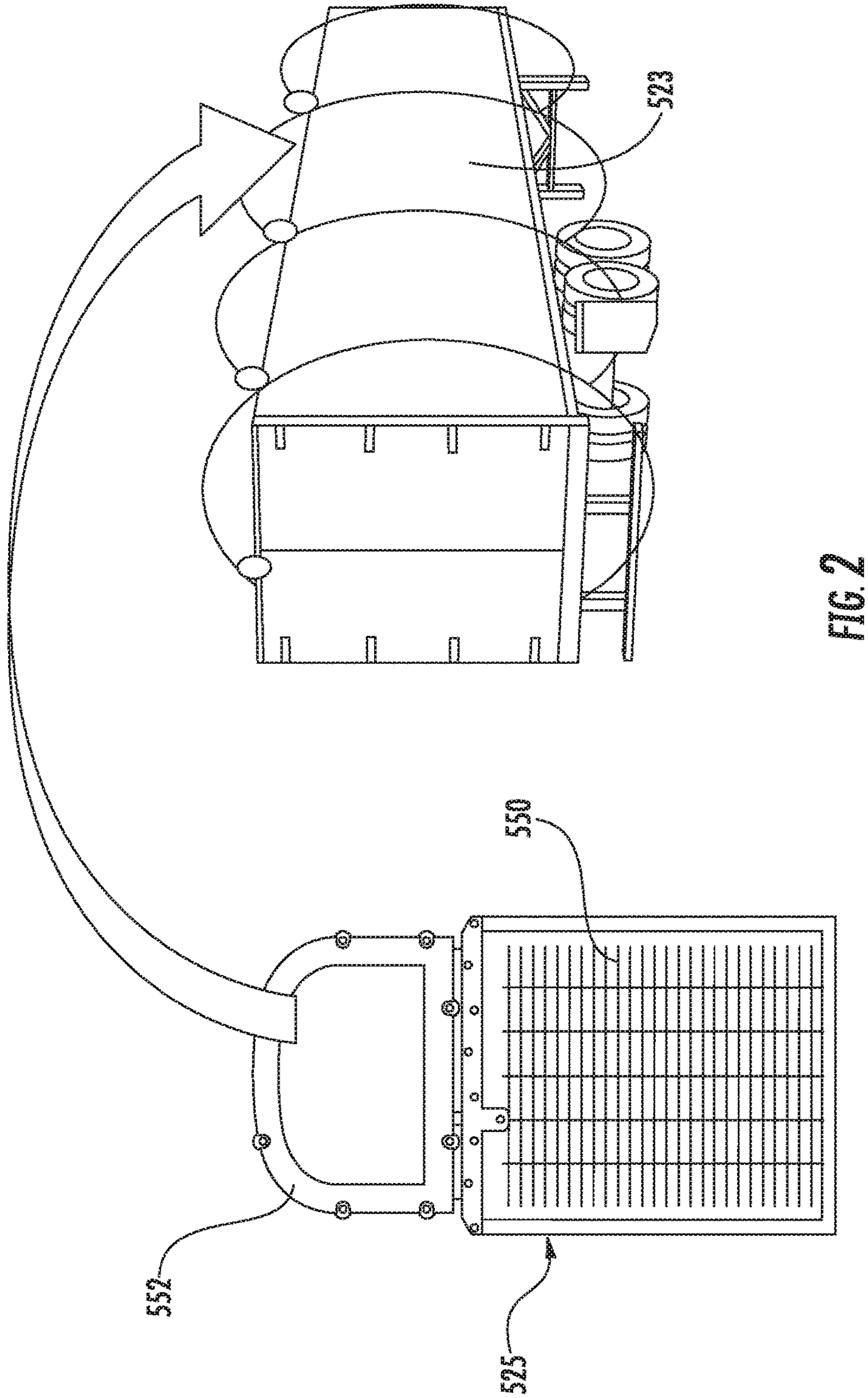
FIG. 2 illustrates a master control unit and a wireless network around a trailer.

As shown in FIG. 2, MCU 525 including solar cells 550 and an electronics module 551 52, which are integrated into a one-piece unit as described below. MCU 525 is comprised of 6 main parts: a cellular module, a GPS, an RF wireless xBee module, a microcontroller, a rechargeable lithium-ion battery and a military grade flexible solar film. Charging circuitry allows MCU 525 to use on average 3% of the battery while charging as much as 15% per hour. In the absence of sunlight, MCU 525 continues to report for 60 days due to specialized back-off controls. The solar panel continues to charge even in low sunlight conditions and heavy cloud coverage. The solar cells 550 converts light energy, such as from the sun, into power for operation of the electronics module 552. The local wireless network master transceiver module of MCU 525 comprises the master node in a local wireless network with the wireless sensors. An exemplary wireless network uses the hardware specified by IEEE standard 802.15.4 coupled with a proprietary communication protocol. The local wireless network allows sensor data from wireless sensors in the network to be gathered by MCU 525 and transmitted using the cellular data transceiver module of MCU 525.

Examples of the MCU 525 are: 005-197-502—Verizon (CDMA) with internal Zigbee—allows use of additional sensors, such as temp, cargo, door, and fuel sensors; 005-197-501—AT&T (GSM) with internal Zigbee—allows use of additional sensors, such as temp, cargo, door, and fuel sensors; 005-198-502—Verizon (CDMA) without internal Zigbee—tracking only, no additional sensors; 005-198-501—AT&T (GSM) without internal Zigbee—tracking only, no additional sensors.

Figure 3A:
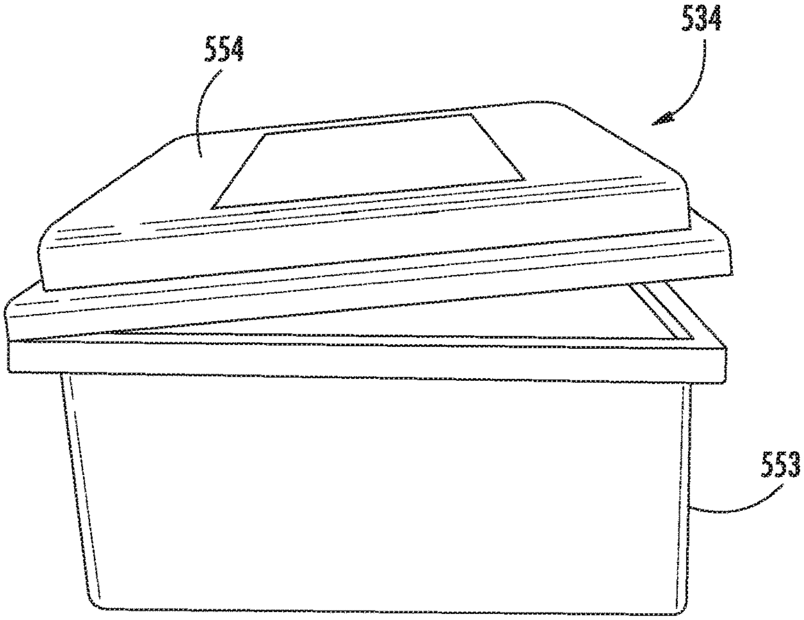
FIGS. 3A and 3B are side open and top open views of a smart bridge.
Figure 3B:
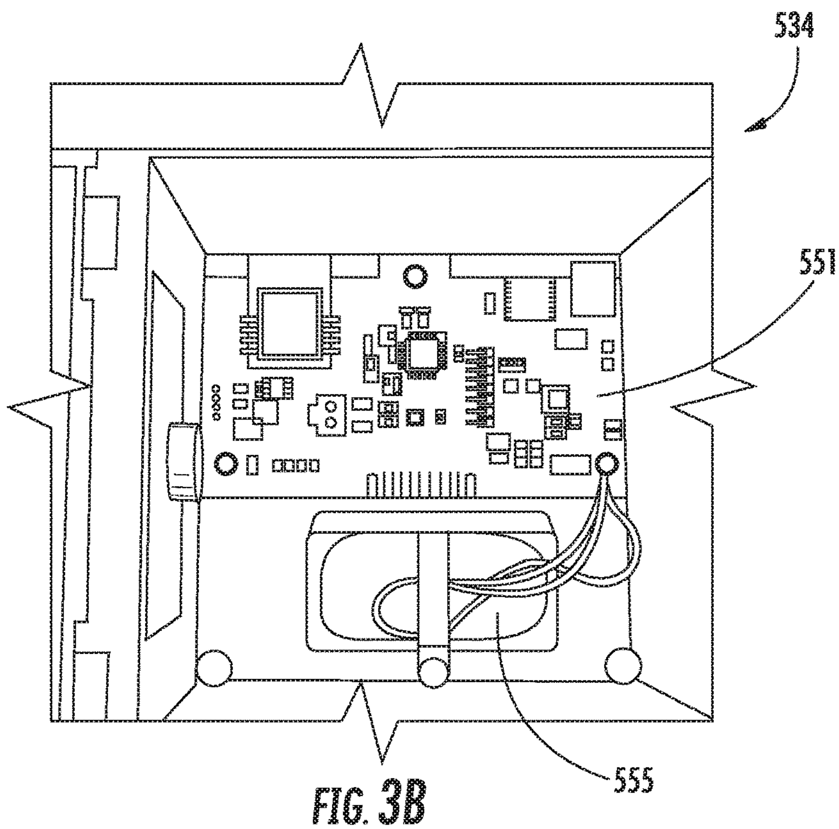

Smart bridge 534, as shown in FIGS. 3A and 3B in side open and top open views, uses a Direct Sequence Spread Spectrum (DSSS) radio module to gather STEMCO RF signal data from installed STEMCO products such as an Aeris automatic tire inflation system, a TracBat mileage sensor, or a single or dual AirBat tire pressure monitoring sensor. The term Smart Bridge comes from the nature of the product function, it "bridges" the STEMCO system with telematics Road Ready system 500. Smart bridge 534 includes circuitry, as shown on circuit board 551, that translates an RF signal from the STEMCO sensors into TrIPSNET messaging format. Once the signal is converted to TrIPSNET format, the messages are delivered to MCU 525 through the ZigBee network. Smart bridge 534 includes a plastic enclosure 553, with a cover 554 and sealing interface 555 for a power and ground wire. Constant power is delivered to the Smart Bridge through a blue circuit wire and includes a rechargeable Lithium-Ion battery.

Figure 4A:
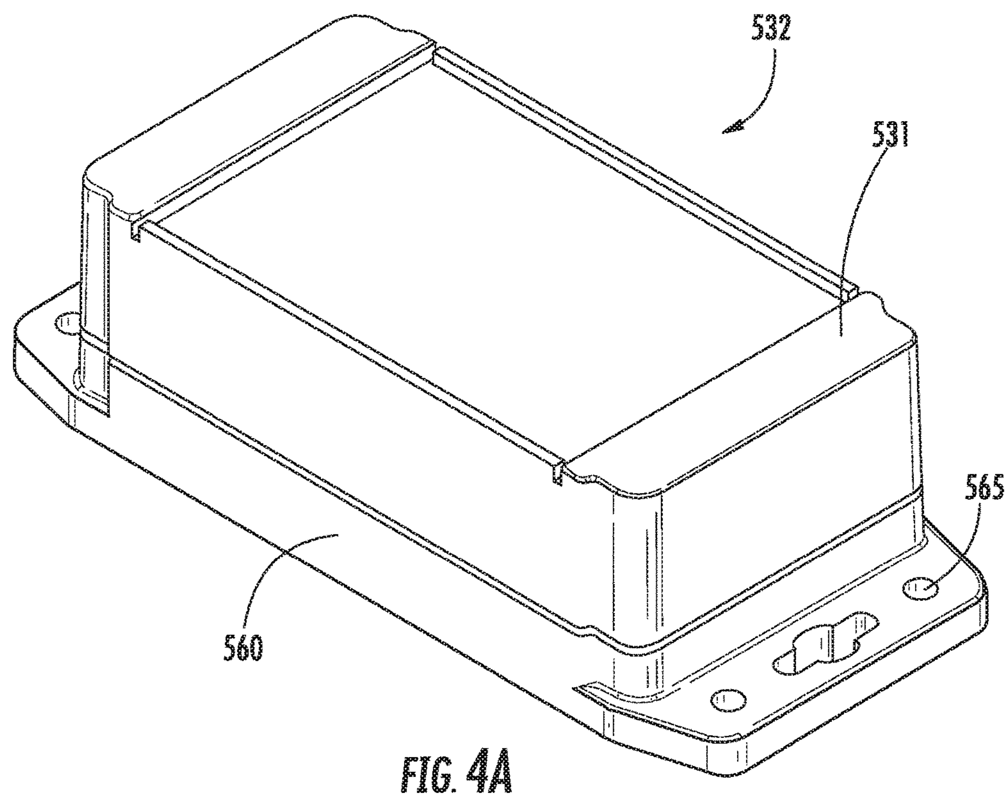
FIGS. 4A and 4B illustrate a warning sensor perspective view and cross-section.
Figure 4B:
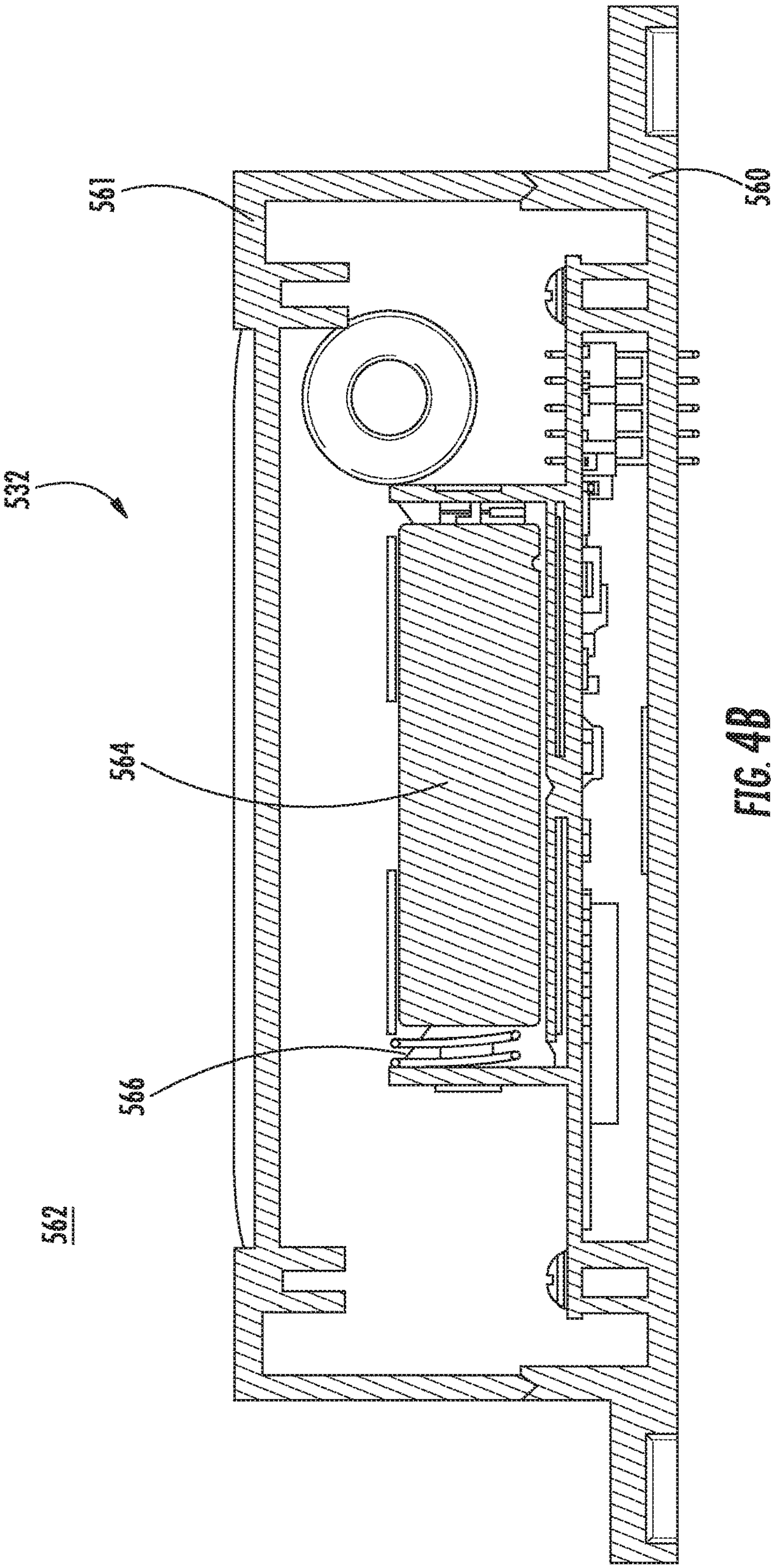
Figure 4C:
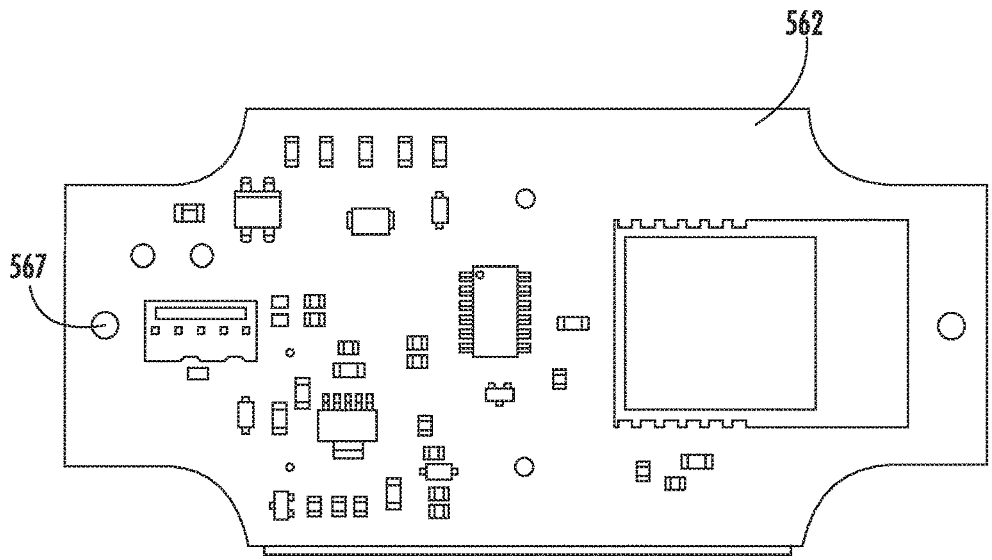
FIGS. 4C and 4D are bottom and top views of a circuit board for a warning sensor.
Figure 4D:
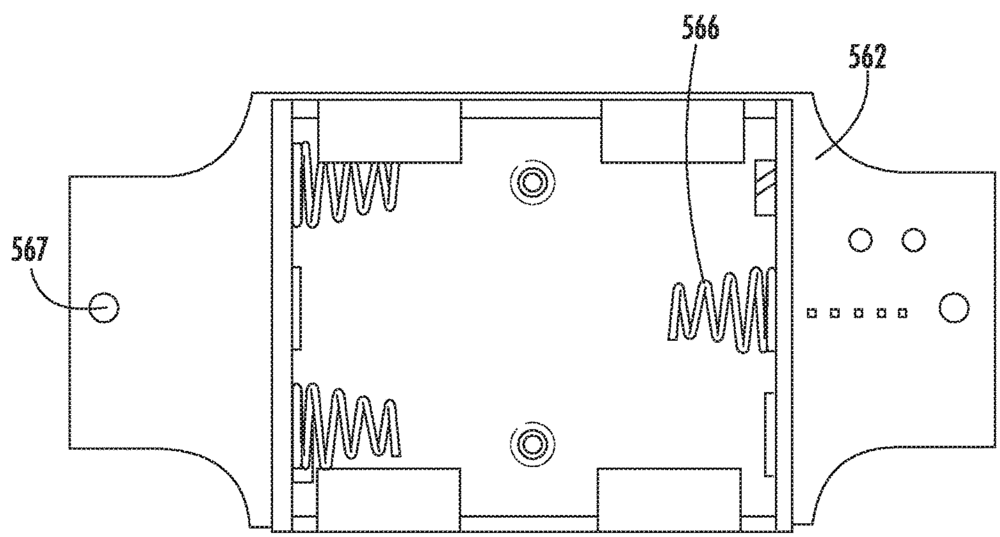
Figure 4E:
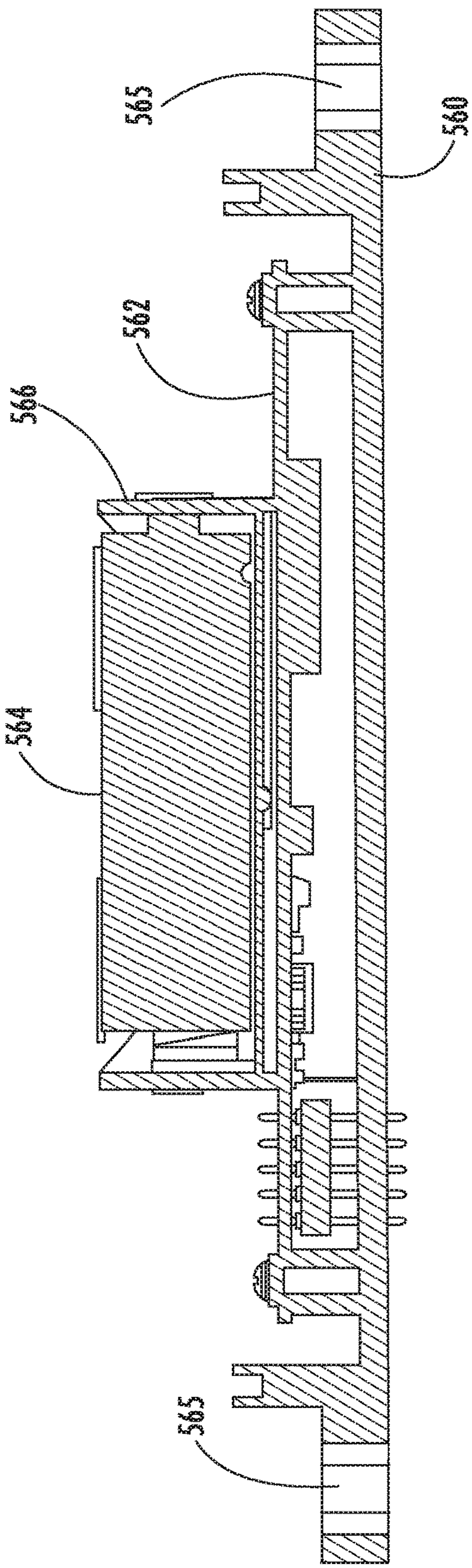
FIGS. 4E-4H are additional views of the warning sensor.
Figure 4F:
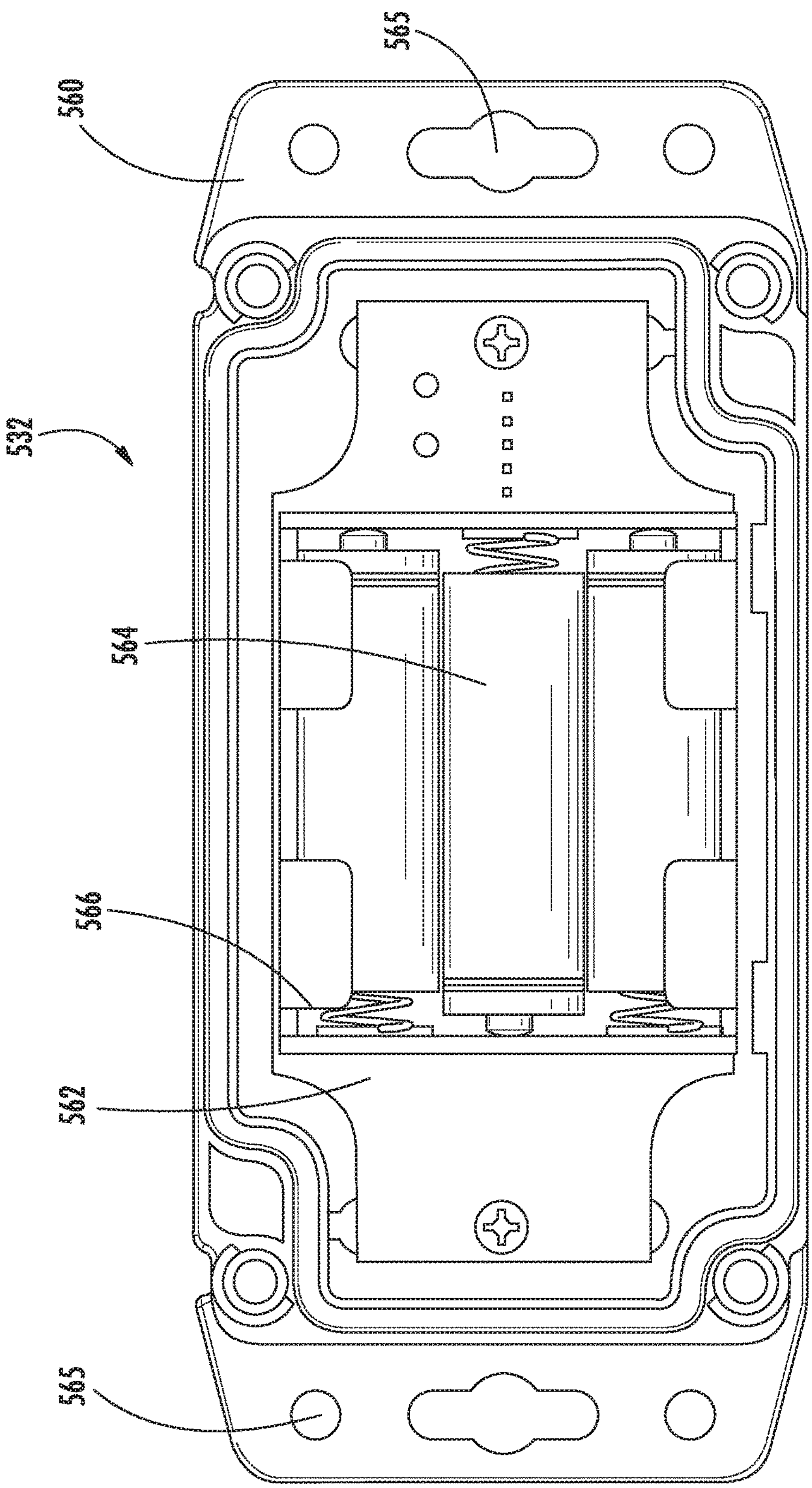
Figure 4G:
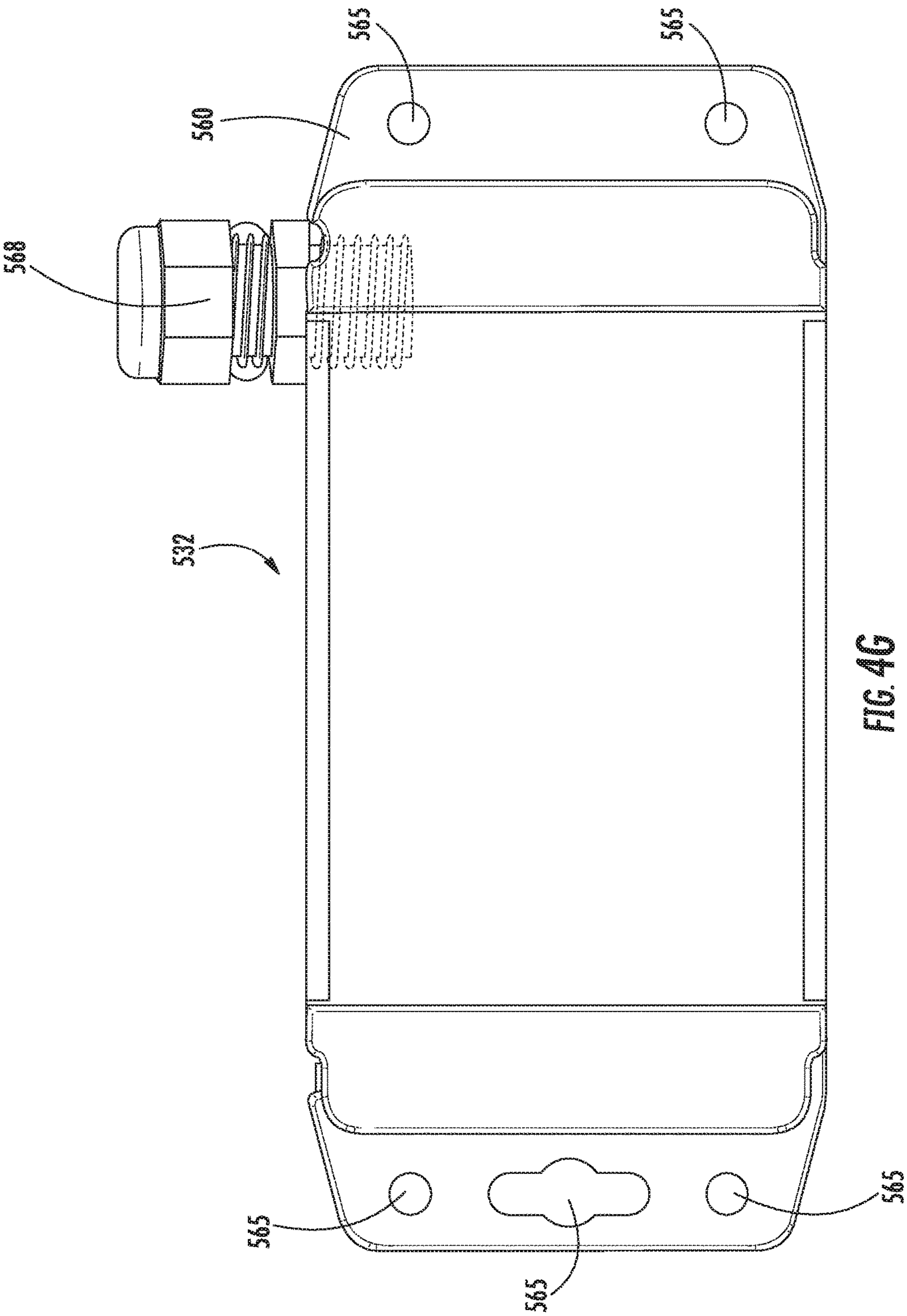
Figure 4H:
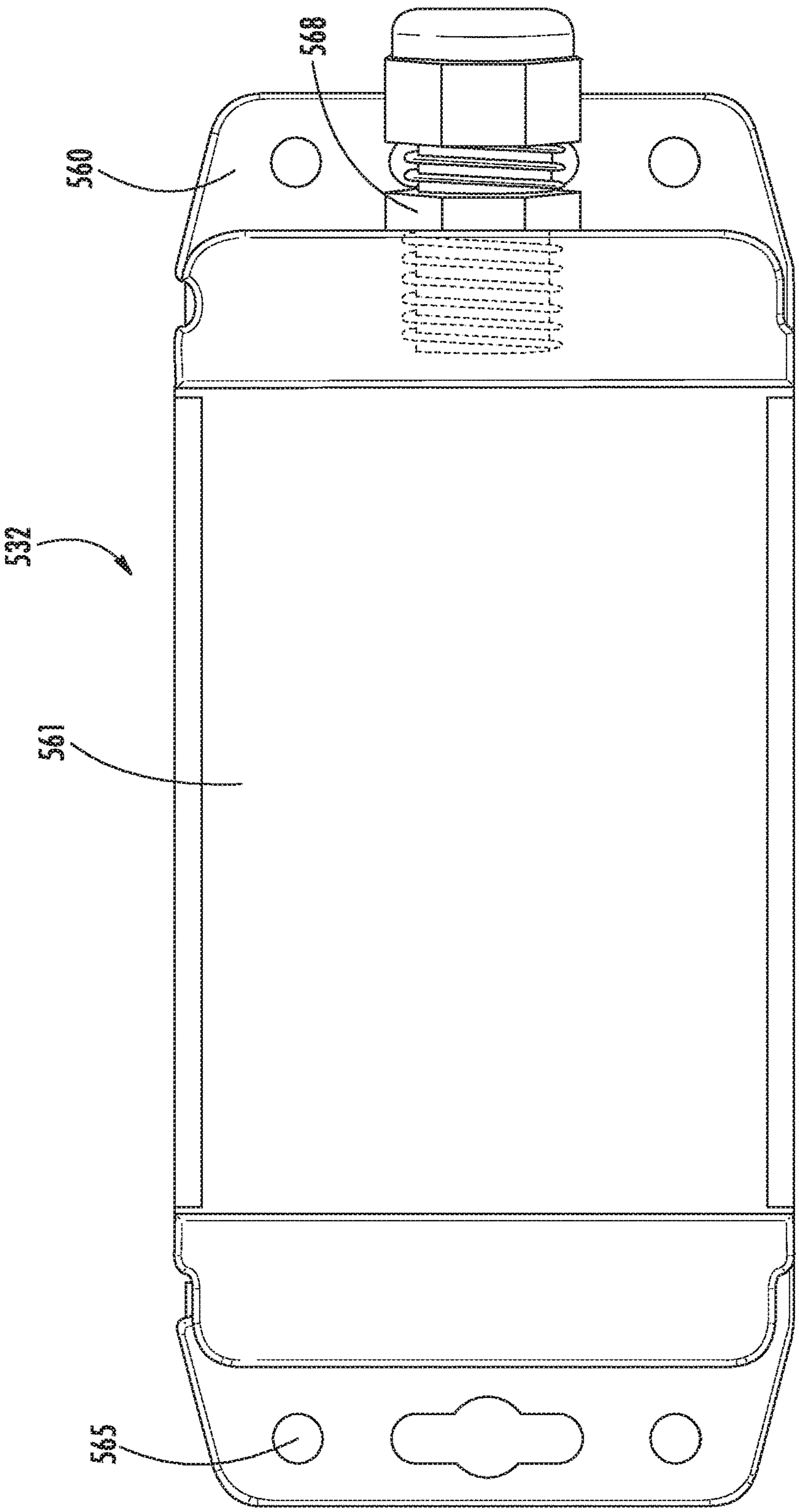

FIGS. 4A and 4B illustrate warning sensor 532 in perspective and cross-sectional views. A housing base 560, housing cover 561, which may include a clear window, circuit board 562 and a battery 564 are shown. Housing base 560 also includes apertures 565 for receiving fasteners for attachment to a trailer. FIGS. 4C and 4D are bottom and top views of circuit board 562 for warning sensor 532 and FIGS. 4E-4F are additional views of warning sensor 532. As illustrated, a top surface of circuit board 562 includes an attachment area 566 for battery 564 and apertures 567 for receiving fasteners for attaching circuit board 562 to housing base 560. As shown in alternate embodiments in FIGS. 4G-4H, warning sensor 532 includes a power and ground wire that enter the enclosure through a sealed interface 568. Warning sensor 532 is connected in series with the wiring harness that powers a warning light such as an ABS fault lamp, Air Inflation System Indicator lamp, or Air Pressure monitoring device or indicator. Warning sensor 532 continually monitors the ABS fault lamp when tethered to a tractor and remotely alerts dispatch of ABS issues. When warning sensor 532 is used to monitor tires, the warning sensor 532 monitors the tire inflation light and logs each event with a time and location. Warning sensor 532 also monitors the voltage on the input wires (On or Off) and communicates messages to the MCU 525 through the ZigBee network. Warning sensor 532 generates messages including P—power up, E—alert, S—Status, r—resolved and Y—acknowledgement of configuration message to the device from the MCU 525. Messages sent from the warning sensor include sensor parameters in code format, such as: Seconds since light came on; Is light on?; Time light turned off. When did the light turn off in this event?; Battery voltage; Number of power ups; Message sent count; Message acknowledged count; Firmware Rev. The warning sensor includes configurable parameters as shown in Table 1, which is based on an exemplary ABS warning light application.

TABLE 1

| Configurable Parameter | Description | Default Setting |
|---|---|---|
| Check Bulb | This is the delay to wait when the light is first turned on during tank fill. This could be due to plugging the device, or just some quick bulb check when the tank is already full. | 2 sec |
| Tank Fill | This is the delay to wait when the ABS light is first turned ON during tank fill | 10 min |
| Status | This is the delay between sending status messages after the first alert is sent | 15 min |
| Flashing | This is the maximum time that the light will be off, if it's flashing as in Off-delay-On- . . . -Off-delay-On . . . | 5 sec |

Figure 5:
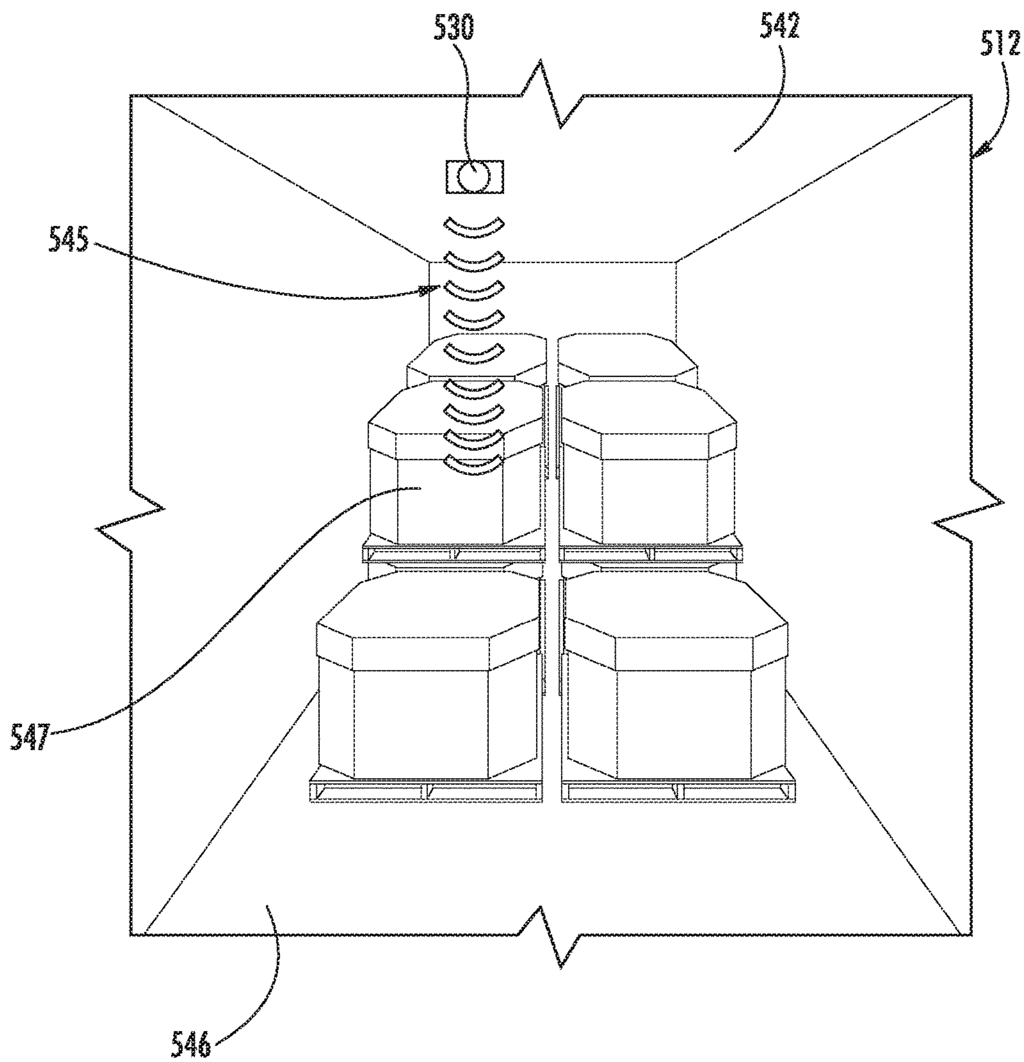
FIG. 5 is a cargo sensor.

Additional sensors may also be included in telematics Road Ready system 500. As shown in FIG. 5, cargo load detection sensor 530 may be a single, self-contained device comprising a replaceable battery, a microcontroller, a local wireless network transceiver, and components for transmitting an ultrasonic beam and receiving the reflections of that beam. Also, preferably the cargo load detection sensor 530 is packaged in a single enclosure and mounted on the inside of the roof 542 of the trailer 512. Cargo load detection sensor 530 is preferably attached using a double-sided foam tape, such as 3M™ brand VHB tape. An ultrasonic field or beam 545 of cargo load detection sensor 530 points down towards the floor 546 of the trailer 512. If cargo 547 is present in the area of ultrasonic beam 545, cargo 547 will interrupt the ultrasonic beam 545 before it gets to the floor 546. The cargo load detection sensor 530 may be wireless and provides critical loaded/unloaded information. Dispatch can quickly find empty trailers available for turns, while cargo detention can be easily and reliably documented. Empty Trailer reports help identify which customers are holding onto trailers too long, and allow fleets to optimize trailer cargo distribution and size. The cargo load detection sensor 530 has a peel-and-stick installation in the front section of the trailer. Alerts to cargo changes within 10 minutes of loading or unloading. Advanced motion-sensing algorithms prevent erroneous data when the trailer is in motion. Small objects, such as pallets or blankets in the nose of the trailer, can be ignored. The cargo load detection sensor 530 utilizes field-replaceable batteries with a 5-year operating life and wide operating temperature range. The local wireless network transceiver of the cargo load detection sensor 530 communicates wirelessly with the local wireless network master transceiver module of MCU 525 through the roof 542 of the trailer 512 without requiring any holes or other penetrations through the trailer 512. Cargo load detection sensor 530 may be TrackPoint Systems Part Number 005-184-503.

Figure 6:
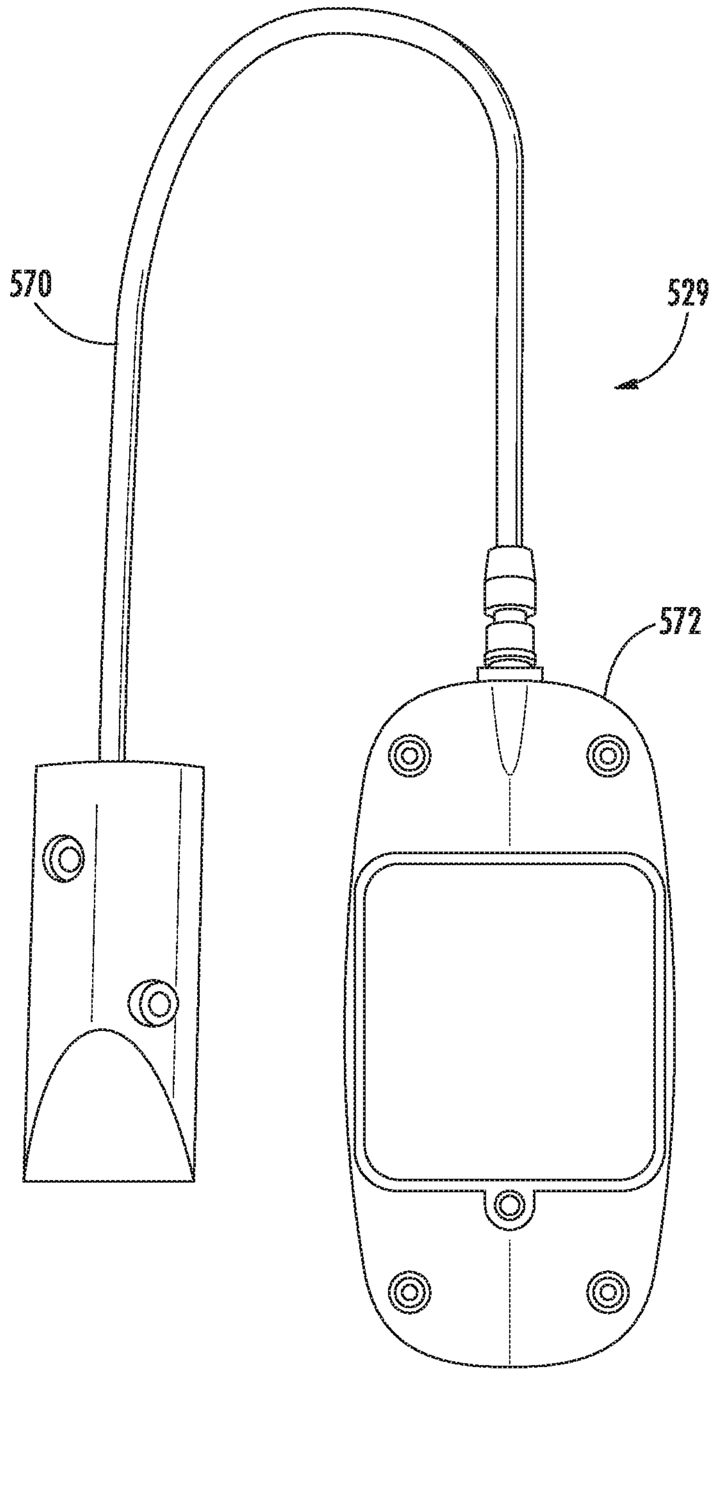
FIG. 6 is a door sensor.

FIG. 6 illustrates an embodiment of a door position detection sensor 529, which may be a single, self-contained device comprising a replaceable battery, a microcontroller, a local wireless network transceiver, and a 3-axis accelerometer. The accelerometer enables the device to detect movement in any of the three major axes (X, Y, and Z). The door position detection sensor 529 is preferably mounted to the inside of a door 519 of the shipping container in order to detect the opening and closing of the door. The three-axis accelerometer allows detection of opening of both swinging doors and roll-up doors. The local wireless network transceiver of the door position detection sensor 529 communicates wirelessly with the local wireless network master transceiver module of MCU 525 through the roof 542 of the trailer 512 without requiring any holes or other penetrations through the trailer 512. The wireless door sensor provides enhanced security by detecting open/close status and providing immediate alerts through the TrIPS™ MCU. This can be used to drive email or text alerts for unauthorized door openings after hours. The data can also be coupled with route information to drive alerts if a door is opened on a trailer under dispatch, but has not yet reached its destination. Door position detection sensor 529 includes a cable 570, such as an aluminum cable, and sensor body 572 that works on barn-style or roll-up doors and reports instantly when magnetic contact is broken. A Peel-and-stick or screw-mount may be used to mount the door sensor to the trailer door and inside wall. The door sensor may be TrackPoint Systems Part Number 005-184-501.

Figure 7:
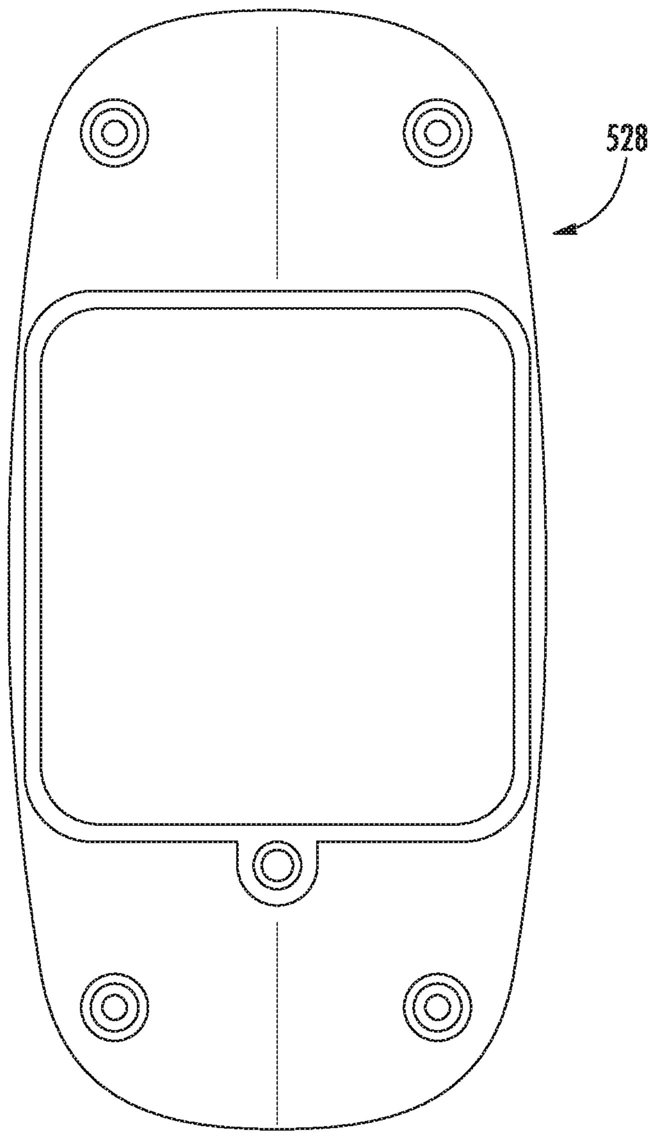
FIG. 7 illustrates a temperature sensor.

Additional sensors such as temperature sensor 528 shown in FIG. 7 may also be included. Temperature sensor 528 may be used for sensing and recording of refrigerated compartment temperature. The temperature sensor 528 may be wireless and may be installed in the air return for temperature measurements. Alternatively, the temperature sensor 528 may be placed inside multiple temperature-controlled zones for multi-compartment refrigerated compartments. Temperature sensor 528 is configured to measures temperature once per minute and sends status reports at configurable intervals if temperature is within the configured zone. An immediate alert is sent if temperature changes rapidly or goes outside the configured zone. In general, temperature sensor 528 operates at temperatures of −15° F. to +160° F. (−25° C. to +70° C.), has an accuracy of ±2° F. over the operating range, and a battery life up to 5 years. The temperature sensor 528 monitors trailer temperatures once per minute and sends real-time alerts of rapid temperature changes. The temperature sensor 528 may be TrackPoint Systems Part Number 005-184-502.

Telematics Road Ready system 500 may also include a reefer fuel sensor (not shown), which may be a wireless sensor for tracking fuel level in the reefer tank. The float-style sensor is designed to install in the ½" NPT threaded opening for the roll-over vent, and includes a fitting to replace the roll-over vent. Constructed of flexible plastic, the sensor bends to easily install without having to drop the tank, thereby saving significant time and money during installation and eliminating the need to replace the tank straps. Alerts are provided at 10%, 50%, and 90% tank capacity and status reports are sent at configurable intervals if fuel level has not changed. An integral accelerometer is provided to guard against slosh error. Reefer fuel sensor operates at a wide range of temperatures, −15° F. to +160° F. (−25° C. to +70° C.), and has a battery life up to 5 years. An IP67-rated enclosure and rugged metal-braided cable is provided for installation of Reefer Fuel Sensor under the trailer. The reefer fuel sensor may be TrackPoint Systems Part Number 005-184-504.

Telematics Road Ready system 500 also includes a light failure detection system 540 that utilizes microcontroller 120 technology for monitoring LED safety lighting elements on trailers. System 540 monitors lights in real time, thereby protecting against violations and downtime. System 540 is installed on a trailer as part of a SAE J560 nose box assembly and is integrated into the trailer electrical system.

A pre-trip inspection mode is provided for allowing a driver to perform a routine light check without assistance. During the pre-trip inspection, trailer lights will turn on and cycle through various circuits for thirty seconds each to allow the driver to confirm that all lights are functioning properly, or to be alerted that a repair is needed. Thus, roadside service calls and out-of-service violations are minimized.

The light failure detection system 540 also provides on-the-road awareness of a trailer's safety lighting by monitoring all of the trailer's LED safety lighting and wiring in real-time. An indicator light may be mounted on the front roadside corner of the trailer alerts the driver of a fault condition. The driver can easily locate the fault by toggling the switch on the system, which causes the indicator light to blink a coded sequence that is assigned to the problematic light circuit.

Figure 8:
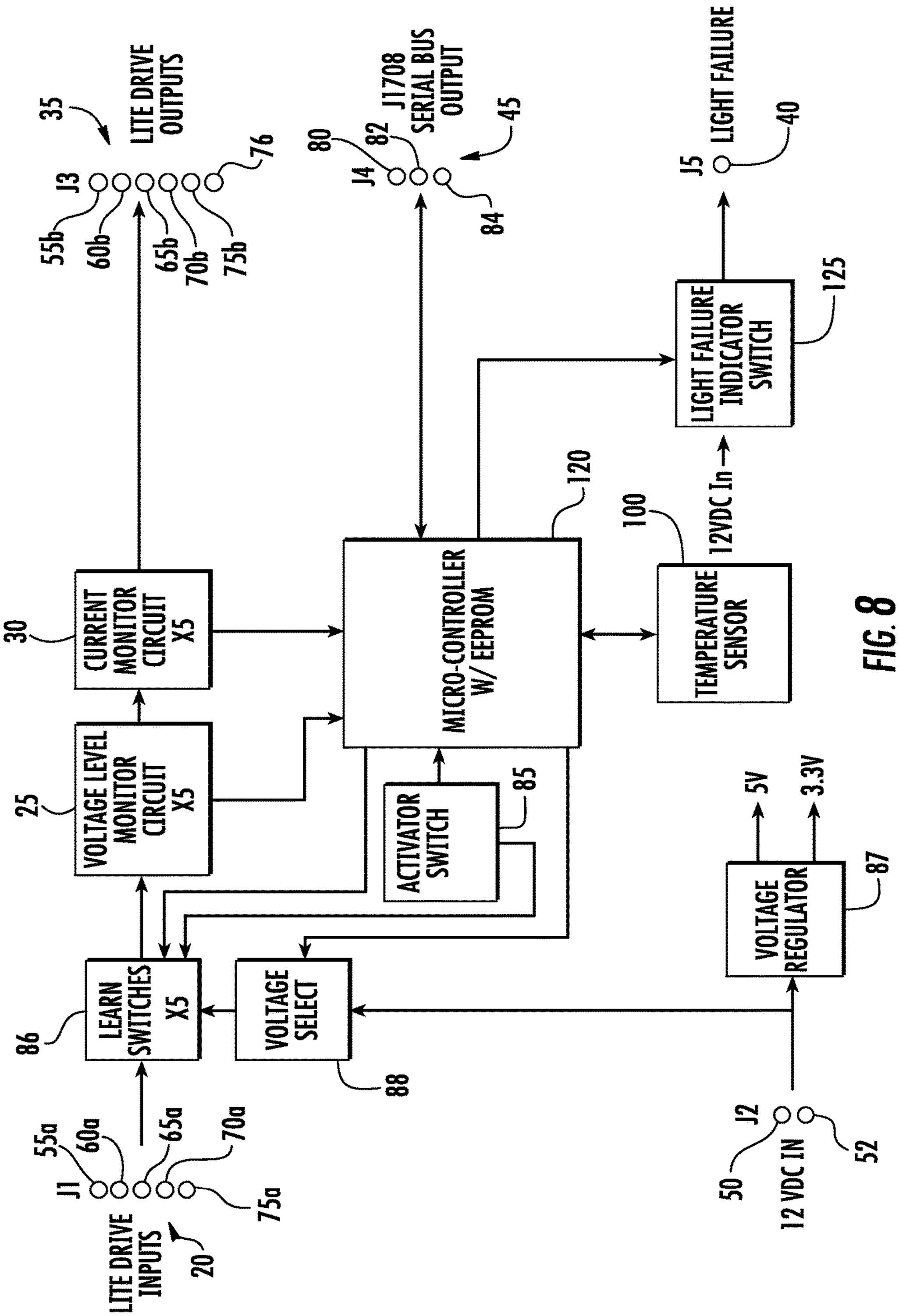
FIG. 8 is a block diagram of a light failure detection system of the telematics Road Ready system.

FIG. 8 is a block diagram of a light failure detection system that accepts five (5) Light Drive Inputs 20, five voltage monitor circuits 25, five current monitor circuits 30 and five light drive output ports 35. The voltage and current levels on each lighting circuit are monitored and used to make a "Light failure" determination for each of five lighting circuits. The Light failure detection is indicated to the operator using the Light failure signal or output 40. In some embodiments, a J1708 serial bus output 45 may be used.

The power input for the light failure detection system will use 12 VDC power supplied by the vehicle to power the Light failure detection electronics. This 12 VDC bus voltage will be supplied to the onboard power regulators which will provide the regulated voltage needed by the system electronics. Plated PCB holes will allow attachment of pigtail wires that will make connection to the 12 VDC vehicle power source. Two wires, indicated at 50 and 52, will be provided for these inputs: 12 VDC Vehicle Power: Blue Wire 50; and Vehicle Ground: White Wire 52. The operating range of the input voltage range is typically between about 11.5V to 14.4V. The Light failure detection will require about 200 mA from the 12V bus to power all of the light failure detection system circuitry.

The light failure detection system includes five lighting circuits having discrete wire "Light Drive" inputs 20. The wires are typically 12 GA wires that are capable of handling 15 Amps. Plated printed circuit board (PCB) holes will allow attachment of the pigtail wires for the vehicle lighting circuit inputs. Terminals on the wires may be used to connect the wires to the PCB. In the embodiment shown, the lighting circuits include Light Drive inputs: Light Circuit 1 Input: Red Wire (Stop) 55*a*, Light Circuit 2 Input: Black Wire (Marker—Running) 60*a*, Light Circuit 3 Input: Brown Wire (Clearance—Running) 65*a*, Light Circuit 4 Input: Yellow Wire (Left Turn) 70*a*, and Light Circuit 5 Input: Green Wire (Right Turn) 75*a*. These inputs are referenced to the Vehicle Ground wire (White Wire) 52.

Figure 9A:
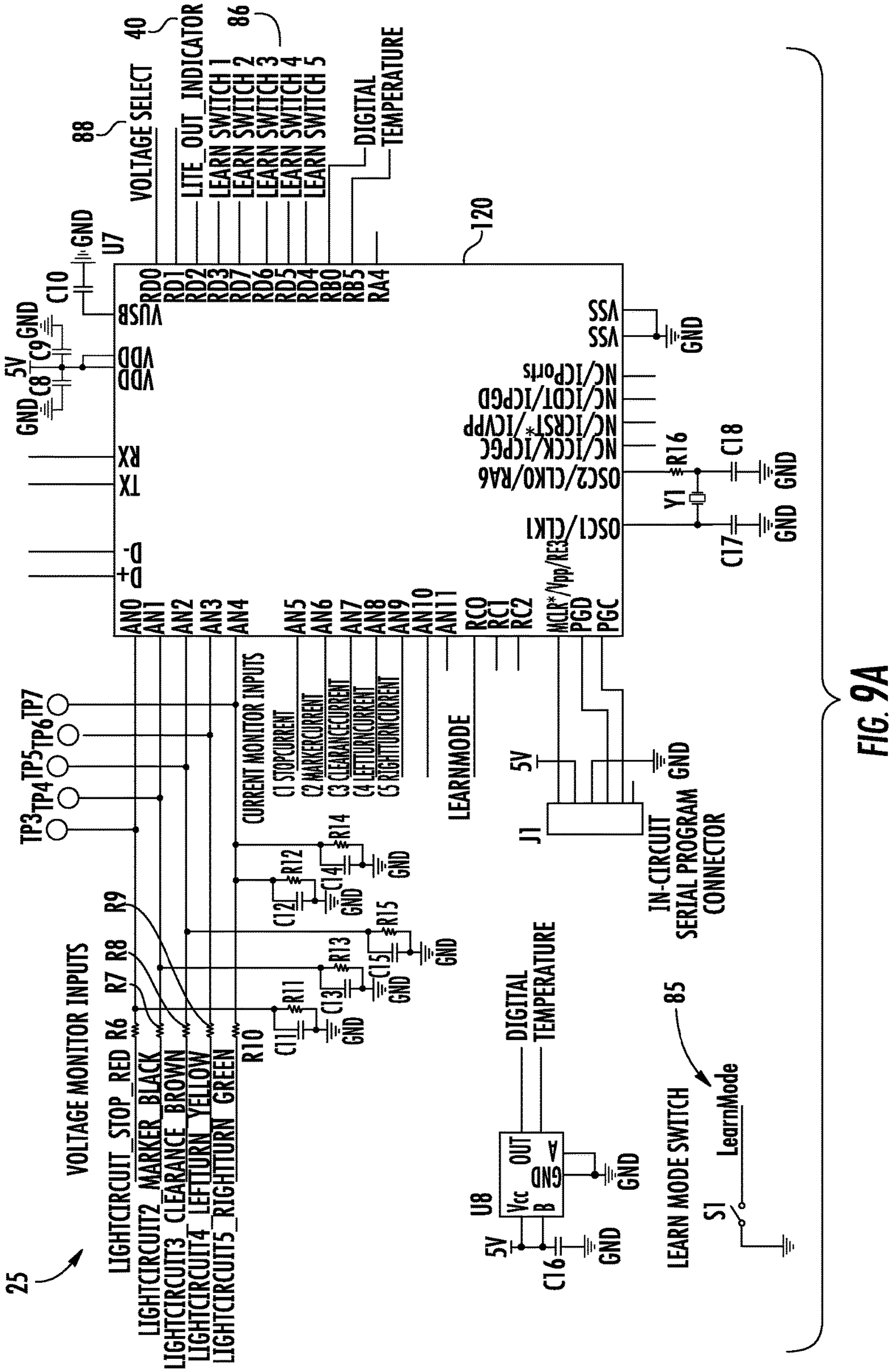
FIG. 9A is a circuit diagram of the voltage monitoring circuits of the light failure detection system.
Figure 9B:
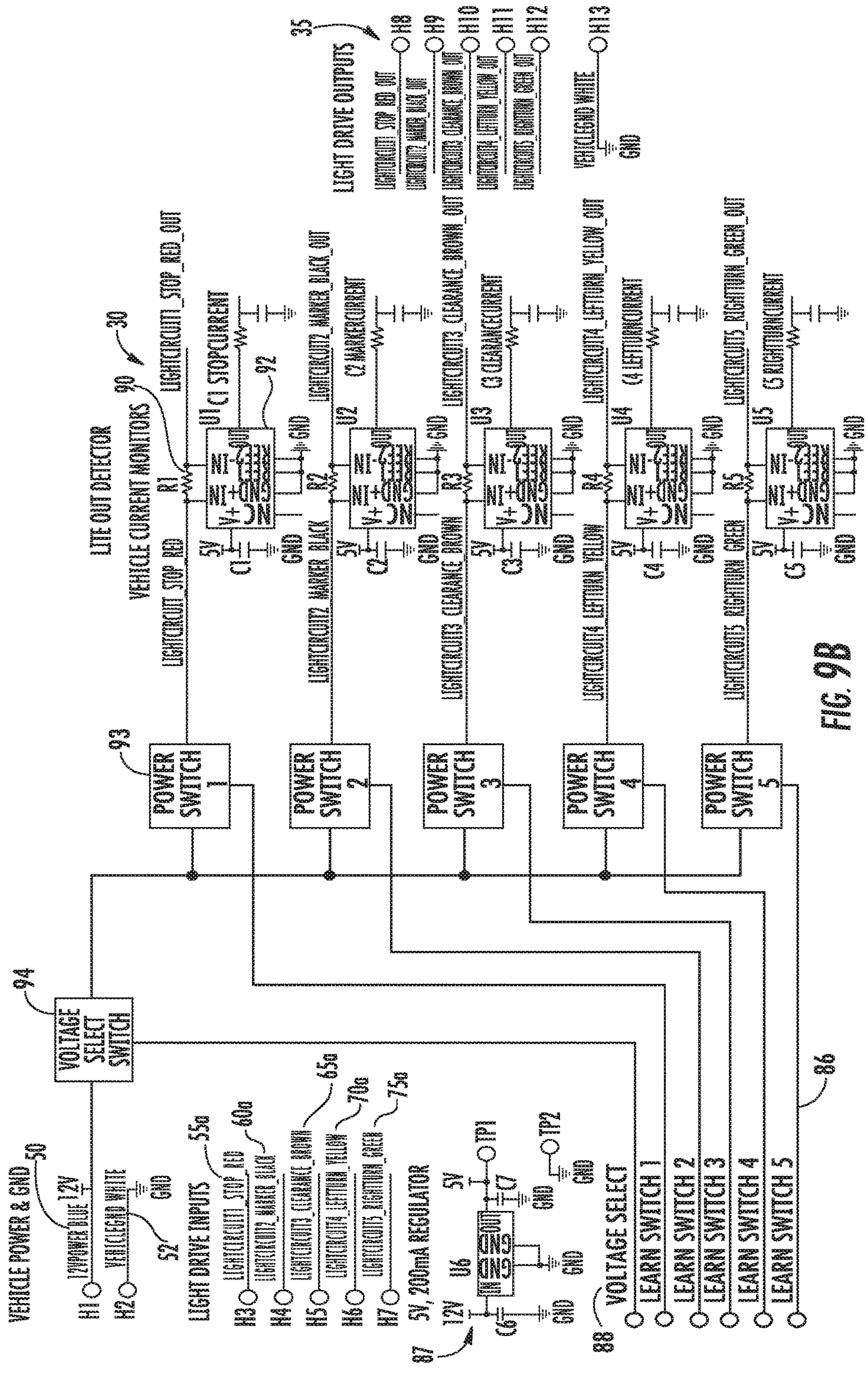
FIG. 9B is a circuit diagram of the current monitoring circuits of the light failure detection system.

The lighting circuits also include five discrete wire outputs 35 as shown in FIG. 9B. Plated PCB holes will allow attachment of pigtail wires that will make connection to the vehicle lighting circuit outputs. Five PCB holes accommodate the drive outputs for the vehicle lighting circuits. These circuits are typically capable of handling 15 Amps per circuit. These output connections are fed from the Light Drive Inputs 20. The lighting circuit outputs are: Light Circuit 1 Output: Red Wire (Stop) 55*b*, Light Circuit 2 Output: Black Wire (Marker—Running) 60*b*, Light Circuit 3 Output: Brown Wire (Clearance—Running) 65*b*, Light Circuit 4 Output: Yellow Wire (Left Turn) 70*b*, Light Circuit 5 Output: Green Wire (Right Turn) 75*b*, and Vehicle Ground Output: White Wire 76. Alternatively, ground may be picked up via a jumper wire outside the module.

Figure 9C:
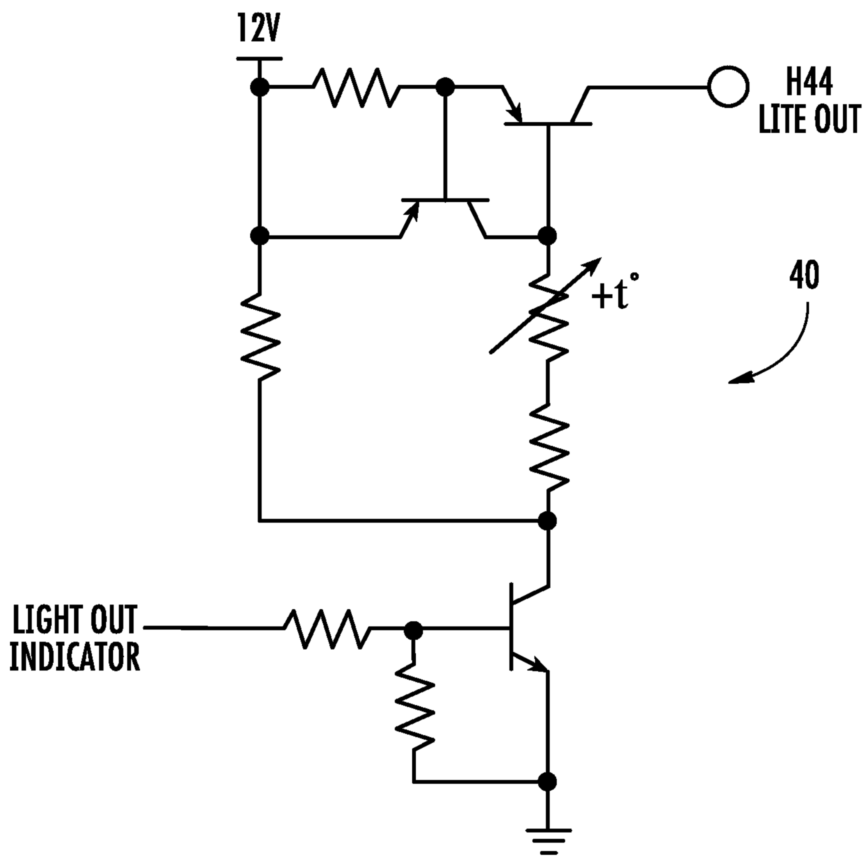
FIG. 9C is a diagram of a light failure switch of the light failure detection system.

The system includes a single wire light failure indicator output 40, as also shown in FIG. 9C. An abnormally low or high current level in any of the Light Drive inputs 20 will generate a 12 VDC level on the "Light failure Indicator" signal line. If no alarm is present, then this alarm output will be 0V. The Light failure signal will be equipped with a current limit function that will limit the current sourced to the indicator device (LED, buzzer, etc.) to about 200 mA. This current limiting function is implemented using analog circuitry to provide immediate (less than 1 microseconds) response to short circuit conditions.

In one embodiment, the light failure detection system also includes a J1708 compatible serial bus output, generally indicated at 45. A 2-wire bus will be made available via 3 wire connections including a ground reference. These wire output signals are summarized as follows: J1708 Data+: Black w/White Stripe Wire 80, J1708 Data –: White w/Red Stripe Wire 82, and Vehicle Ground: White Wire 84.

The light failure detection system also includes a push-button or toggle, momentary on-off learn mode activator switch 85 that is accessible by an operator. Activator switch 85, which may be a switch, allows an operator to place the unit into Learn Mode. In one embodiment, the learn mode is activated by flipping a switch, releasing the switch, and flipping the switch again. The Learn Mode will automatically exit upon completion of cycling through the set circuit combinations. Activator switch 85 may also be used to place the system into pre-trip inspection mode. Once activator switch 85 is activated for learn mode, learn switches 86 are activated in combinations to power each of five circuits in combinations. As shown in the embodiment of FIG. 8, there are five (5) learn switches 86.

The light failure detection system is also equipped with a voltage regulator 87 for converting the 12V input supply voltage to supply levels required by the Light failure electronics. For example, these levels may be 5.0V and 3.3V. A voltage select or voltage drop circuit 88 is also provided to allow the current and voltage of lighting circuits to be measured at normal and reduced input voltages. In addition, voltage on each Light Circuit is measured using a sampling circuit or voltage level monitor circuit 25 that draws no more than 0.2 mA from each input. Each voltage monitor circuit includes a voltage divider 89 tapped on to the lighting circuit. Voltage monitor circuits 25 feed into ten different analog to digital converter inputs on microcontroller 120. Typically, the converters are 12 bit A/D converters that will provide a resolution of approximately 12.5V/4096 counts=3 mVolts/count. The voltage monitoring circuit is shown in FIG. 9A.

Further, the light failure detection system measures the current draw on each Light Circuit using an OP-Amp based sampling current monitor circuit 30, as shown in FIG. 9B. Current monitoring is performed using a 0.01-ohm monitoring resistor 90 in series with each Light Drive signal line. At 15 A current levels, resistor 90 has a maximum voltage drop of 0.15 Volts. With a 40 A short circuit current level, resistor 90 has a maximum voltage drop of 0.40 Volts (no more than 0.25 second duration). The voltage across the current monitoring resistor 90 will be monitored using an OP-Amp circuit 92 that will draw no more than 0.2 mA from each Light failure circuit. The OP-Amp circuit 30 will provide a conditioned input to a 12 bit A/D converter that will provide a resolution of approximately 15 A/4096 counts=3.7 mA/count. This resolution assumes a 15 A maximum current draw in each circuit.

FIG. 9B also shows five learn switches 86 and five power switches 93 for applying power to the circuits from the 12V power Blue wire 50 depending on which of the five learn switches 86 are active. This provides operational conditions for microcontroller 120 to learn the current consumption characteristics of the system when a new lamp is installed. This process takes about 10 seconds to cycle through turning on and off the different circuits. A voltage select switch 94 is also provided in line with the voltage select circuit 88 and power wire 50.

The light failure detection system includes a fault indicator circuit 40 with an indicator light for indicating the status of the failure detection system. For example, in learn mode the fault indicator light 40 will solidly illuminate. Upon completion of the Learn Mode the fault indicator light 40 will go out. If there is a failed Learn Mode, then the indicator light will rapidly flash until the Learn Mode is reactivated and a complete Learn Mode is achieved. A faulted Learn Mode could include, but is not limited to: a short circuit, one of the circuits being on when Learn Mode was initiated, etc. All circuits are off during the Learn Mode since the Learn Mode will cycle through each of the combinations using the Auxiliary Power (BLUE) circuit to power the individual circuits to gather the current draw data for the microcontroller 120. For example, fault light indicator may display the following: Learn Mode—Continuous flashes—1 second on, 1 second off; Light Circuit 1 Fault—1 quick flash, 1 second off; Light Circuit Fault—2 quick flashes, 1 second off; Light Circuit 3 Fault—3 quick flashes, 1 second off; Light Circuit 4 Fault—4 quick flashes, 1 second off; and Light Circuit 5 Fault—5 quick flashes, 1 second off. Fault indicator light 40 may be mounted on the roadside corner of the vehicle trailer to be visible by the driver during normal conditions.

A temperature sensor 100 is also included for providing a temperature measurement from −55° C.~125° C. with a minimum of 1° C. accuracy. Temperature sensor 100 will be used by the control electronics to adjust the expected operational lamp current (Normal Light Drive Current Level) for temperature effects.

Light drive inputs 20 and light drive outputs 35 connect to a printed circuit board assembly using wires with terminals, such as 12 GA wires. In one example, light failure detection system 540 may use printed circuit board such as a standard green FR4, 0.062" thick, 4-layer PCB assembly. However, other circuit boards may be used.

Figure 10A:
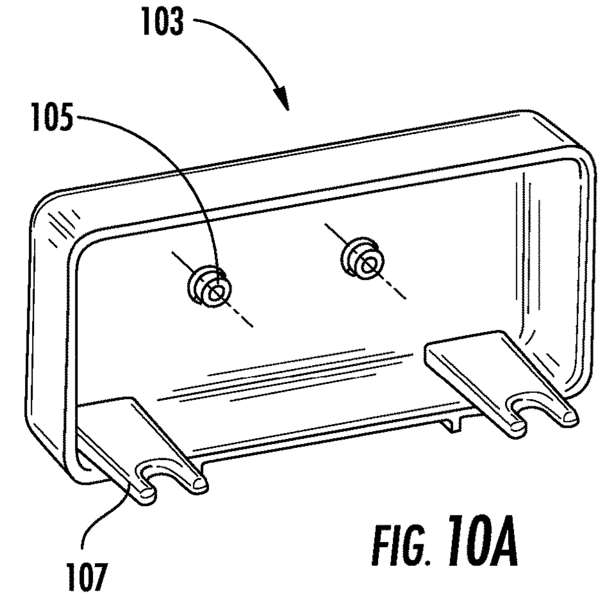
FIG. 10A is a back, perspective view of a mechanical enclosure of the light failure detection system.
Figure 10B:
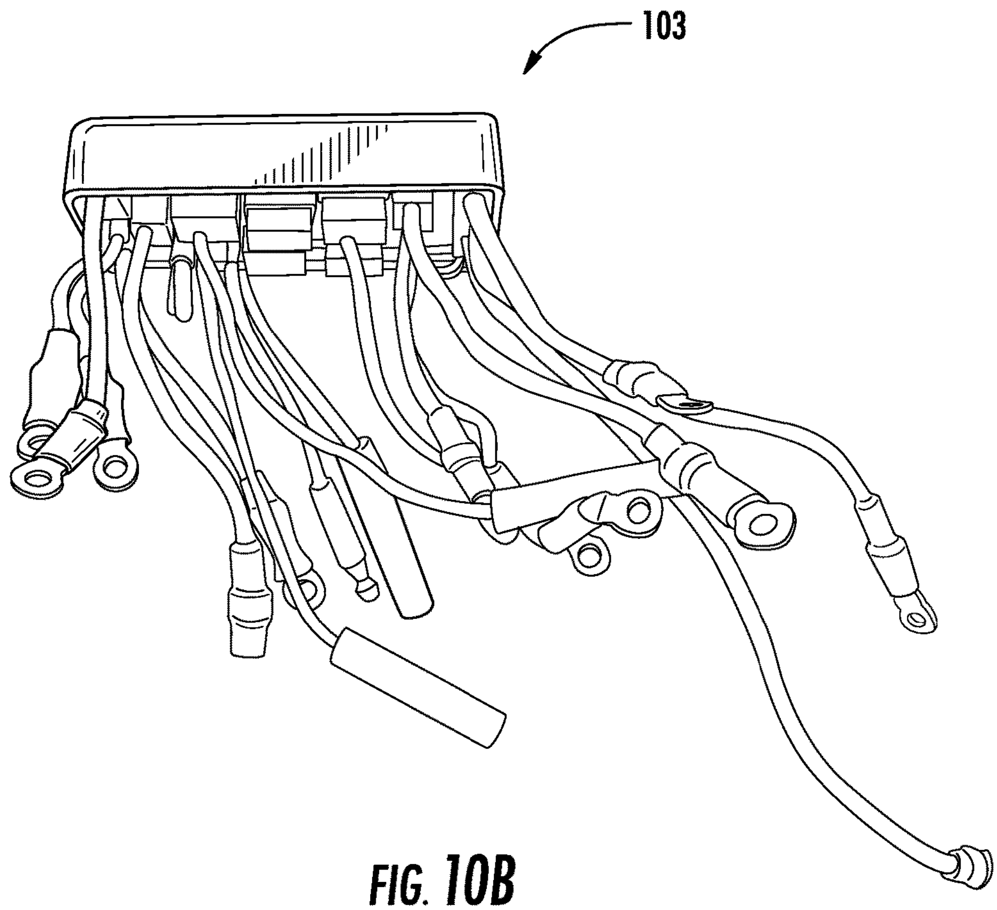
FIG. 10B is a back view of the light failure detection system with pre-trip inspection with a mechanical enclosure.

Further, light failure detection system includes a mechanical enclosure 103 for housing the light failure detection system electronics. One embodiment of a mechanical enclosure 103 is shown in FIGS. 10A-10B. Mechanical enclosure 103 includes holes 105 for receiving fasteners and projections 107 for facilitating attachment of light failure detection system 540 to a vehicle. Mechanical enclosure 103 is formed of a thermoplastic polymer such as Acrylonitrile butadiene styrene (ABS). Further, for example, the mechanical enclosure 103 may a width of about 4-5 inches, a height of about 1-2 inches and a depth of about 0.5 to 1 inch. A potting compound may be used to fill mechanical enclosure 103 following the installation of a circuit board and wires. The pigtail wires are installed prior to potting. The potting compound prevents visual and physical inspection of the Light failure electronics assembly and protects the circuitry from the elements. Mechanical enclosure 103 is mounted inside housing 110, as shown in FIGS. 11A and 11B.

Figure 11A:
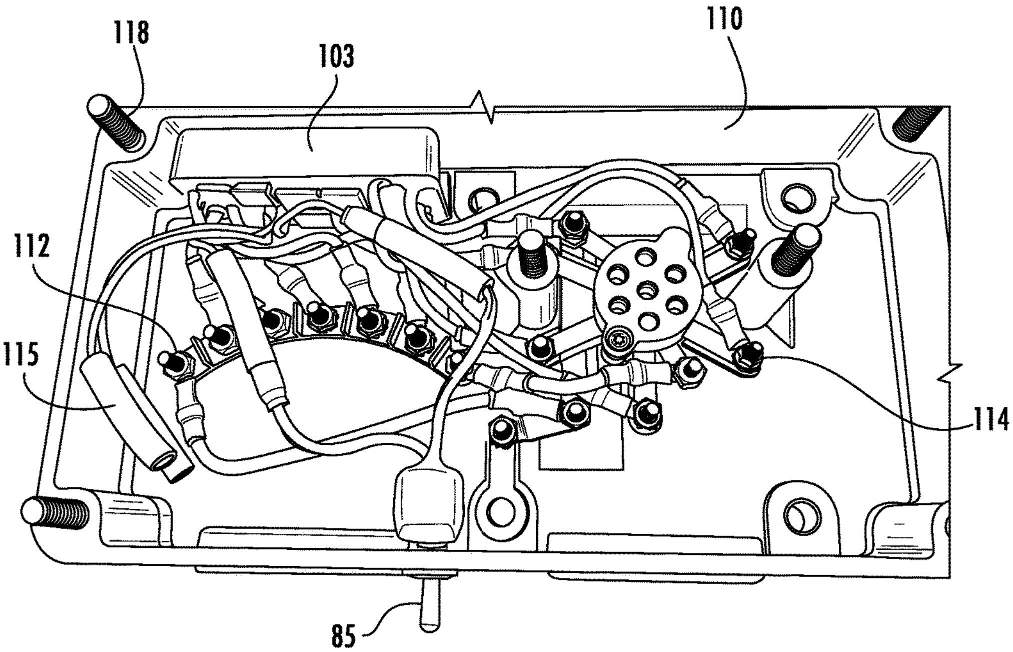
FIGS. 11A and 11B are front and back views of a housing for the mechanical enclosure.
Figure 11B:
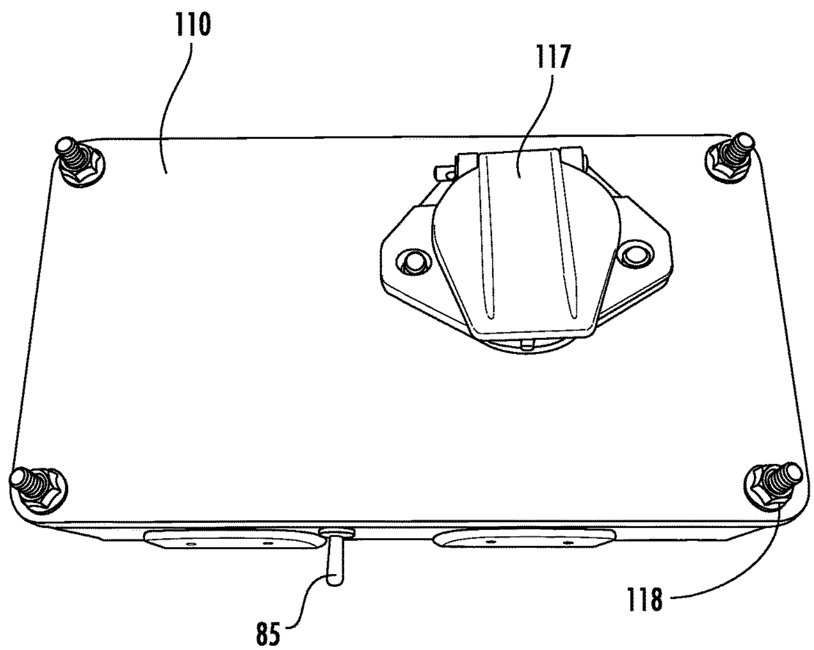

FIGS. 11A and 11B are back and front views of housing 110, respectively. Mechanical enclosure 103 fits within housing 110, as shown in FIG. 11A. Output connections, one of which is indicated at 112, and input connections, one of which is shown at 114, are also contained within housing 110. Input connections 114 are bussed to terminals that connect to a J560 nosebox. Receptacles 115 connect to fault lamp 40. Further, actuator switch 85 extends through an end of housing 110 to be accessed by a user. FIG. 11B shows a front side of the housing including a connection port 117. Housing 110 may be mounted to a vehicle trailer by fasteners 118.

Light failure detection system 540 includes a learn mode that is activated by an activator switch 85, such as a push-button or switch that allow the vehicle operator to place light failure detection system 540 in Learn Mode. In the learn mode, fault indicator light 40 will solidly illuminate. Upon completion of the Learn Mode the fault indicator light will go out. If there is a failed Learn Mode, then the indicator light will rapidly flash until the Learn Mode is reactivated and a complete Learn Mode is achieved. A faulted Learn Mode could include, but is not limited to, a short circuit, one of the circuits is on when Learn Mode was initiated, etc. It is important to have all circuits off when in Learn Mode since the Learn Mode will cycle through each of the combinations using the Auxiliary Power (BLUE) circuit 50 to power the individual circuits to gather the current draw data for the microcontroller 120. The Auxiliary power circuit 50 is activated when a coil cord is plugged into a nosebox. Initially, indicator light 40 will illuminate for about 10 seconds while the temperature sensor initiates and to indicate that indicator light 40 is functional. During the Learn Mode, the system uses the Auxiliary Power circuit (BLUE) to systematically power a plurality of combinations of the five Light Drive lines to monitor and record the voltage and current levels on the Light Drive lines. The current levels are stored in the EEPROM in microcontroller 120. Light failure indicator 40 is on during the Learn Mode and goes out upon successful completion of the Learn Mode. The Learn Mode will deactivate on its own following the completion of a successful Learn Mode cycle. At that time, light failure indicator 40 will turn off.

In operational mode, the light failure detection system provides a visual indicator to a vehicle operator that there is vehicle light malfunction. If a 12 VDC voltage is present on a light signal drive line, then the current level should be approximately equal to the maximum level recorded during Learn mode. Thus, a malfunction is determined by detecting a lower or higher than normal current level on the vehicle light system drive lines. the light failure detection system monitors the voltage and current levels on the Marker, Clearance, Stop, Left Turn, and Right Turn light signal drive lines (Light Drive Circuits 1-5) to detect the presence of a light system failure. Thus, the light failure detection system continuously monitors the voltage and current levels on all 5 circuits and looks for low or high current levels on those circuits that are energized. The current levels are compared against threshold levels that are established during the Learn mode. In order to determine the status, an operator flips the learn switch quickly, then flips it again and holds it to trigger the module to go into a report mode where it blinks in a pattern to indicate the status. The light failure detection system utilizes an algorithm for detection of Light failure conditions.

Further, the light failure detection system is equipped with microcontroller 120 for providing a variety of control functions and for storing information in an EEPROM. For example, microcontroller 120 monitors the voltage inputs 25 to determine when each lighting circuit is active and measures the currents in the Light Drive circuits to determine if the current levels are correct for the given input voltages. Microcontroller 120 also activates Light failure indicator switch 125 when a faulty light is detected. The Learn Mode, which monitors the voltages and currents on the lighting circuits and determines what the correct current levels are for a given circuit voltage, is also supported by microcontroller 120. Learn mode switch 85 is also monitored by microcontroller 120 to determine when an operator has activated the Learn Mode. Valid voltage and current levels, as determined by the learn mode, are also stored in non-volatile memory by microcontroller 120. In addition, microcontroller 120 also controls light out indicator 40 to indicate correct power function and to indicate when the Learn Mode is active (LED blinking). System temperatures are also monitored by microcontroller 120, which then adjusts lamp current thresholds to compensate for current changes with temperature. The system also adjusts the current thresholds based on the input voltage on each circuit.

The light failure detection system includes software capable of system initialization and health status monitoring, light drive current and voltage measurement, current threshold calculations used to set Light failure alarms, Learn Mode Functions, Light failure Indicator Switch Control, J1708 Serial Bus Message Input/Output, LED Indicator Control, Parameter Memory management, and Temperature Sensing and current threshold adjustment.

Figure 12A:
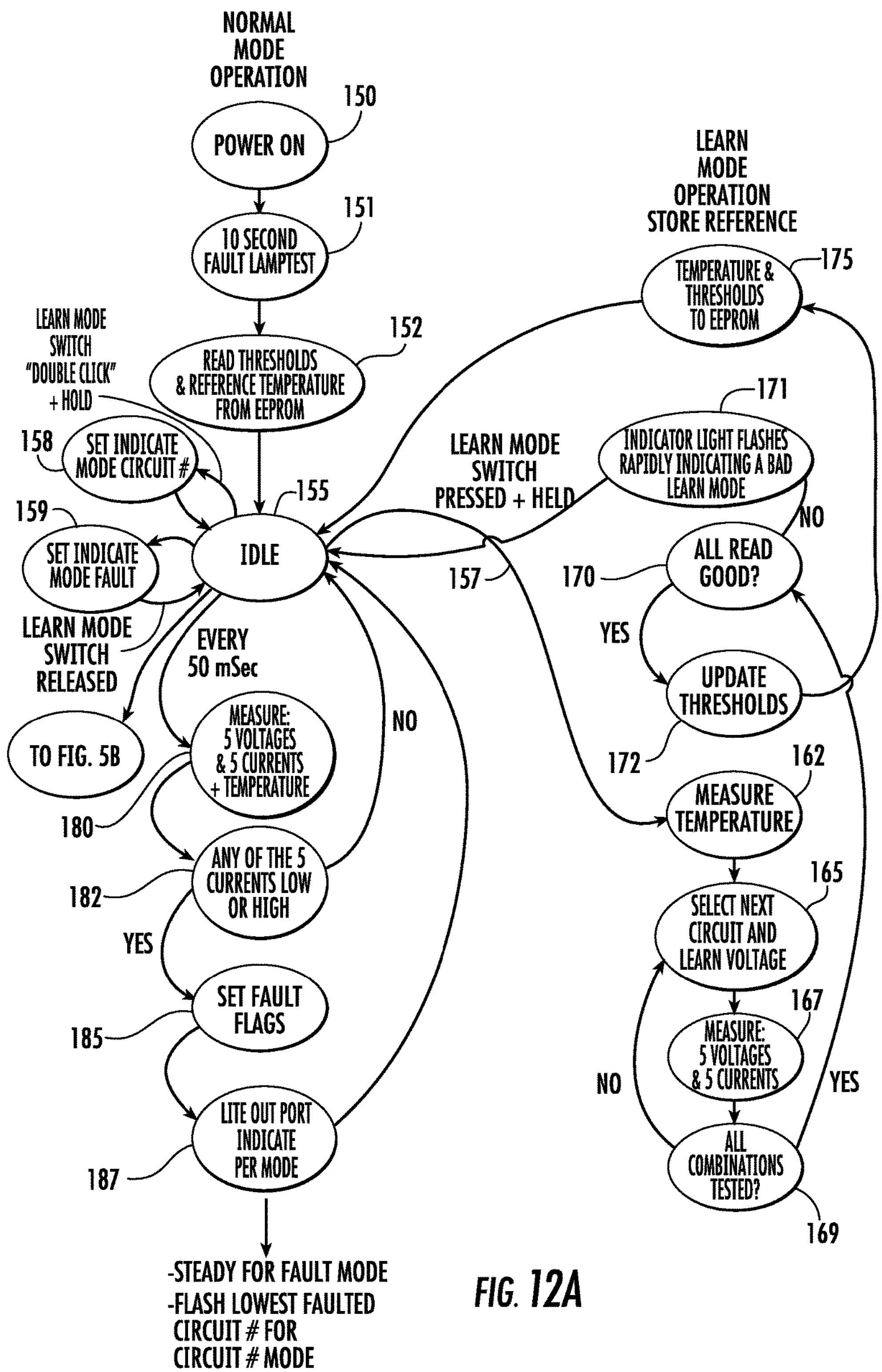
FIGS. 12A and 12B are a flow diagram of normal and learn modes of the light failure detection system with pre-trip inspection.
Figure 12B:
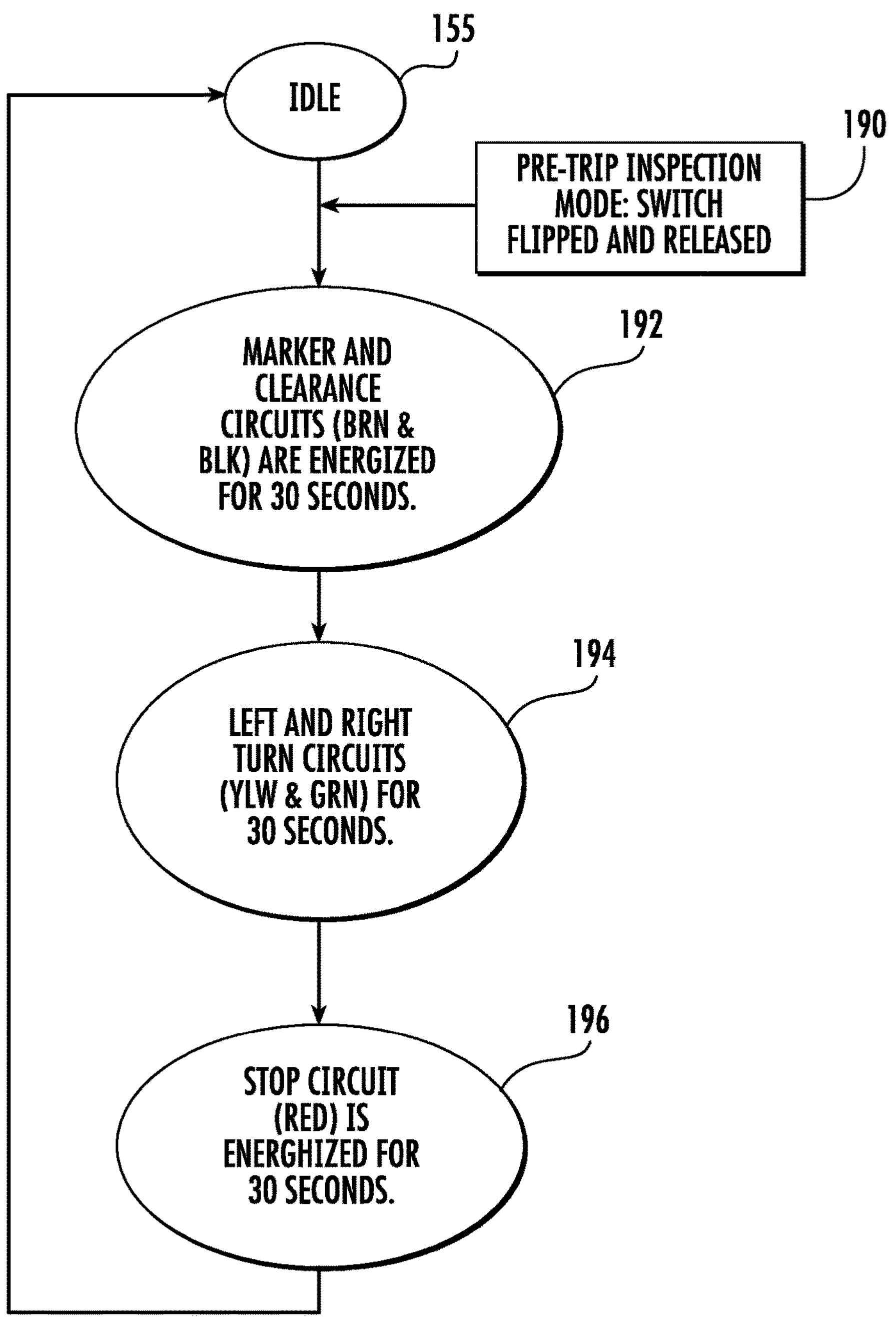
Figure 13A:
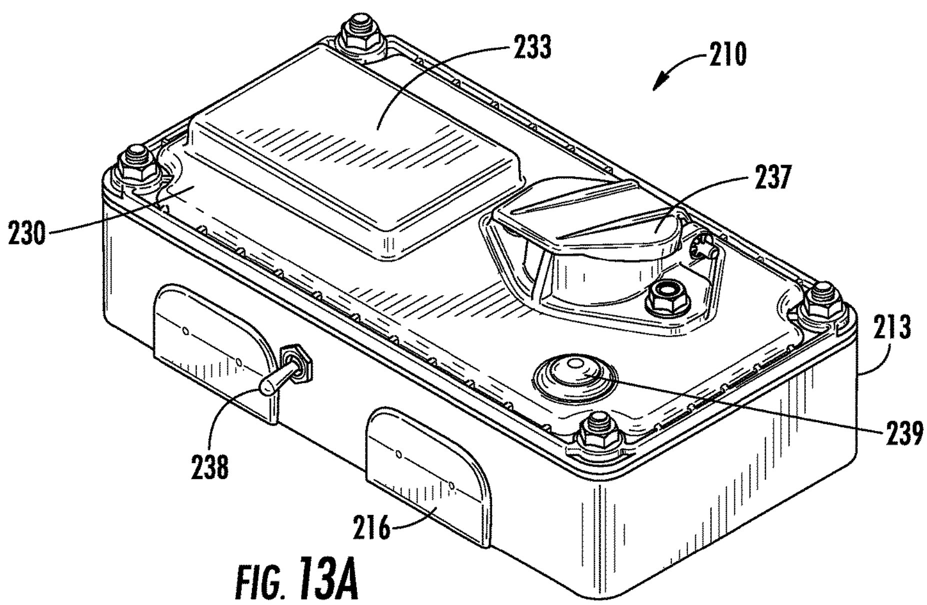
FIGS. 13A and 13B are perspective and top views of an additional embodiment of a light failure detection system.
Figure 13B:
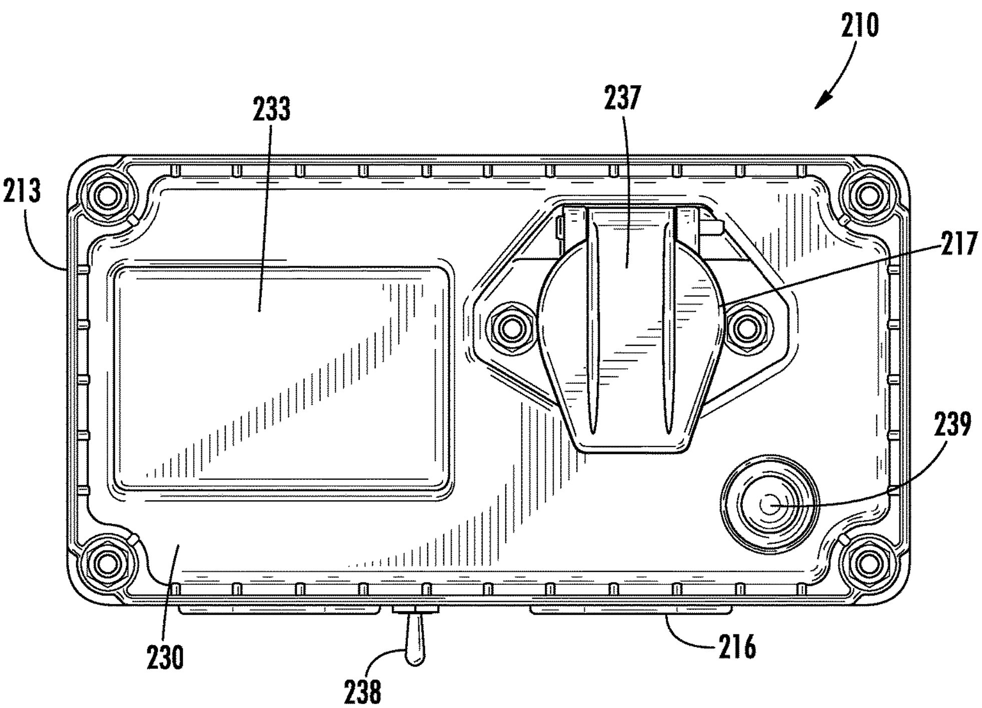
Figure 13C:
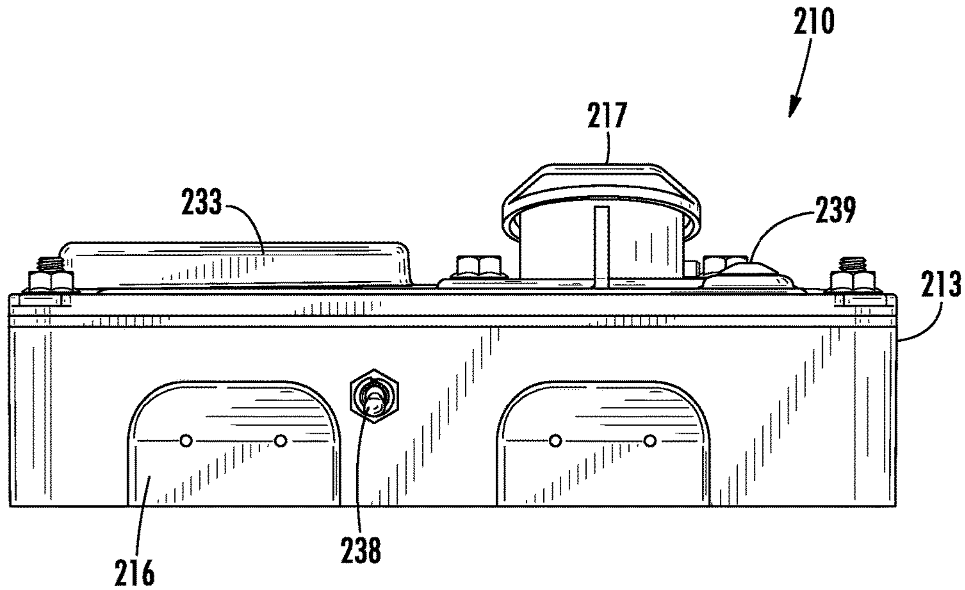
FIGS. 13C and 13D are side and end views of the additional embodiment of a light failure detection system.
Figure 13D:
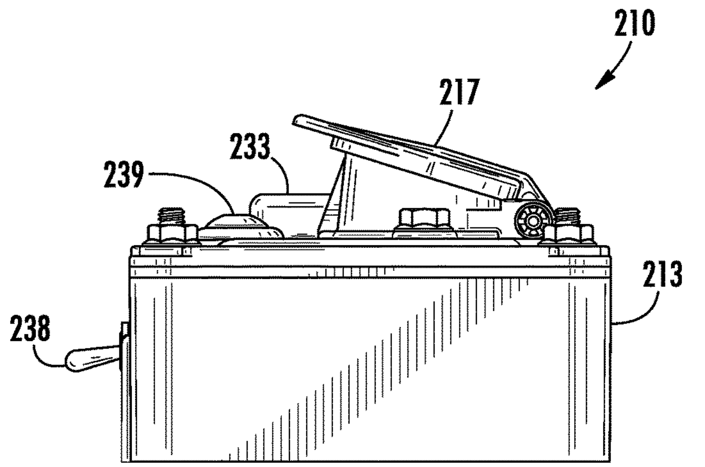

The light failure detection system is also equipped with a pre-trip inspection mode which allows an operator to check the operational status of the LED trailer lights, as described in FIG. 12B. Actuator switch 85 is flipped and released to activate the pre-trip inspection mode as shown in step 190. Initially, the Marker and Clearance (BLACK and BROWN) light circuits will be turned on for 30 seconds as shown in step 192. The Right Turn and Left Turn (GREEN and YELLOW) circuits will then be activated for 30 seconds as in step 194, followed by the Stop (RED) light circuit for 30 seconds as in step 196. This allows a driver to walk around a vehicle trailer to verify that the LED devices or lamps are working properly. Following the completion of the cycle of the Stop light circuit, the pre-trip inspection mode automatically turns off and the system goes into monitoring mode. The steps may be repeated to initiate another pre-trip inspection sequence.

The following table shows an example of the calculated maximum expected currents for each light drive circuit that the light failure detection system will be monitoring.

TABLE 2

Example Maximum Expected Current for Each Light Drive Circuit

| Lamp Type | Current Maximum (Amps) | # Lamps on Red Circuit "Stop" | # Lamps on Black Circuit Marker | # Lamps on Brown Circuit Clearance | # Lamps on Yellow Circuit Left Turn | # Lamps on Green Circuit Right Turn |
|---|---|---|---|---|---|---|
| ABS ECU | 7.1 | | | | | |
| Red Marker, Clearance (M/C) lamp | 0.065 | | 3 | 2 | | |
| License lamp | 0.140 | | | 1 | | |
| Amber M/C lamp | 0.065 | | 2 | | | |
| Stop/Tail/Turn lamp | 0.023 | | 2 | 2 | | |
| | 0.345 | 4 | | | 1 | 1 |
| Mid-turn Lamp | 0.1 | | | 2 | | |
| | 0.6 | | | | 1 | 1 |
| Total Current | | 1.38 | 0.371 | 0.516 | 0.945 | 0.945 |

Table 2 shows an example of an expected current for each Light Drive circuit as 1.38 Amps or less. Thus, the light failure detection system monitors a maximum of 5 Amps in order to handle any expected system growth and provide improved current monitoring resolution. For example, with a maximum 5 A draw (3.6× the expected current) the current monitoring resolution is 5 A/4096 Counts=1.22 mA/count. This resolution is adequate to successfully monitor current levels in each Light Drive circuit and detect failed lamps. An additional 7.1 A shows on the Red Stop circuit since the RED circuit goes to the ABS ECU. This is a temporary (10 seconds or less) 7.1 A current flow. The light failure detection system may indicate a fault during the time when this extra current is being drawn, which is acceptable system behavior. The system monitors a failed light condition up to 5 Amps per circuit, with a maximum per circuit of 15 Amps. Between 5 A and 15 A the effectivity of the system to monitor for a failed lamp decreases as the current increases.

The current thresholds used to determine the presence of a failed lamp are approximately 50% or less of the nominal current drawn of the lowest current lamp on the circuit. The current thresholds are defined as follows:

TABLE 3

| | |
|---|---|
| Circuit 1 (Red - Stop) | 8 mA |
| Circuit 2 (Black - Marker) | 8 mA |
| Circuit 3 (Brown - Clearance) | 8 mA |
| Circuit 4 (Yellow - Left Turn) | 8 mA |
| Circuit 5 (Green - Right Turn) | 8 mA |

The thresholds shown in Table 3 are the current variations (i.e. reductions or increases) allowed on an energized circuit before a fault is declared.

The current level on each of the circuits is dependent on which other circuits are energized since many of the lamps are driven by two different light circuits and share common circuitry. This common circuitry makes the current level on any circuit dependent on which other circuits are energized. The combinations of energized circuits shown in Table 4 are monitored in order to account for this dependency. Each row in the table is a combination of energized circuits.

TABLE 4

| Circuits Energized | | | | |
|---|---|---|---|---|
| Circuit 1 | | | | |
| Circuit 1 | Circuit 2 | | | |
| Circuit 1 | Circuit 3 | | | |
| Circuit 1 | Circuit 4 | | | |
| Circuit 1 | Circuit 5 | | | |
| Circuit 1 | Circuit 2 | Circuit 3 | | |
| Circuit 1 | Circuit 2 | Circuit 4 | | |
| Circuit 1 | Circuit 2 | Circuit 5 | | |
| Circuit 1 | Circuit 3 | Circuit 4 | | |
| Circuit 1 | Circuit 3 | Circuit 5 | | |
| Circuit 1 | Circuit 4 | Circuit 5 | | |
| Circuit 1 | Circuit 2 | Circuit 3 | Circuit 4 | |
| Circuit 1 | Circuit 2 | Circuit 3 | Circuit 5 | |
| Circuit 1 | Circuit 2 | Circuit 4 | Circuit 5 | |
| Circuit 1 | Circuit 3 | Circuit 4 | Circuit 5 | |
| Circuit 1 | Circuit 2 | Circuit 3 | Circuit 4 | Circuit 5 |
| Circuit 2 | | | | |
| Circuit 2 | Circuit 3 | | | |
| Circuit 2 | Circuit 4 | | | |
| Circuit 2 | Circuit 5 | | | |
| Circuit 2 | Circuit 3 | Circuit 4 | | |
| Circuit 2 | Circuit 3 | Circuit 5 | | |
| Circuit 2 | Circuit 4 | Circuit 5 | | |
| Circuit 2 | Circuit 3 | Circuit 4 | Circuit 5 | |
| Circuit 3 | | | | |
| Circuit 3 | Circuit 4 | | | |
| Circuit 3 | Circuit 5 | | | |
| Circuit 3 | Circuit 4 | Circuit 5 | | |
| Circuit 4 | | | | |
| Circuit 4 | Circuit 5 | | | |
| Circuit 5 | | | | |

Table 5 illustrates baseline currents and current drops due to multiple circuits being simultaneously energized with reference to the system outlined in Table 2.

TABLE 5

| Circuit Current (With other Circuits Energized) | Measured Current (mA) | Delta (mA) |
|---|---|---|
| C1 (none) | 414.0 | |
| C1 (C2) | 411.9 | 2.1 |
| C1 (C3) | 407.4 | 6.6 |
| C1 (C4) | 411.4 | 2.6 |
| C1 (C5) | 411.4 | 2.6 |
| C1 (C2 & C3) | 406.1 | 7.9 |
| C1 (C2 & C4) | 409.3 | 4.7 |
| C1 (C3 & C4) | 405.5 | 8.5 |
| C1 (C2 & C3 & C4) | 404.0 | 10.0 |
| C1 (C2 & C3 & C5) | 404.3 | 9.7 |
| C1 (C2 & C3 & C4 & C5) | 402.3 | 11.7 |
| C2 (none) | 307.9 | |
| C2 (C1) | 306.5 | 1.4 |
| C2 (C3) | 307.2 | 0.7 |
| C2 (C4) | 291.6 | 16.3 |
| C2 (C5) | 291.5 | 16.4 |
| C2 (C1 & C4) | 290.5 | 17.4 |
| C2 (C1 & C3 & C4) | 290.0 | 17.9 |
| C2 (C1 & C3 & C4 & C5) | 274.0 | 33.9 |
| C3 (none) | 277.9 | |
| C3 (C1) | 245.6 | 32.3 |
| C3 (C2) | 277.0 | 0.9 |
| C3 (C4) | 206.3 | 71.6 |
| C3 (C5) | 206.3 | 71.6 |
| C3 (C4 & C5) | 134.8 | 143.1 |
| C3 (C1 & C4 & C5) | 114.3 | 163.6 |
| C3 (C1 & C2 & C4 & C5) | 117.3 | 160.6 |
| C4 (none) | 441.7 | |
| C4 (C1) | 439.0 | 2.7 |
| C4 (C2) | 437.6 | 4.1 |
| C4 (C3) | 398.8 | 42.9 |
| C4 (C5) | 437.6 | 4.1 |
| C4 (C1 & C5) | 434.5 | 7.2 |
| C4 (C1 & C2 & C5) | 430.4 | 11.3 |
| C4 (C1 & C2 & C3 & C5) | 388.9 | 52.8 |

TABLE 5-continued

| Circuit Current (With other Circuits Energized) | Measured Current (mA) | Delta (mA) |
|---|---|---|
| C5 (none) | 449.2 | |
| C5 (C1) | 446.3 | 2.9 |
| C5 (C2) | 444.8 | 4.4 |
| C5 (C3) | 406.0 | 43.2 |
| C5 (C4) | 446.5 | 2.7 |
| C5 (C1 & C2) | 442.1 | 7.1 |
| C5 (C1 & C2 & C4) | 439.4 | 9.8 |
| C5 (C1 & C2 & C3 & C4) | 398.4 | 50.8 |

LED Status indicator light 40 is configured to alert an operator of the status of light failure detection system 540. For example, if LED Status indicator light 40 is OFF at power up then the threshold values have not been set. If LED Status indicator light 40 is OFF after completing a Learn Mode, then all of the thresholds have not been set and the Learn mode must be repeated. All 15 combinations of circuit activation must be implemented to complete the Learn mode. If LED Status indicator light 40 is ON, without blinking, then all thresholds are set, Power is on, and No faults are present. Fault conditions are indicated by the following blink patterns: 1 Blink: Fault on Circuit 1; 2 Blinks: Fault on Circuit 2; 3 Blinks: Fault on Circuit 3; 4 Blinks: Fault on Circuit 4; and 5 Blinks: Fault on Circuit 5.

FIG. 12A illustrates a flow diagram of Normal and Learn modes of operation of light failure detection system 540. Initially, a power on button or switch is activated as indicated at 150 and a 10 second fault lamp test is performed as indicated at 151. Stored threshold values and reference temperatures are then read from the non-volatile memory in the microcontroller (EEPROM) as shown at 152. The system then transitions into an idle state as indicated at 155. From idle state 155 a learn mode switch may be triggered by pressing and holding the learn mode switch as shown at 157. Alternatively, the learn mode switch may be double clicked and held in order to set a mode circuit number as shown in 158 or to set a mode fault as shown at 159. If the switch is pressed and held to trigger the learn mode 157, the system initially measures the temperature 162. The next circuit and learn mode voltage is then selected as indicated at 165. The current and voltage is then measured for each of the five circuits in 167. If all combinations have not been tested, as required in step 169, the system returns to step 165 and selects the next circuit and learn mode voltage and the performs step 167 of measuring the current and voltages for each circuit. If it is determined that all combinations have been tested, the system determines if all reads are acceptable in step 170. If all reads are acceptable, the threshold and temperatures are updated as indicated in step 172. The system then transitions to Normal Mode and the observed current levels (thresholds) are stored in non-volatile memory in the microcontroller in step 175. In one embodiment, during Learn Mode the system monitors the voltage level on the 5 light circuits and stores these Calibration Voltage levels in Non-volatile memory. The system then transitions into an idle state as shown in 155. If all reads are not acceptable in step 170, the system will create a rapid flash on the fault lamp indicating a failed learn mode as shown in step 171. It will remain in this state until the Learn Mode is reactivated and a successful learn has been achieved.

At system start the current thresholds are read from non-volatile memory in step 152 and used as the baseline "working" current levels for each circuit combination. These baseline current thresholds are adjusted as needed for changing voltage and temperature. The system transitions to idle state 155 and then measures the voltages and currents every 50 mSec as indicated in step 180. If any of the measured currents are low or high, as noted in step 182, the following steps are performed for each light circuit. Initially, it is determined which Light Circuits are energized. It is then determined which of the baseline circuit thresholds should be used. The baseline threshold is then adjusted for Voltage and temperature. The newly measured current level is then compared to the voltage/temperature adjusted threshold. If the new current measurement is lower or higher than the adjusted threshold by the amount listed in Table 2, then a fault flag is set for that circuit in step 185. The light out port is illuminated as noted in step 187. Typically, three consecutive failed readings are necessary to trigger the fault lamp in order to reduce false positive readings. Once a failure is detected an operator may flip and hold the momentary switch, which causes the fault lamp to blink the circuit number where the failure was found. Releasing the momentary switch puts the module back in to monitoring mode.

A voltage drop circuit that can be switched on or off is coupled to the Auto-Learn circuits. The current and voltage measurements are taken at both voltages and stored. This allows the voltage sensitivity and detection threshold of each circuit to be computed directly regardless of the circuit's configuration. Temperature correction calculations are proportional to the current measured during calibration rather than additive. Further, the Learn process detects circuits that share current and change the calculations when both current sharing circuits are on at the same time. Current amplifier offsets are also measured during the Learn process. Offset corrections are applied when open circuits are detected during the Learn mode.

Different LED lamps have different configurations of LEDs, Resistors, and Diodes. Each configuration responds differently to a change in voltage. Dual brightness lamps (Stop/Tail or Mid-Turn) have additional effects that appear when both high and low brightness circuits are activated at the same time.

For example, voltage sensitivities may be as follows: Marker lamp: nominal 60 mA, sensitivity 5.5 mA/Volt; License lamp: nominal 140 mA, sensitivity 14 mA/Volt; Stop/Tail lamp, High circuit: nominal 220 mA, sensitivity 80 mA/Volt; and Stop/Tail lamp, Low circuit: nominal 43 mA, sensitivity 10 mA/Volt. The sensitivity slopes proportional to the nominal current varies due to different LED string lengths and different resistor values: i.e., Marker lamp sensitivity slope=5.5/60=0.092 mA/mA/Volt and Stop lamp sensitivity slope=80/220=0.364 mA/mA/Volt.

It has also been discovered that in a Stop/Tail lamp when a High brightness circuit is active, the current in the low brightness drops to zero. Further, in a Mid-Turn lamp, when both the high and low brightness circuits are active, the current is shared between the two circuits. The percentage split in this sharing is very sensitive to the voltage difference between the two circuits. Therefore, the current in each circuit may be unpredictable. For example, a 0.1 Volt change in the low brightness circuit voltage can halve or double the current in the low circuit side of the lamp. However, the sum of the currents provided by each circuit is consistent. The affected circuits containing these types of lamps can be readily detected during calibration and have appropriate detection calculations applied.

Laboratory measurements of the voltage sensitivity of various LED lamps also showed that resistance dominates in the effects over the voltage range of 10.5 Volts to 14.5 Volts. The sensitivity is relatively constant over this voltage range. The measured variation from constant ranged from 0% to +/−6.5%. The higher percentages were present in lamps that operate at higher current and have a higher margin for error in detection of lamp out current differences.

Example lamp configurations and their resulting voltage sensitivities are as follows: Four Marker lamps and two Stop/Tail lamps on a tail circuit use 326 mA total and have a sensitivity of 42 mA/Volt. If four more Marker lamps are added to the circuit, the usage is 566 mA total with a sensitivity of 64 mA/Volt. When a License lamp is moved to the Marker circuit the usage is 706 mA total with a sensitivity of 78 mA/Volt.

The allowed difference between the measured current (C_now) and the adjusted reference current (T-adjusted threshold) is the current delta. This number is based on ¼ of the lowest current lamp used in each circuit operating at the lowest functional voltage (10.5 Volts). It is currently 8 mA for circuits incorporating single LED marker or clearance lamps and 100 mA in other circuits.

In the learn mode, thresholds and voltage sensitivities are calculated. For example, the current (C_low) and voltage (V_low) are measured at a reduced voltage. In addition, the current (C_high) and voltage (V_high) are measured at normal input voltage. The normal input is a variable that depends on the vehicle powering up the system. For example, the normal input voltage may be about 13.0 V. The reduced voltage is 0.7V lower than the normal input voltage. The measured values for C_high and V_high are used as the reference values for detection (C_ref and V_ref). The voltage sensitivity is determined by: Sensitivity=(C_high−C_low)/(V_high−V_low). For example, the sensitivity is calculated as follows: 45 mA/V=(0.564 A−0.532 A)/(13.5V−12.8V).

The process is repeated for each circuit combination. The temperature (T_ref) is also measured during the learn process. The system also detects Shared Circuits. Initially, the currents are measured for the single active circuit configurations. The currents are then measured for each two-circuit configuration. If the current for a two-circuit configuration is less than the one-circuit current by at least 15 mA for both circuits, then it is determined that the circuits share current. The combination is then flagged for a "Shared Current" detection calculation.

If an active circuit combination is determined to be a shared current combination the sum of the active currents (C_now) and the sum of the adjusted C_ref currents is calculated. The sums are compared. The largest allowed current delta among the active circuits is selected and the lower limit is set to this value. If allowed current deltas are different among the active circuits, then the upper limit is set to a predetermined value. For example, the upper limit may be set to 3 times the lowest current delta or another value. If the current deltas are not different among the active circuits, then the upper limit is the allowed current delta. It only applies to over current (a much rarer condition) in the circuit when shared lamps are being activated by multiple circuits. When the shared lamp is being activated by a single circuit then the regular upper limit will apply and a smaller over current will be detected.

Voltage and temperature corrections are performed to determine the adjusted reference current (T-adjusted threshold). The voltage adjusted threshold is determined as follows: V-adjusted threshold=C_ref+((V_now−V_ref)*Sensitivity). A temperature correction is then performed. Initially, a T_const (a laboratory measured value) is selected based on the active circuit and T_now greater or equal to T_ref; T_now less than T_ref and T_now greater or equal to zero degrees C.; and T_now less than T_ref and T_now less than zero degrees C. For example, T_const may be 0.002 A/A/C. The temperature adjusted threshold is calculated as follows: T-adjusted threshold=V-adjusted threshold*(1+(T_const*(T_now−T_ref))).

If C_now is less than (T-adjusted threshold−lower limit) or C_now greater than (T−adjusted threshold+upper limit) then there is a lighting circuit fault (activate fault indication). If it is a shared circuit the C_now sum, sum of T-adjusted thresholds, and modified limits are used to determine a lighting circuit fault.

In one embodiment of telematics Road Ready system 500, an additional embodiment of a light failure detection system 210, as shown in FIGS. 13A-17, is configured to communicate with MCU 525 or external device (such as a Tr/IPS™ MCU (Master Control Unit) by TrackPoint Systems, LLC of Nashville, Tenn.). The telematics system 500 sends, receives and stores data acquired from light failure detection system 540 or 210 and communicates the data to external display devices through radio frequency power line carrier or light (fiber optic) communication. It should be understood that telematics system 500 may include either light failure detection system 540, as previously described, or light failure detection system 210, as described herein. Light failure detection system 210 is capable of multi-volt operation, such as 12V/24V, 10-30V, and 10-42V. Further, light failure detection system 210 includes LED and Incandescent Lamp capabilities (capable of determining current between LED/Incandescent), monitoring of Anti-Lock Brake System (On/Off), battery power for un-tethered operation to facilitate: Asset Location Determination and/or Asset Remote Diagnostic Check. Light failure detection system 210 may be used in conjunction with multiple trailer configurations (PUP's) and additional sensors including wireless (Radio Frequency (RF) or Optical) or hardwired sensors.

Figure 14:
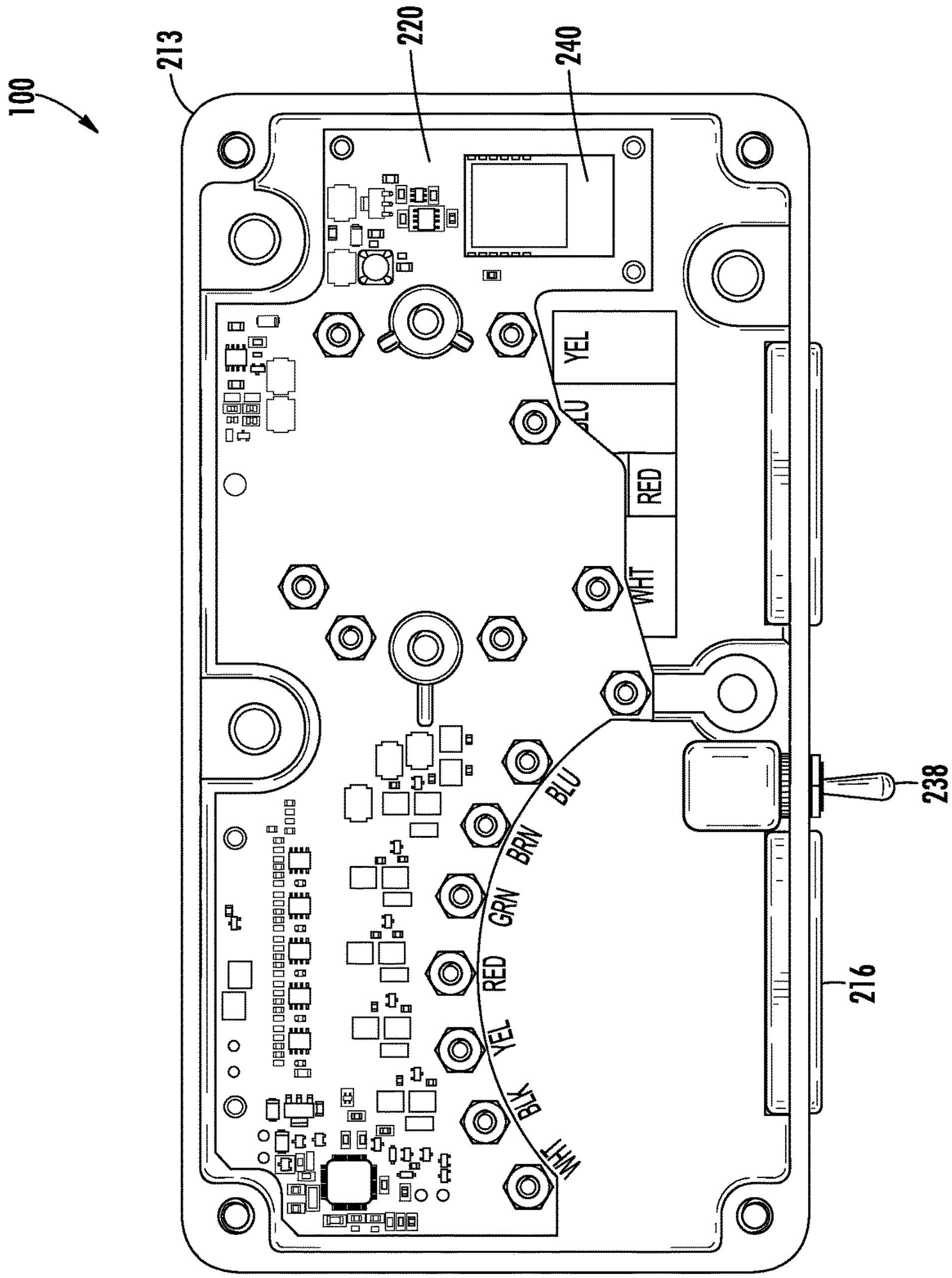
FIG. 14 illustrates the circuit board of the light failure detection system.
Figure 15:
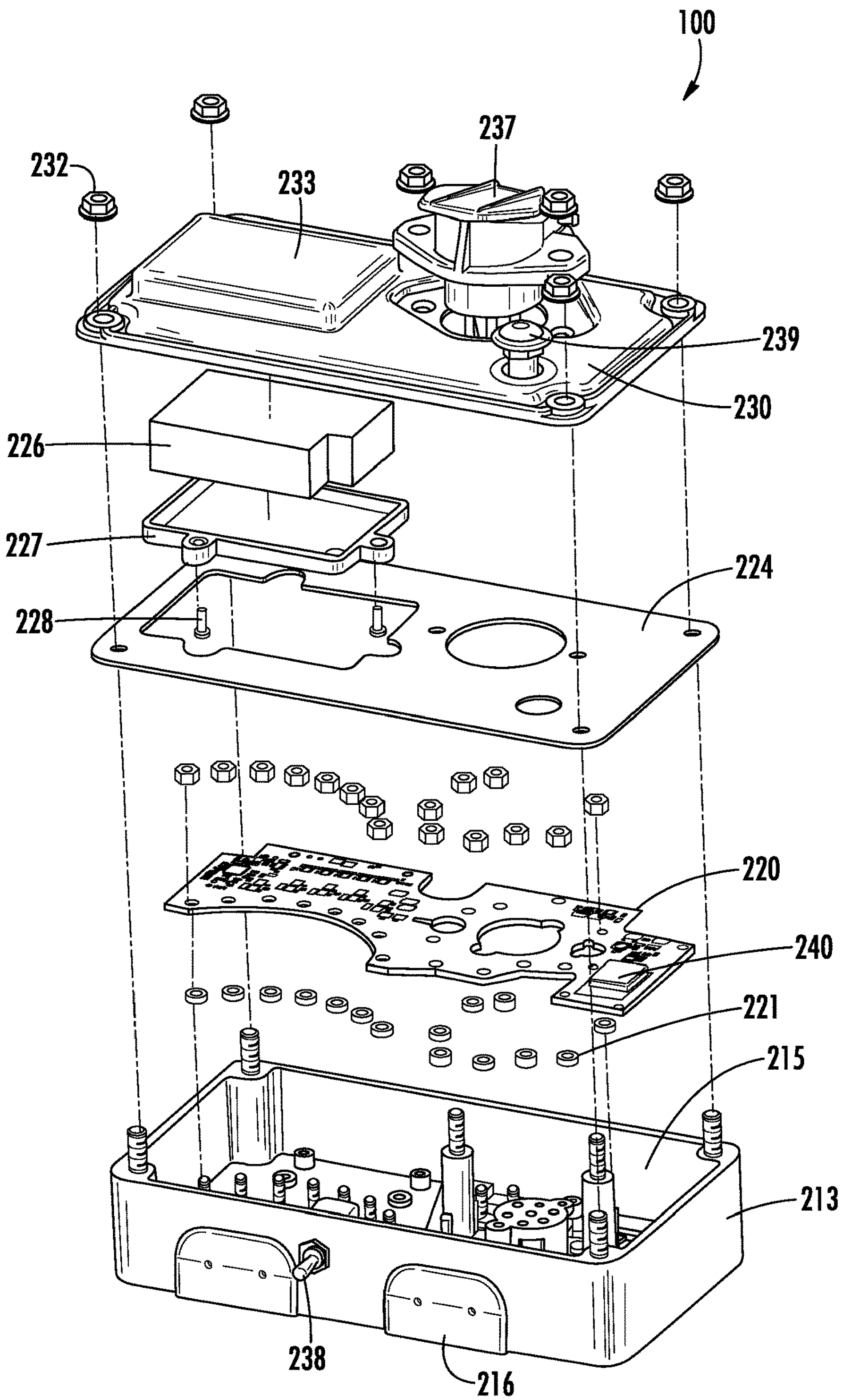
FIG. 15 is an exploded view of the light failure detection system.

Light failure detection system 210 includes a housing 213 as shown in FIGS. 13A-13D. FIGS. 13A, 13B, 13C, and 13D are perspective, front, side and end views of housing 213, respectively. FIG. 14 is a top view of a circuit board assembly within a nosebox housing 213 and FIG. 15 is an exploded view of light failure detection system 210. Nosebox housing 213 includes an interior space 215 for receiving a light failure detection circuit board 220. Cable grommets 216 are also provided on housing 213. Spacers 221 are positioned under circuit board 220 and a cover gasket 224 is positioned over circuit board 220. A rechargeable lead-acid battery 226 and battery cover 227 are also provided and aligned with battery cover fasteners 228. Nosebox cover 230 is positioned over housing 213 and is secured with hex flange nuts 232. Cover 230 includes a protruding pocket 233 for accommodating battery 226. A SAE J560 socket receptacle 237 is mounted to nosebox cover 230. Light failure detection system 210 also includes activator switch 238 and indicator light 239.

Light failure detection system 210 may include a wireless transmitting device with a communication protocol such as: Zigbee, Bluetooth, etc. that will transmit signals to MCU 525 or other remote device such as a laptop, tablet, or cell phone. In the depicted embodiment, a Zigbee transceiver 240 is mounted to circuit board 220.

Figure 16:
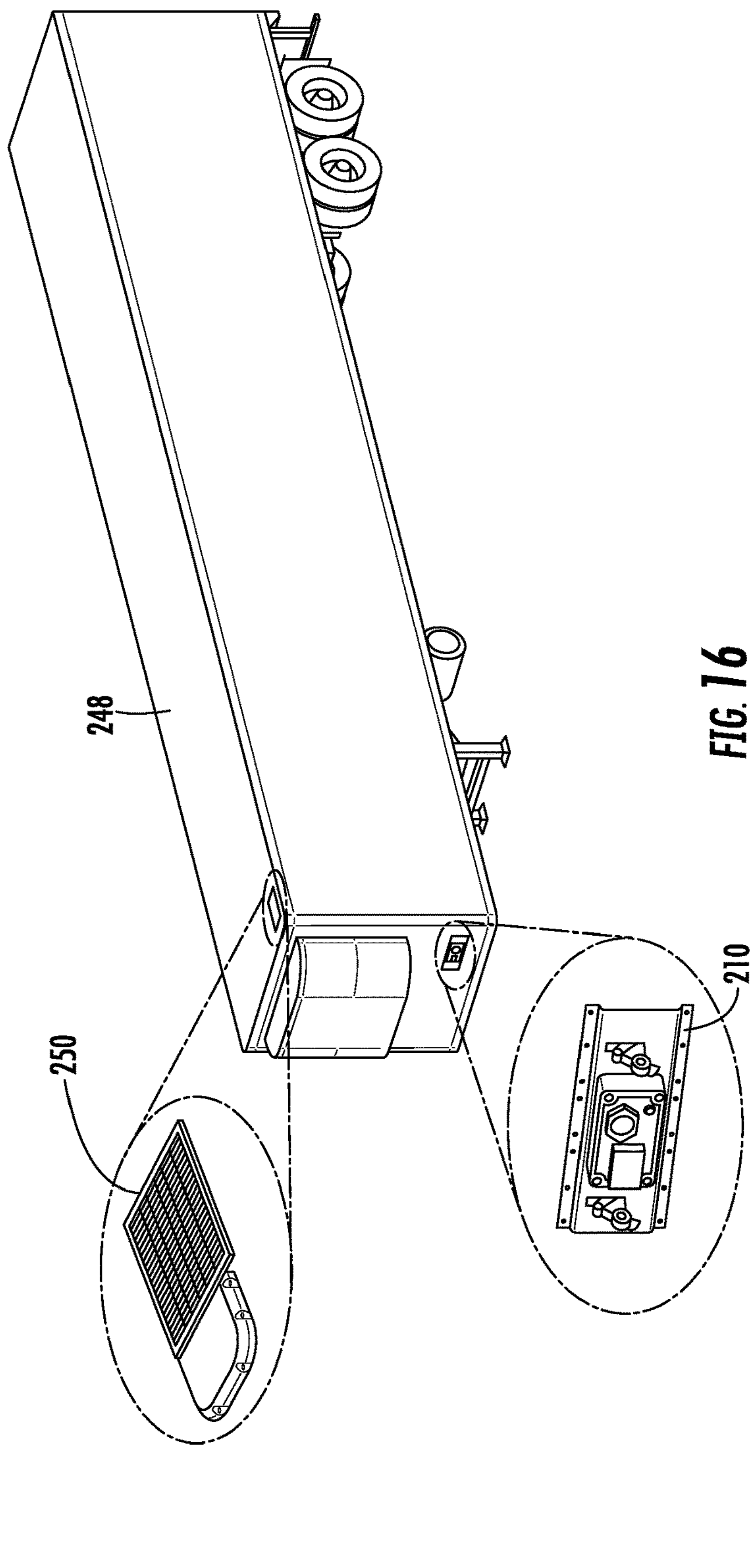
FIG. 16 illustrates the light failure detection system and master control unit coupled to a trailer.
Figure 17:
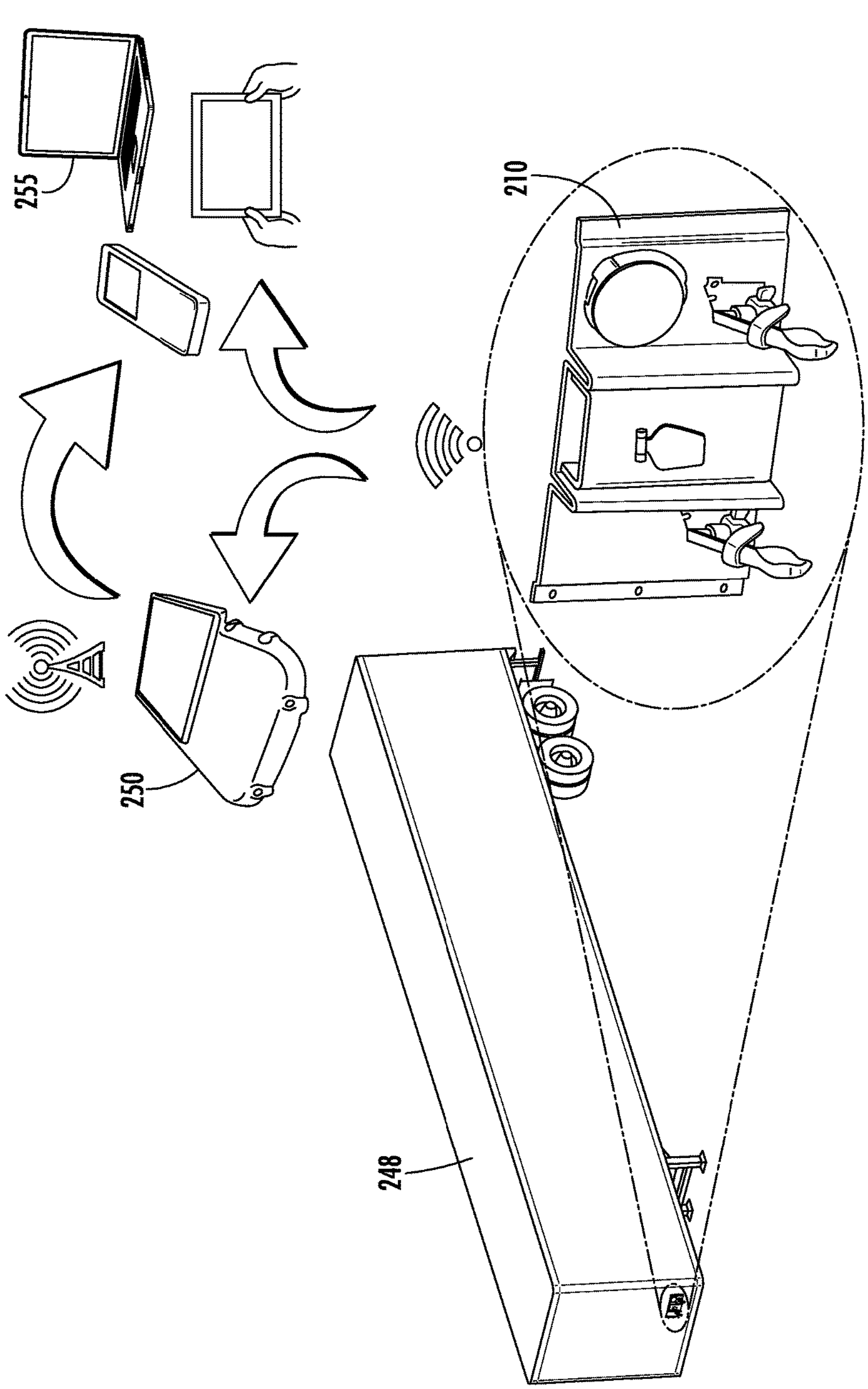
FIG. 17 illustrates the light failure detection system attached to a trailer and in communication with the master control unit, which is in communication with a remote user interface.

FIG. 16 illustrates light failure detection system 210 and MCU 525 attached to trailer 248. FIG. 17 illustrates the light failure detection system 210 attached to a trailer 248 and in communication with MCU 525, which is in communication with a remote user interface 255. As shown in FIGS. 12 and 13, light failure detection system 210 includes circuitry to analyze light emitting diode (LED) performance through the trailer's wiring harness. The light failure detection system 210 includes a long-range RF wireless module 240 and battery 226 for untethered LED monitoring. A toggle switch 238 is provided for pre-trip light inspections and LED failure analysis. Light failure detection system 210 monitors each lighting circuit independently and reports each circuit individually with real-time current readings. The onboard temperature chip even takes temperature readings into consideration when calculating the measured currents ensuring accuracy. Battery powered functionality allows for remote, website-initiated light checks. All LED failures are reported to the end user in real-time. All drop and hook activities are logged with a time and location stamp on a web-interface and the tractor's power coil voltage is displayed on the user dashboard.

Figure 18A:
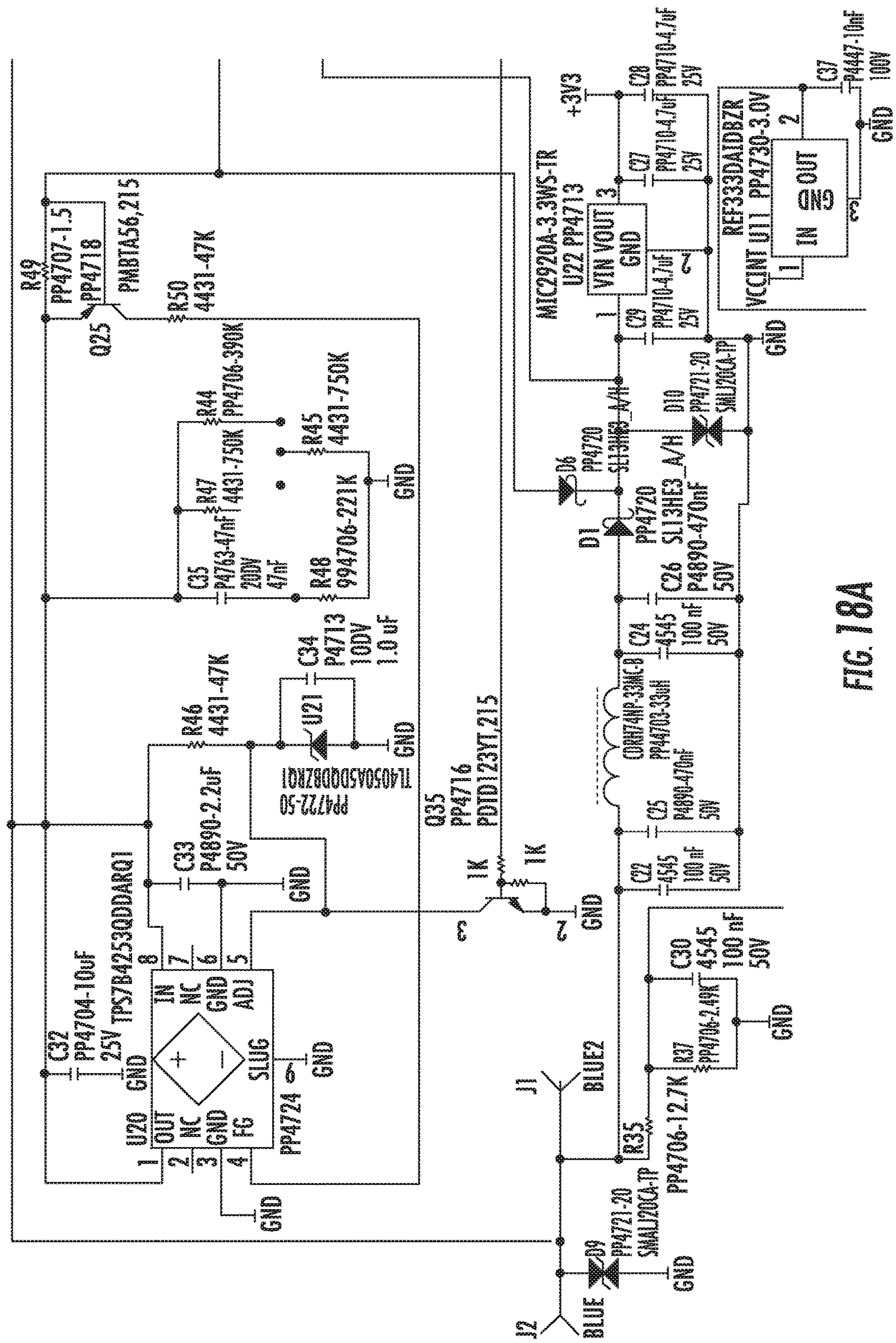
FIG. 18A is a circuit diagram of a light failure detection system showing filtering elements.

Detailed circuit diagrams of the light failure detection system 210 are is shown in FIGS. 18A-18I. In FIG. 18A the connection to the blue circuit is shown as well as elements to provide filtering, to provide 3.3V and 3.0V regulated voltages, and to provides charge voltage to battery.

Figure 18B:
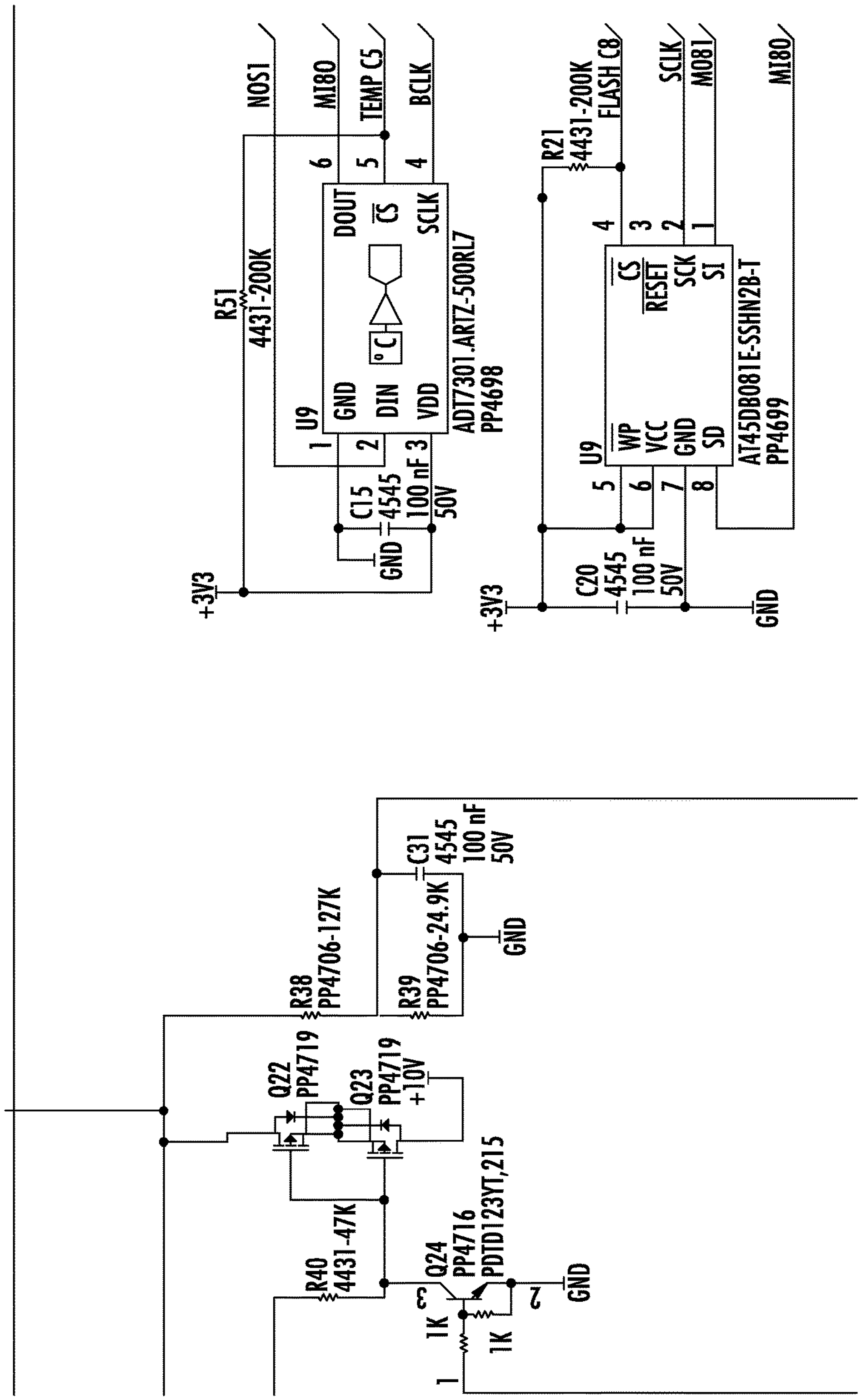
FIG. 18B is an additional circuit diagram of the light failure detection system illustrating a temperature sensor and extra memory for a microcontroller.
Figure 18C:
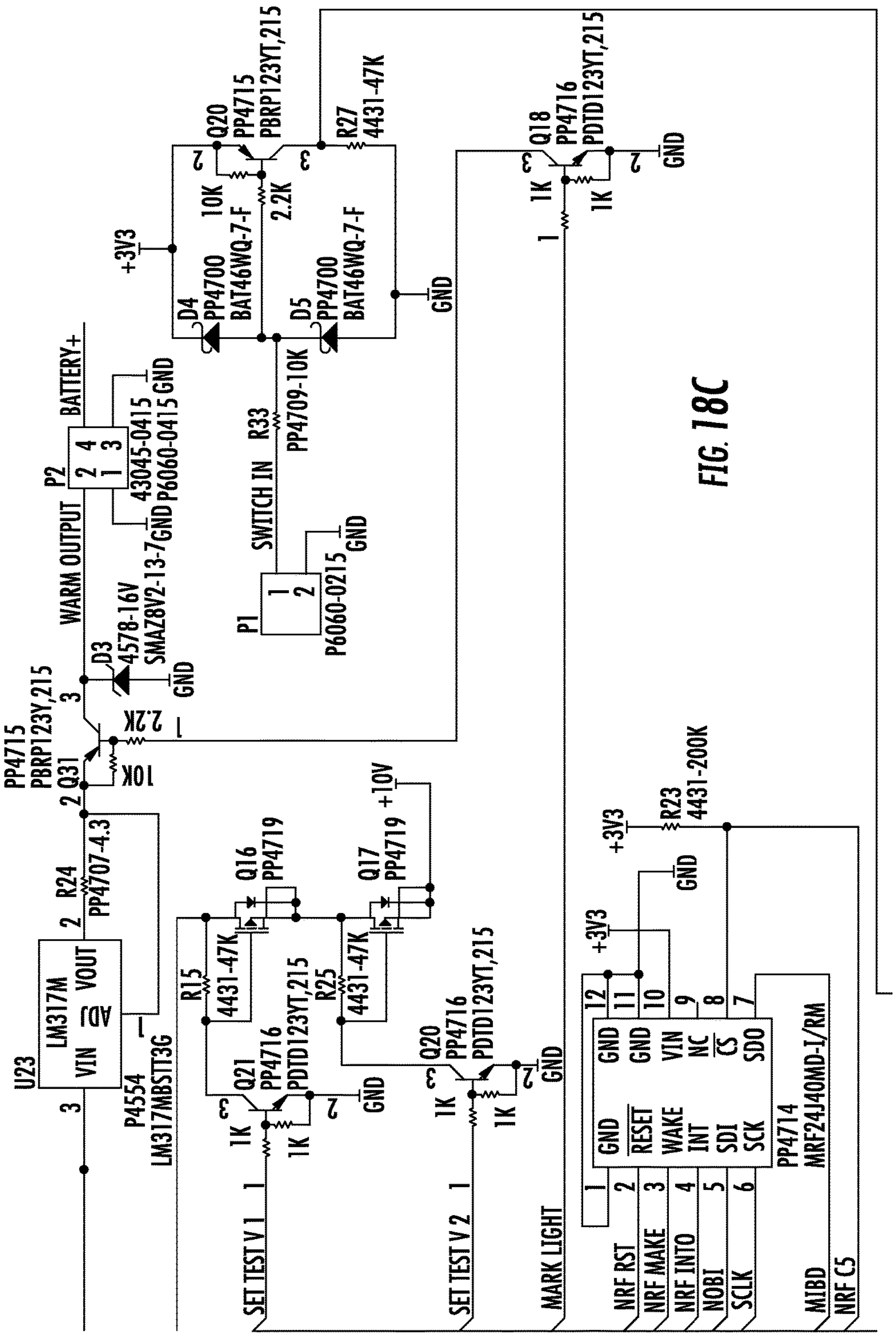
FIG. 18C is an additional circuit diagram of the light failure detection system including an element for providing a current limit to a switch for activating an indicator light.
Figure 18D:
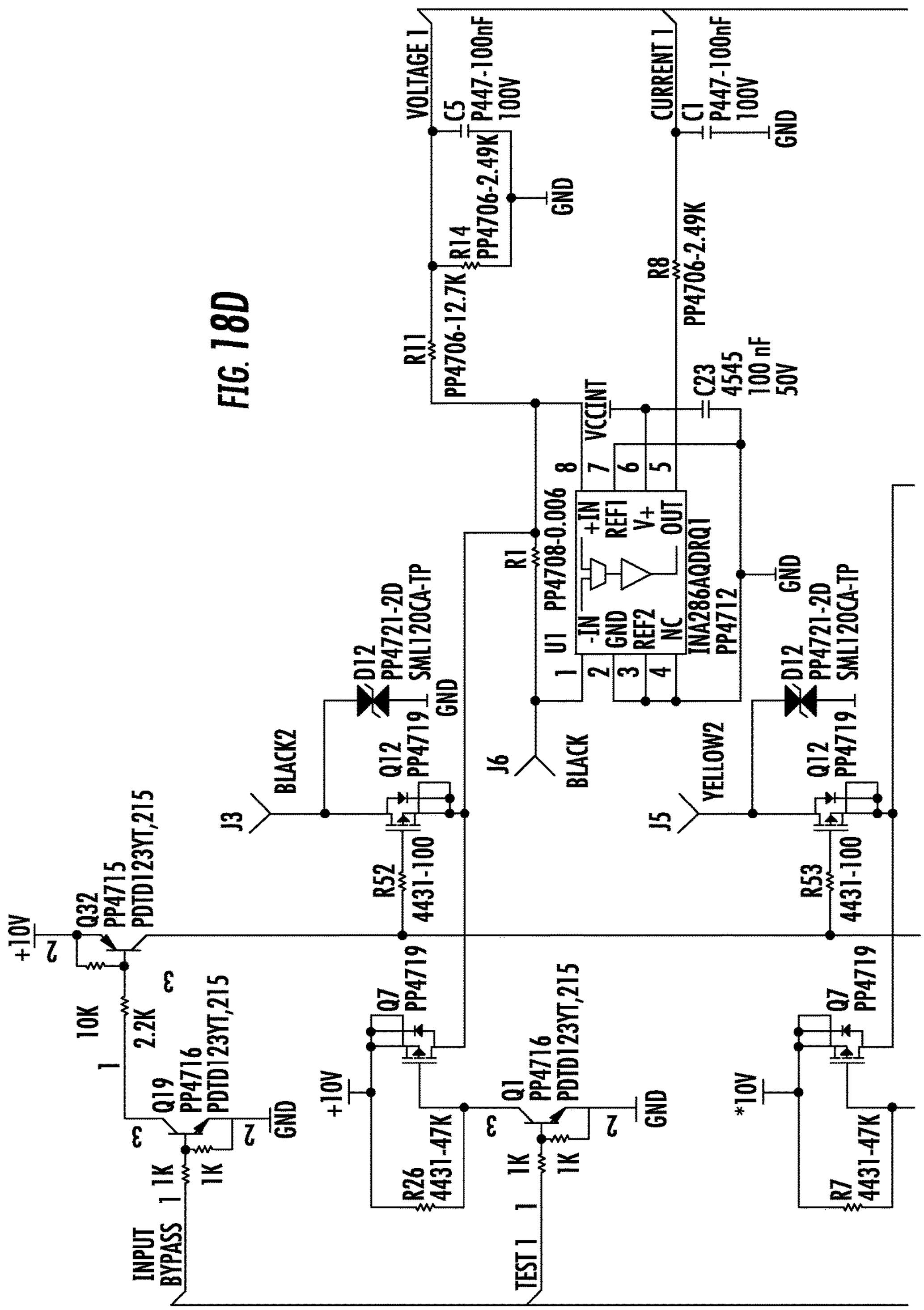
FIGS. 18D and 18E are additional circuit diagrams of the light failure detection system showing elements for monitoring current loads for errors.
Figure 18E:
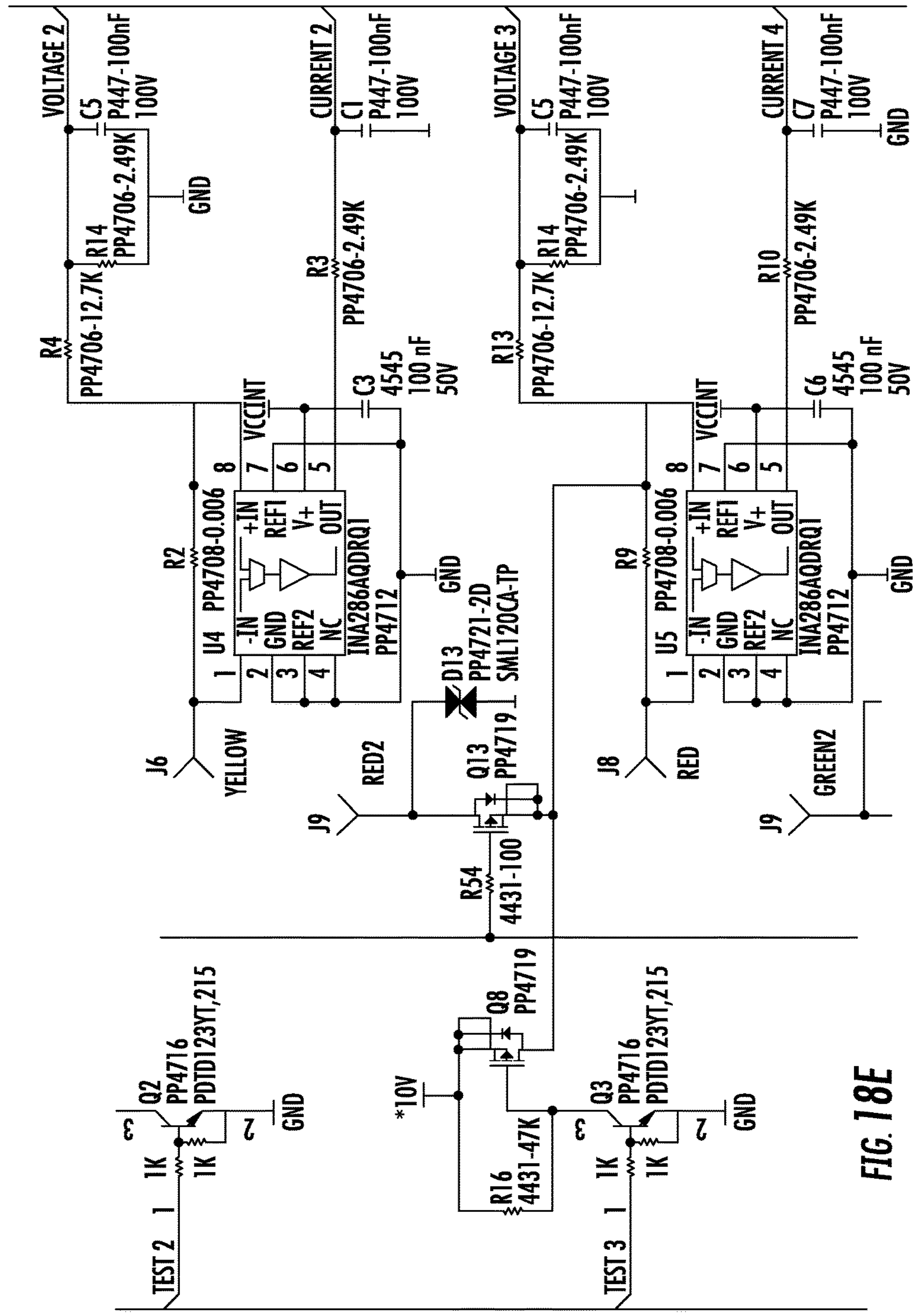
Figure 18F:
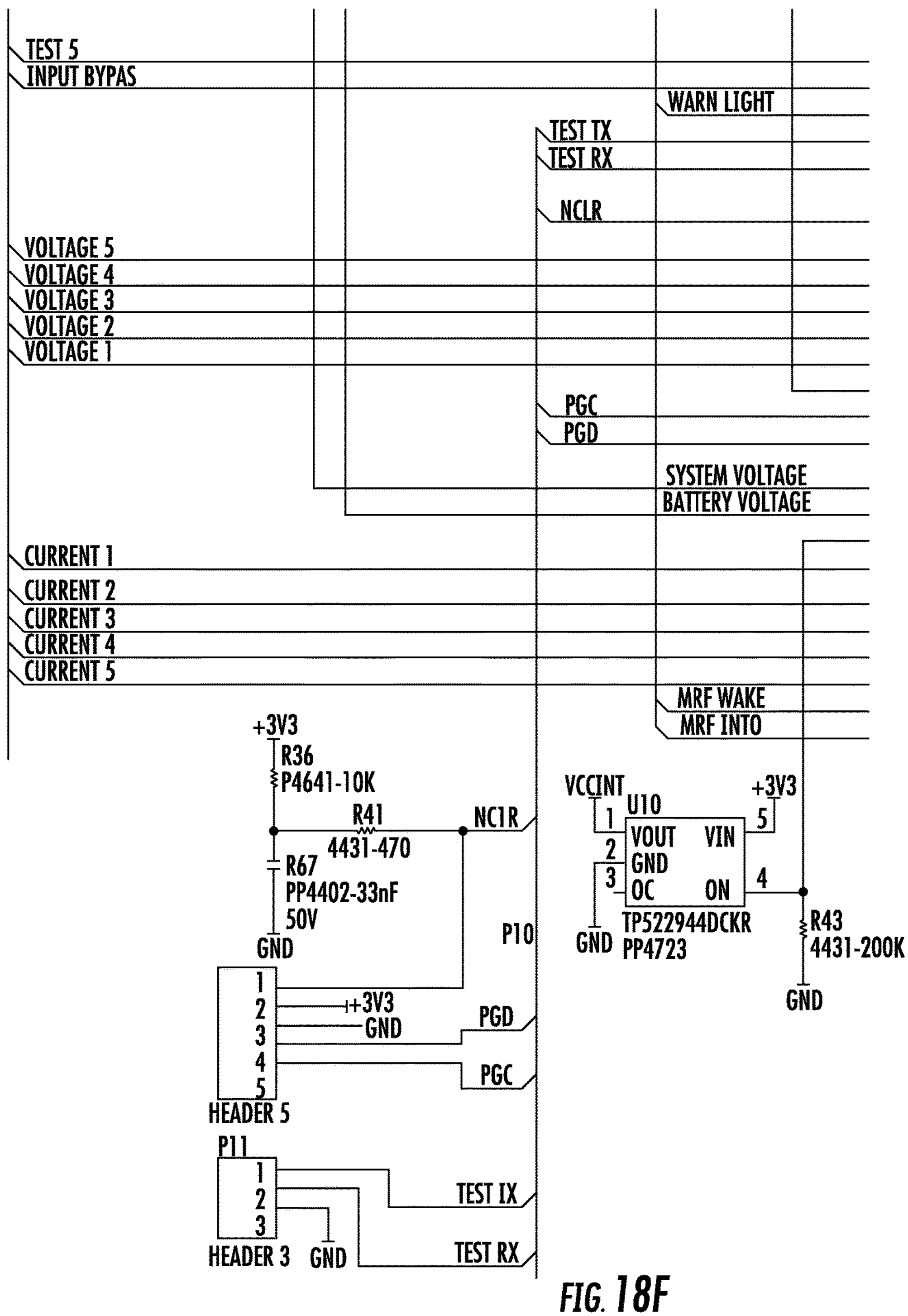
FIG. 18F is an additional circuit diagram of the light failure detection system showing a switch to allow reduction of current in non-operation mode.
Figure 18G:
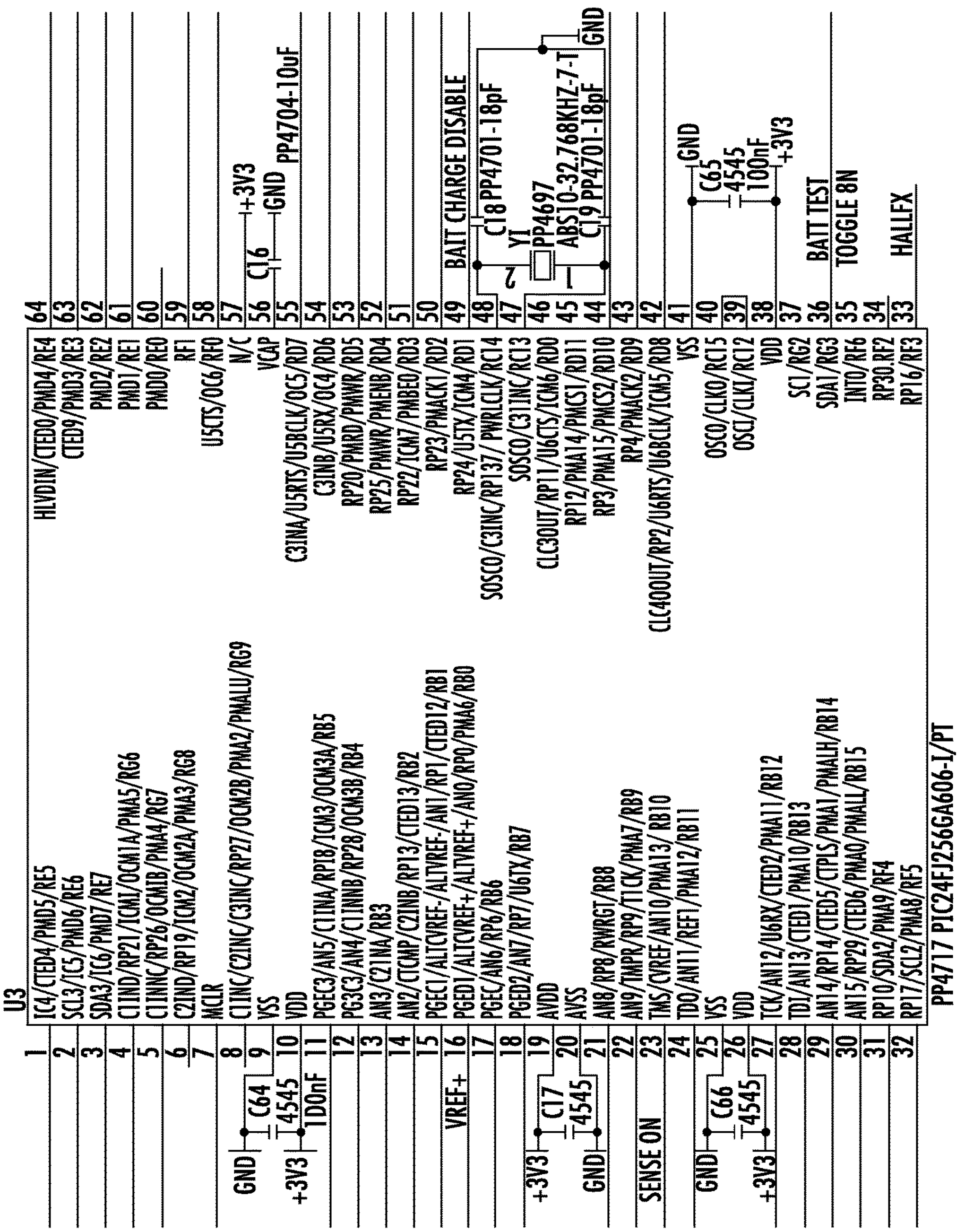
FIG. 18G illustrates the main controller of the light failure detection system circuit diagrams.
Figure 18H:
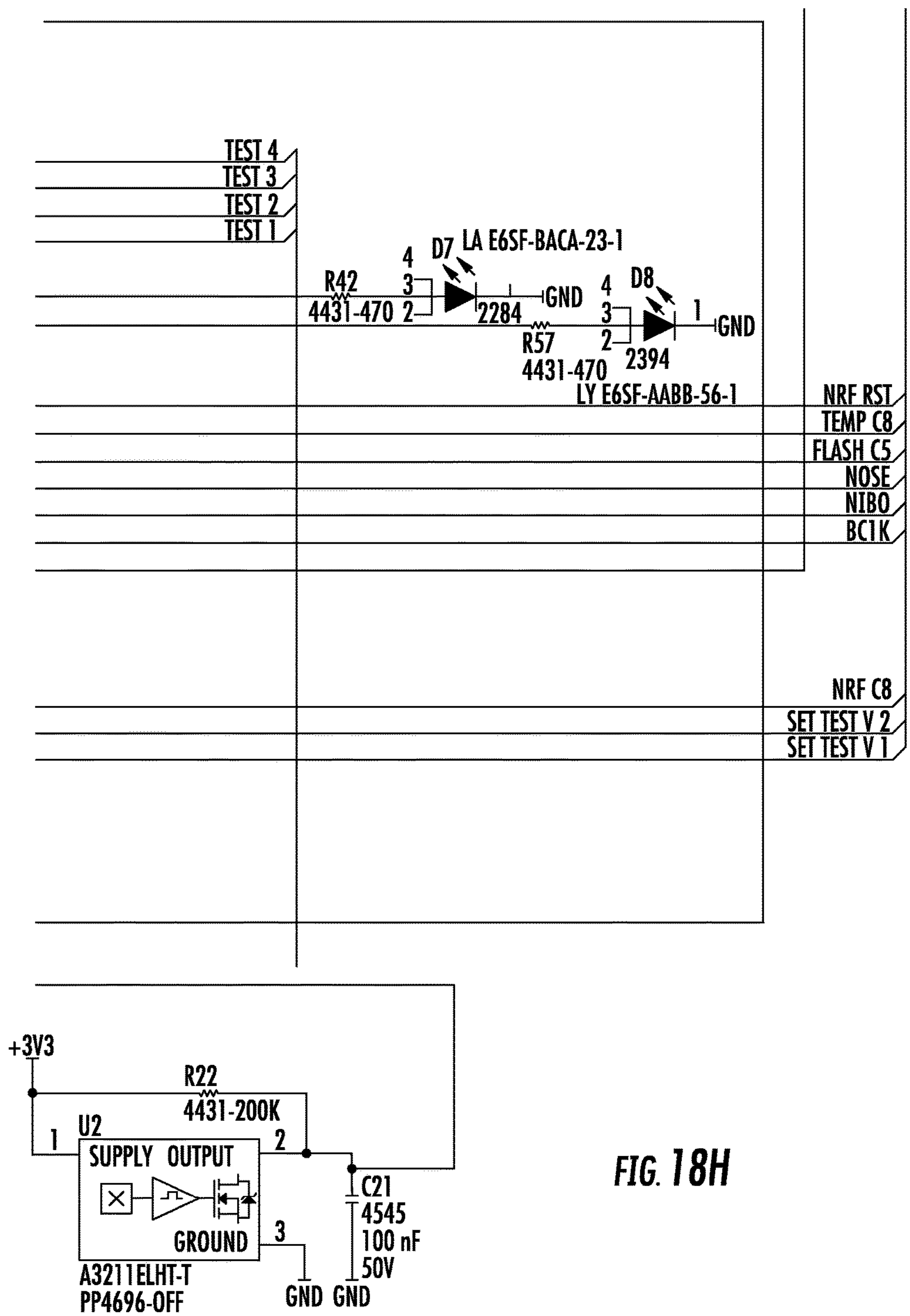
FIG. 18H is an additional circuit diagram of the light failure detection system showing a magnetic sensor for activating a learn mode.
Figure 18I:
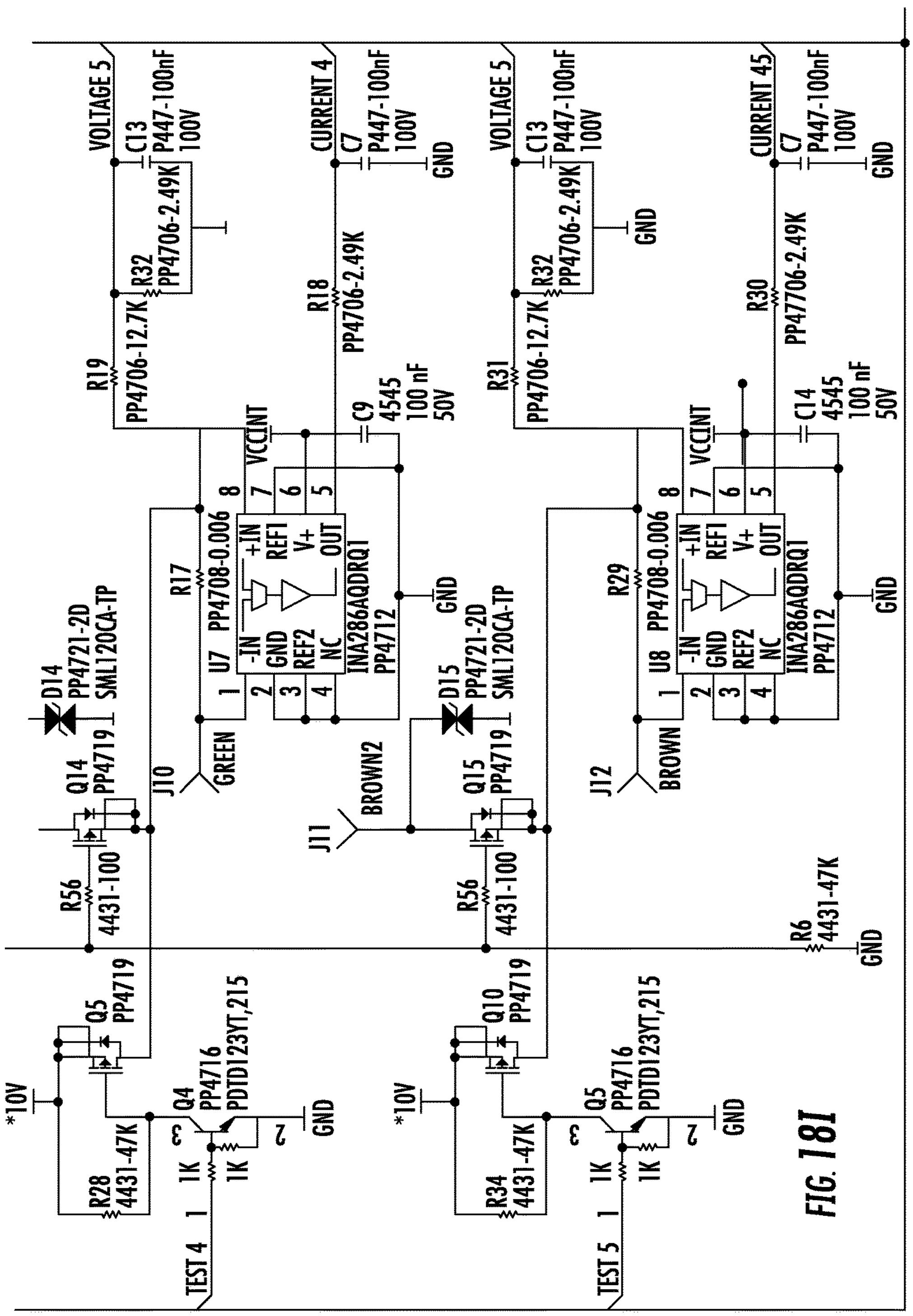
FIG. 18I is an additional circuit diagrams of the light failure detection system showing elements for monitoring current loads for errors.

FIG. 18B illustrates temperature sensor (PP4698) and extra memory for microcontroller (PP4699). Q22 and Q23 provide a switch function to provide 10V when light failure detection system 210 is testing the loads. FIG. 18C includes P4554 for providing a current limit to switch PP4715 to activate the indicator light. P6060-0215 is an external input (user activated) and signal conditioning is provided. FIGS. 18D, 18E and 18I monitor the current loads for errors (current and voltage). Also provided through the input bypass is a way to disconnect the loads for calibration. Calibration uses TEST1-TEST5 to cycle power to each load and measure at temperature to attain a reference point after installation or a repair is made. FIG. 18F includes PP4723 to provide a switched 3.3V to allow reduction of current in non-operation mode. Headers provide diagnostic and programming interfaces for use in production. FIG. 18G illustrates the main controller. FIG. 18H shows magnetic sensor PP4696-OFF used to put light failure detection system 210 in a special mode to learn new absolute limits and to prevent a user from intentionally teaching an excessive condition like short circuit or open circuit.

Light failure detection system 210 communicates with MCU 525, which includes solar cells and an electronics module, which are integrated into a one-piece unit. The solar cells convert light energy, such as from the sun, into power for operation of the electronics module, as described with reference to FIG. 2.

The light failure detection system 210 is capable of conveying the following message types: C1 Fault (RED/STOP), C2 Fault (BLK/CLEARANCE), C3 Fault (BRN/MARKER), C4 Fault (YLW/LH TURN), C5 Fault (GRN/RH TURN), C1 Resolved (RED/STOP), C2 Resolved (BLK/CLEARANCE), C3 Resolved (BRN/MARKER), C4 Resolved (YLW/LH TURN), C5 Resolved (GRN/RH TURN), Disconnect message, Connect message, Circuits STATUS, Tractor Voltage (Tethered), Internal Battery Voltage (Un-Tethered), Learn—Pass/Fail (when learn mode is conducted), Inspection (when a pre-trip Walk Around inspection is completed).

Light failure detection system 210 functions when connected or tethered to a tractor or when not connected to a tractor, i.e. untethered. When tethered, the learn mode of light failure detection system 210 may be activated to give a pass or fail reading. The learn mode may be initiated by a simultaneous quick and long hold of toggle or activator switch 85. During the learn mode the light failure detection system learns the trailer's light configuration. If a circuit is energized during the learn mode, the learn mode will fail. A Walk Around pre-trip mode is also preformed when tethered to a tractor. The pre-trip mode is triggered, for example, by one quick click of the toggle switch. The pre-trip mode cycles the exterior lights (5 circuits) for visual check, 30 sec Clearance & Marker, 30 sec Turn Signals (Left, Right), 30 sec Stop Lights. A fault is indicated if a faulted circuit(s) is present. Light failure detection system 210 also includes walk around mode with interrupt which may be triggered manually by one short click of the toggle switch during a Walk Around pre-trip mode. During a walk around mode with interrupt a Walk Around mode is interrupted and substituted with a Trip Check, which is a shorter version of the Walk Around where light failure detection system 210 does a quick light-out check. During a Trip Check mode while Tethered, light failure detection system 210 is triggered remotely via a trip check command sent through a website user interface. During the trip check mode, a light-out check is performed and the status of all circuits is reported. Additionally, the tractor voltage status is reported with an Alert if the voltage is below a threshold, such as 13.8V. The disconnection or untethering of the tractor from the tractor causes light failure detection system 210 to automatically initiate a trip check. Light failure detection system 210 reports the status of all circuits and indicates if faulted circuit(s) are present. Battery voltage status is provided with an Alert if voltage is below 12V.

When in an untethered state, a trip check mode can be initiated manually, such as by one short click of toggle switch 85. If a faulted circuit is detected, a fault message is sent. If there is NO fault, no message will be sent. The trip check mode may also be triggered remotely by a website user interface when in an untethered state. The status of all circuits and indication of any faulted circuit(s) is provided. The battery voltage status is also provided and an alert is generated if voltage is below 12V.

When a trailer is connected to a tractor a trip check is automatically initiated. The status of all circuits and indication of any faulted circuit(s) is provided. The status of all circuits is also provided and the system indicates if faulted circuit(s) are present. The tractor voltage status is provided with an alert if the voltage is below a threshold, such as 13.8V.

A display mode may be triggered by holding the toggle switch. The indicator light is Illuminated when a fault is present. The light stays ON for 1 min, OFF for 30 mins, ON again for 1 min. The indicator light will flash a number of times corresponding to the circuit number that is faulted. For example, the indicator light will flash 2 Flashes (C2—BLK/CLEARANCE), 3 Flashes (C3—BRN/MARKER), 4 Flashes (C4—YLW/LH TURN), and 5 Flashes (C5—GRN/RH TURN). If multiple circuits are faulted, the blue light will flash a number of times during inspection corresponding to the circuit number that is faulted in order of priority. Priority is as follows: Priority 1=C1→1 Flash, Priority 2=C4→4 Flashes, Priority 3=C5→5 Flashes, Priority 4=C2→2 Flashes, Priority 5=C3→3 Flashes.

A "Deep learn mode" establishes a long-term baseline for a given lighting setup, to prevent a user from inadvertently running a learn test with a fault condition. This is initiated via a magnetic switch during initial installation of the system on a specific trailer.

Circuits Status is a status message that indicates the status of each of the five circuits and the source voltage (Tractor input when Tethered or Internal Battery when Un-Tethered). There are several ways to trigger a circuit status: Tethered Trip Check via website, Un-Tethered Trip Check via website, disconnect of tractor power, and Connect to tractor power. When the trailer is untethered, trip Checks (Disconnect, Website, Toggle switch) will only be performed if battery voltage is about 11.5V or greater.

Light failure detection system 210 includes several parameters that are configurable. For example, status (min)—light failure detection system 210 will send a Status message of the last known circuits' status and voltage source, Alert (min)—light failure detection system 210 will send an alert message when a fault is detected, then sends FAULT (Status) messages per set timer, Timer for Wake-Up—light failure detection system 210 will go to sleep and sends a wake-up message at pre-set time to check for messages from MCU, Tethered—Wake-Up message every 1 min, Untethered—Wake-Up message per set timer—Default 2 mins, Active V-Threshold—Voltage threshold for declaring/identifying that a circuit is present (Default setting is 5V), and Lower Current-Thresholds (Current (mA) upper & lower thresholds may be pre-set for each of the five circuits). The lower current thresholds are adjustable over the air. The default settings are as follows:

| Circuit | Upper/Lower threshold (in mA) |
|---|---|
| C1 | 100/20 |
| C2 | 100/8 |
| C3 | 100/7 |
| C4 | 100/16 |
| C5 | 100/16 |

The following Table 6 shows the operation of the light failure detection system during a manual operation in a tethered state in the learn mode, walk around mode, and display mode.

TABLE 6

| TETHERED<br>Manual Operation | | | |
|---|---|---|---|
| Learn Mode | Activate | 1 short & 1 long switch toggles | Send Message to MCU w/Status |
| | Warning light | ON during learn mode (solid)<br>OFF when learn is successfully completed<br>Blinks steadily if learn mode fails | |
| Walk around mode | Activate | 1 short switch toggle | Send Message to MCU Inspection was conducted & status if fault is present |
| | 1st sequence (30 s) | CLEARANCE (BLK) = Top lights front trailer<br>MARKER (BRN) = Tail (top/bottom) + Side yellow | |
| | 2nd sequence (30 s) | LH (YLW) + RH (GRN) | |
| | 3rd sequence (30 s) | STOP LIGHT (RED) | |
| Display mode | Fault present | Yes (ON)/No (OFF) | Send Message to MCU on change of circuit Status |
| | Check faulted circuit | Hold switch | |
| | 1 Blink | STOP light (RED) | |
| | 2 Blinks | CLEARANCE (BLK) | |
| | 3 Blinks | MARKER (BRN) | |
| | 4 Blinks | LH Turn (YLW) | |
| | 5 Blinks | RH Turn (GRN) | |

The following Table 7 shows the operation of the light failure detection system when connected to a truck tractor in a tethered state in the trip check mode and display mode.

TABLE 7

| TETHERED When Trailer First Connected to Truck | | | | |
|---|---|---|---|---|
| | Check Input Voltage | Input voltage supplied from Truck to Nose Box | | Send Message to MCU w/Status |
| Trip check mode | Auto Pre-Trip check | $1^{st}$ sequence | STOP LIGHT (RED) | |
| | | $2^{nd}$ sequence | CLEARANCE (BLK) = Top lights front trailer | |
| | | $3^{rd}$ sequence | MARKER (BRN) = Tail (top/bottom) + Side yellow | |
| | | 4th sequence | LH (YLW) | |
| | | 5th sequence | RH (GRN) | |
| Display mode | | Fault present | Yes (ON)/No (OFF) | Send Message to MCU w/Status |
| | | Check faulted circuit | Hold switch | |
| | | 1 Blink | STOP light (RED) | |
| | | 2 Blinks | CLEARANCE (BLK) | |
| | | 3 Blinks | MARKER (BRN) | |

TABLE 7-continued

| TETHERED When Trailer First Connected to Truck | | | | |
|---|---|---|---|---|
| | | 4 Blinks | LH Turn (YLW) | |
| | | 5 Blinks | RH Turn (GRN) | |

The following Table 8 shows the operation of the light failure detection system when in a tethered state in the trip check mode and display mode, when initiated via a user interface.

TABLE 8

| Initiated via User Interface | | | | |
|---|---|---|---|---|
| | Check Input Voltage | Voltage supplied from Truck to Nose Box | | Send Message to MCU w/Status |
| Trip check mode | Trip check | $1^{st}$ sequence | STOP LIGHT (RED) | |
| | | $2^{nd}$ sequence | CLEARANCE (BLK) = Top lights front trailer | |
| | | $3^{rd}$ sequence | MARKER (BRN) = Tail (top/bottom) + Side yellow | |
| | | 4th sequence | LH (YLW) | |
| | | 5th sequence | RH (GRN) | |
| Display mode | | Fault present | Yes (ON)/No (OFF) | Send Message to MCU w/Status |
| | | 1 Blink | STOP light (RED) | |
| | | 2 Blinks | CLEARANCE (BLK) | |
| | | 3 Blinks | MARKER (BRN) | |
| | | 4 Blinks | LH Turn (YLW) | |
| | | 5 Blinks | RH Turn (GRN) | |

The following Table 9 shows the operation of the light failure detection system when in an untethered state in the trip check mode and display mode, when initiated via a user interface.

TABLE 9

| UN-TETHERED (ON Internal Battery) Initiated via 1) Trailer is Disconnected; 2) User interface; or 3) Switch | | | | |
|---|---|---|---|---|
| Trip check | Check Battery Voltage | Internal battery voltage | | Send Message to MCU w/Status |
| | Pre-Trip check (AUTO when Trailer is first disconnected) | $1^{st}$ sequence | STOP LIGHT (RED) | |
| | | $2^{nd}$ sequence | CLEARANCE (BLK) = Top lights front trailer | |
| | | 3rd sequence | MARKER (BRN) = Tail (top/bottom) + Side yellow | |
| | | 4th sequence | LH (YLW) | |
| | | 5th sequence | RH (GRN) | |
| Display mode | | Fault present | Yes/No | Send Message to MCU w/Status |
| | | Display when initiated by Switch w/o Repeat | STOP light (RED)<br>CLEARANCE (BLK)<br>MARKER (BRN)<br>LH Turn (YLW)<br>RH Turn (GRN) | |

Figure 19A:
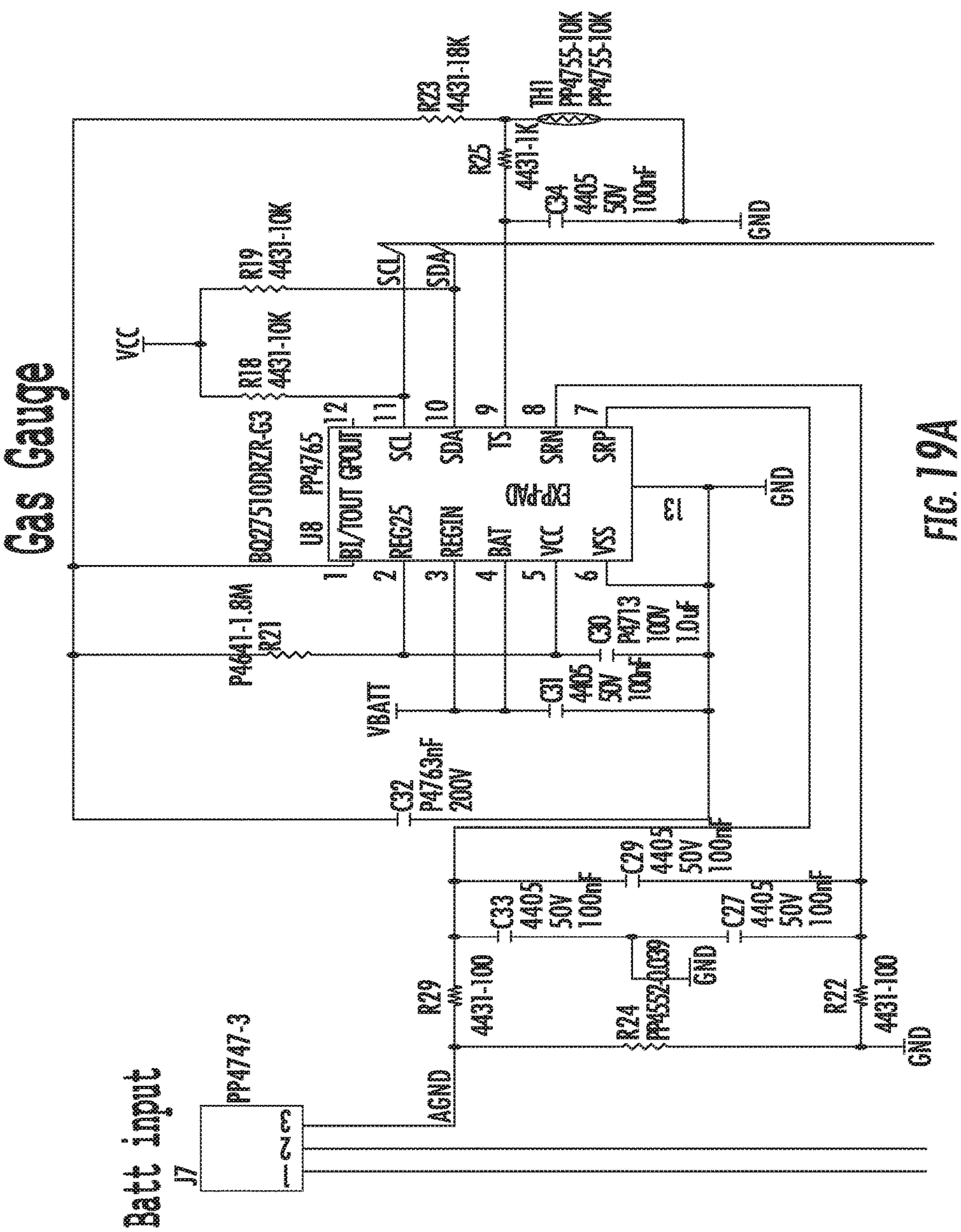
FIG. 19A illustrates a "Gas Gage" circuit to monitor battery charge.
Figure 19B:
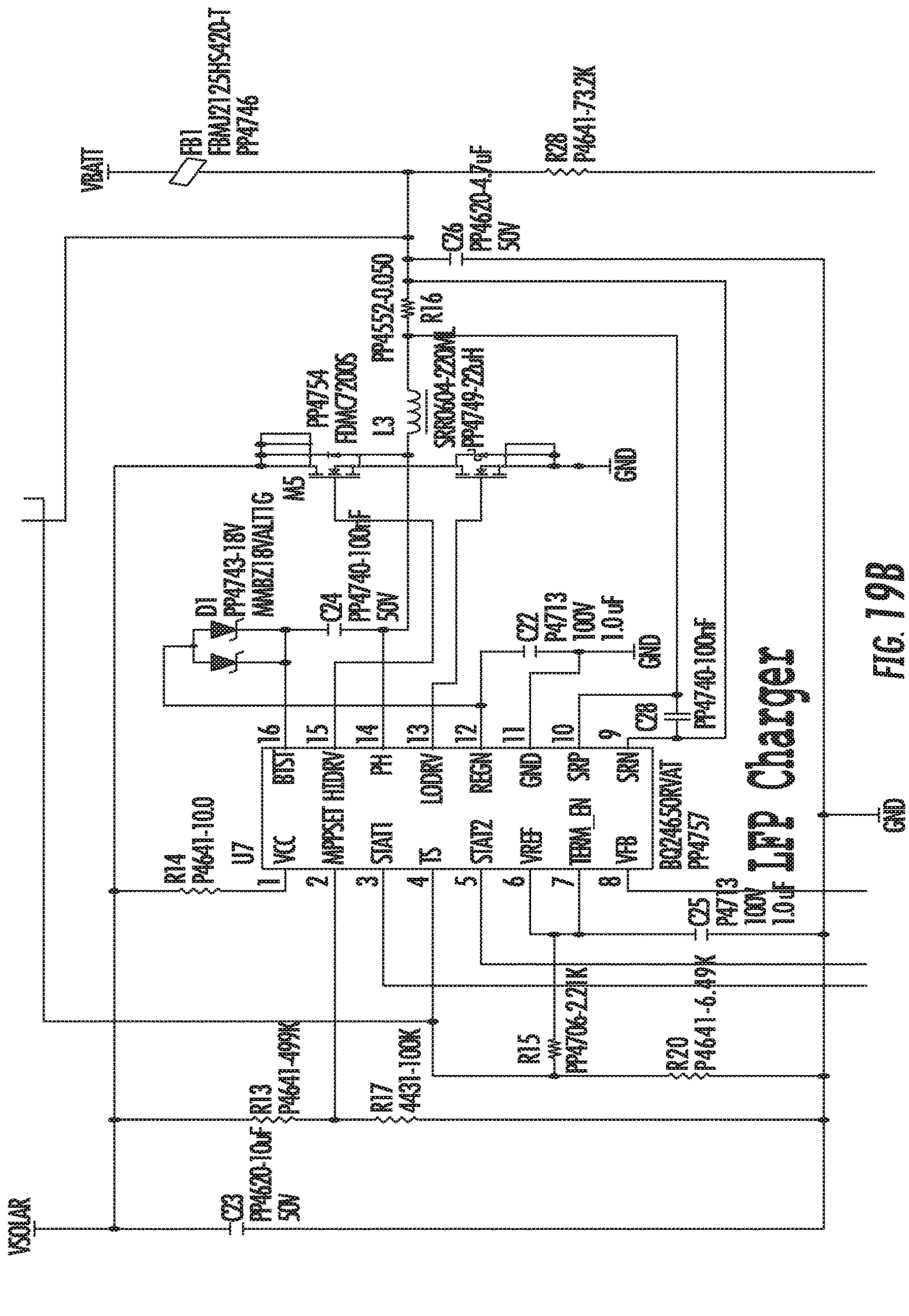
FIG. 19B shows a charger circuit that takes solar panel power and uses it to charge the battery.
Figure 19C:
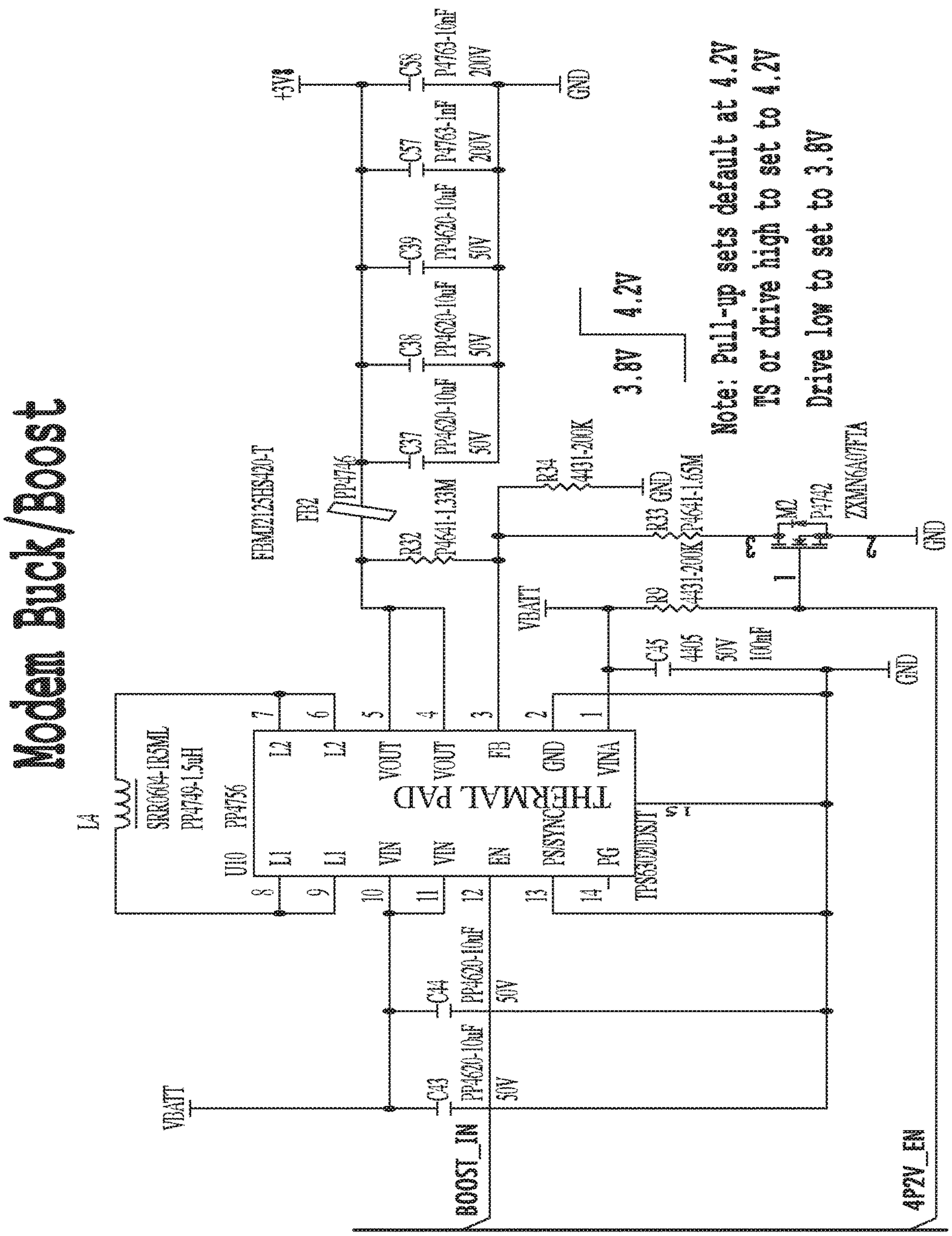
FIG. 19C illustrates a voltage booster circuit provides a higher voltage for use by a cell network modem.
Figure 19D:
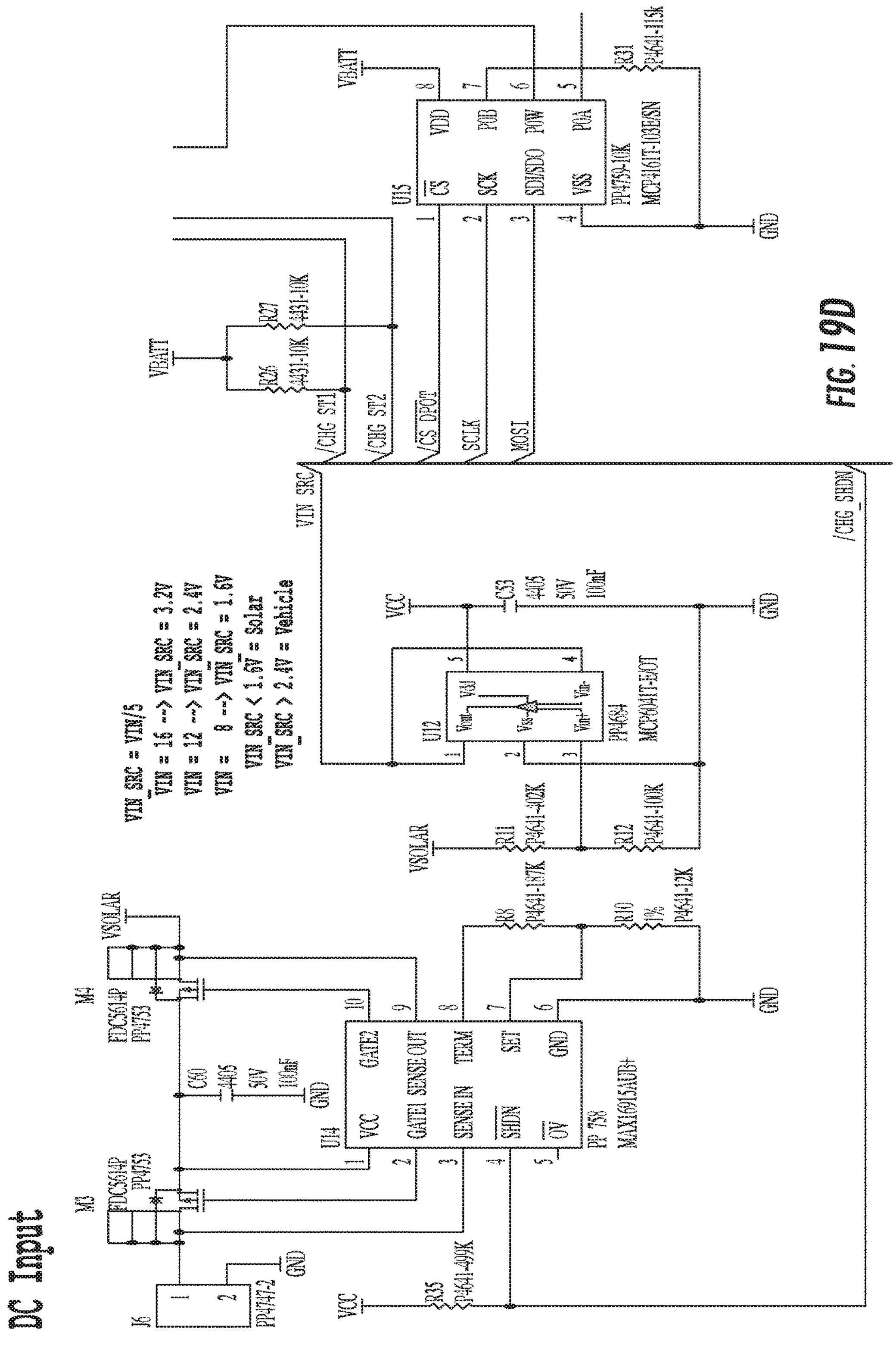
FIG. 19D includes PP4758 to provide 'ideal diode' function, PP4684 is a comparator to detect if solar panel is providing power, and PP4659-10K is a digital potentiometer used to adjust the battery charge voltage.

Detailed circuit diagrams of the MCU are shown in FIGS. 19A-19M. FIG. 19A illustrates a "Gas Gage" circuit to monitor battery charge. FIG. 19B shows a charger circuit that takes solar panel power and uses it to charge the battery. FIG. 19C illustrates a voltage booster circuit provides a higher voltage for use by a cell network modem. FIG. 19D includes PP4758 to provide 'ideal diode' function, PP4684 is a comparator to detect if solar panel is providing power, and PP4659-10K is a digital potentiometer used to adjust the battery charge voltage.

Figure 19E:
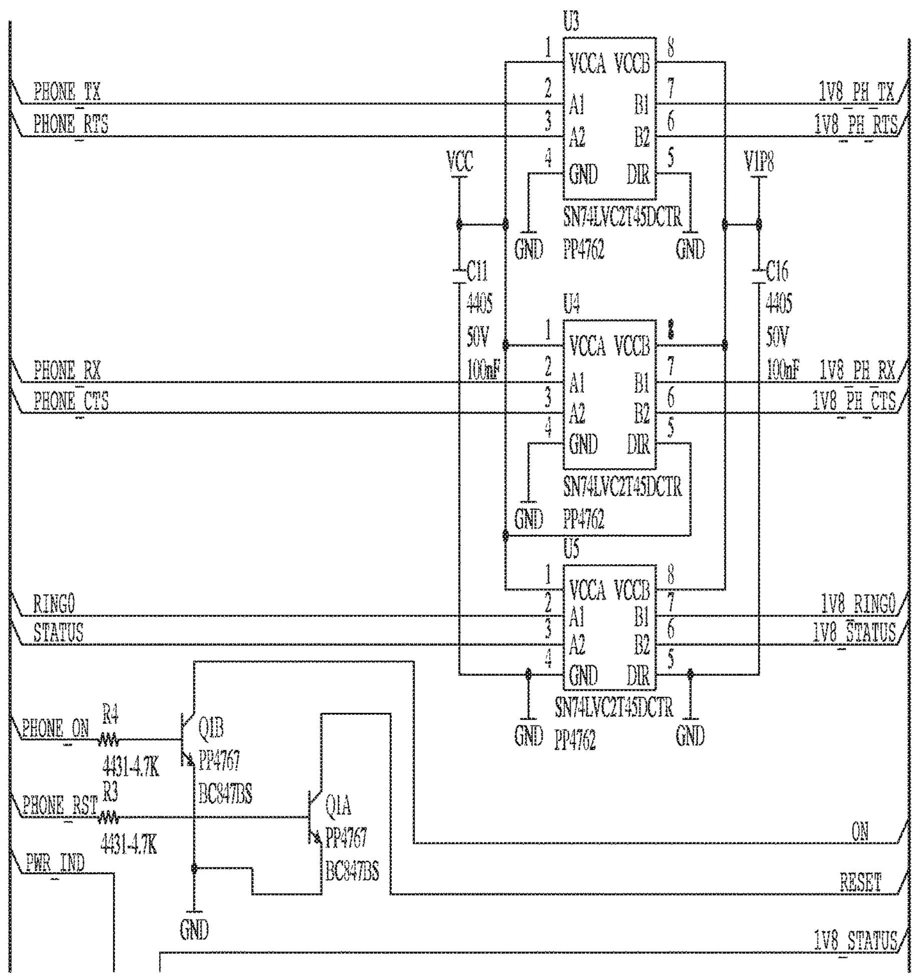
FIG. 19E is a circuit diagram illustrating a voltage level translation from a controller to a cell network modem.
Figure 19F:
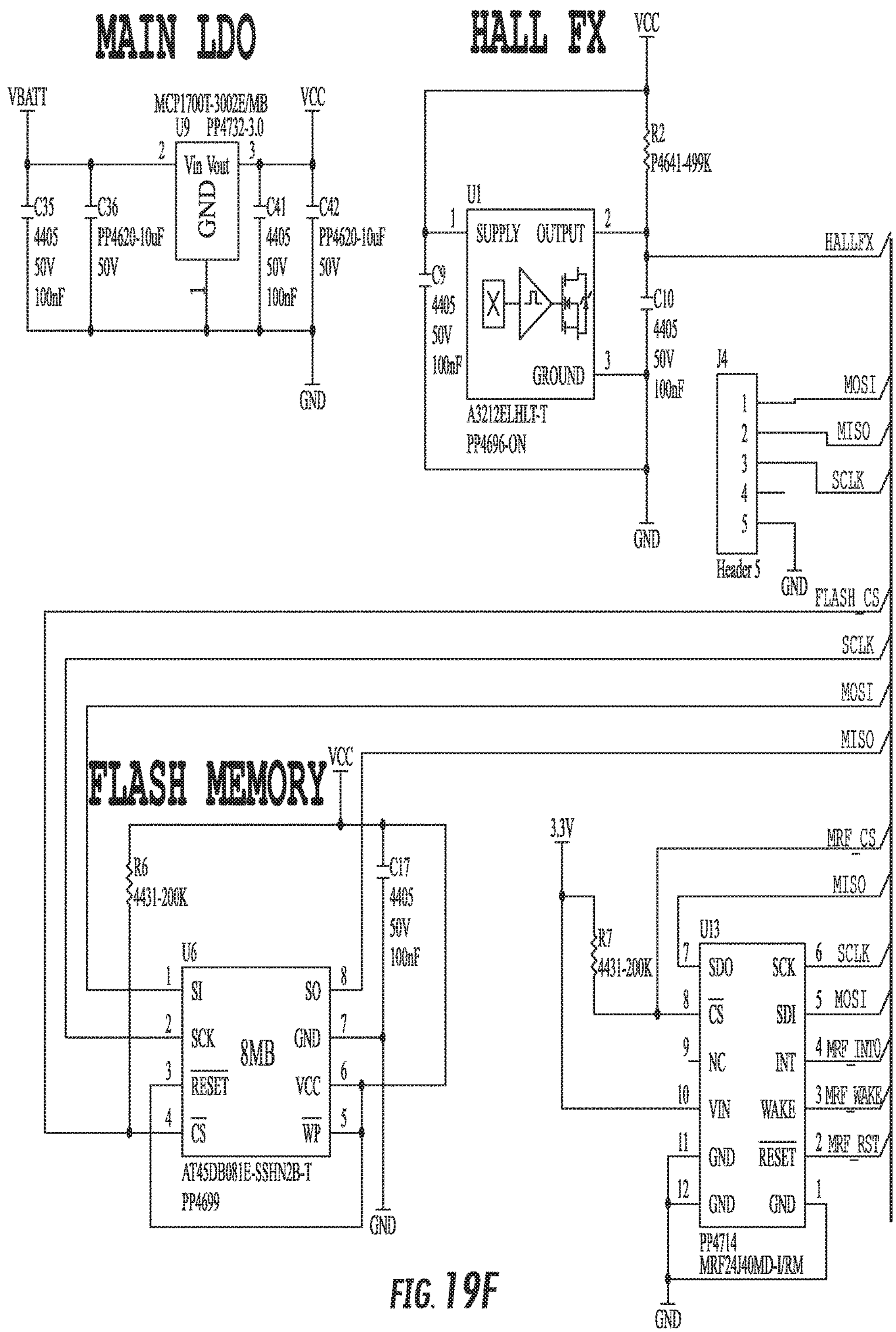
FIG. 19F is a circuit diagram illustrating an element for providing VCC for the controller and system.
Figure 19G:
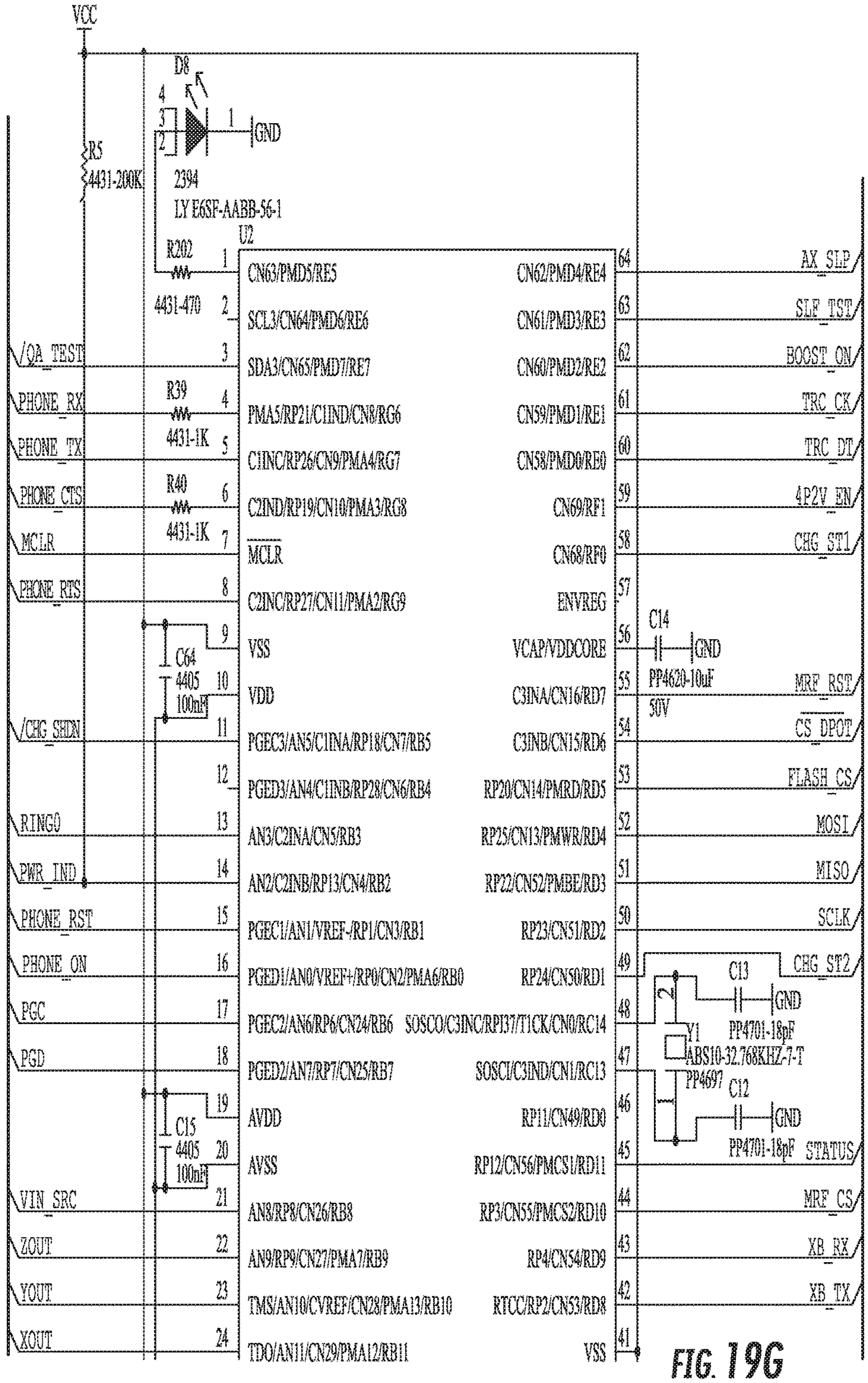
FIG. 19G is a circuit diagram illustrating a controller.
Figure 19H:
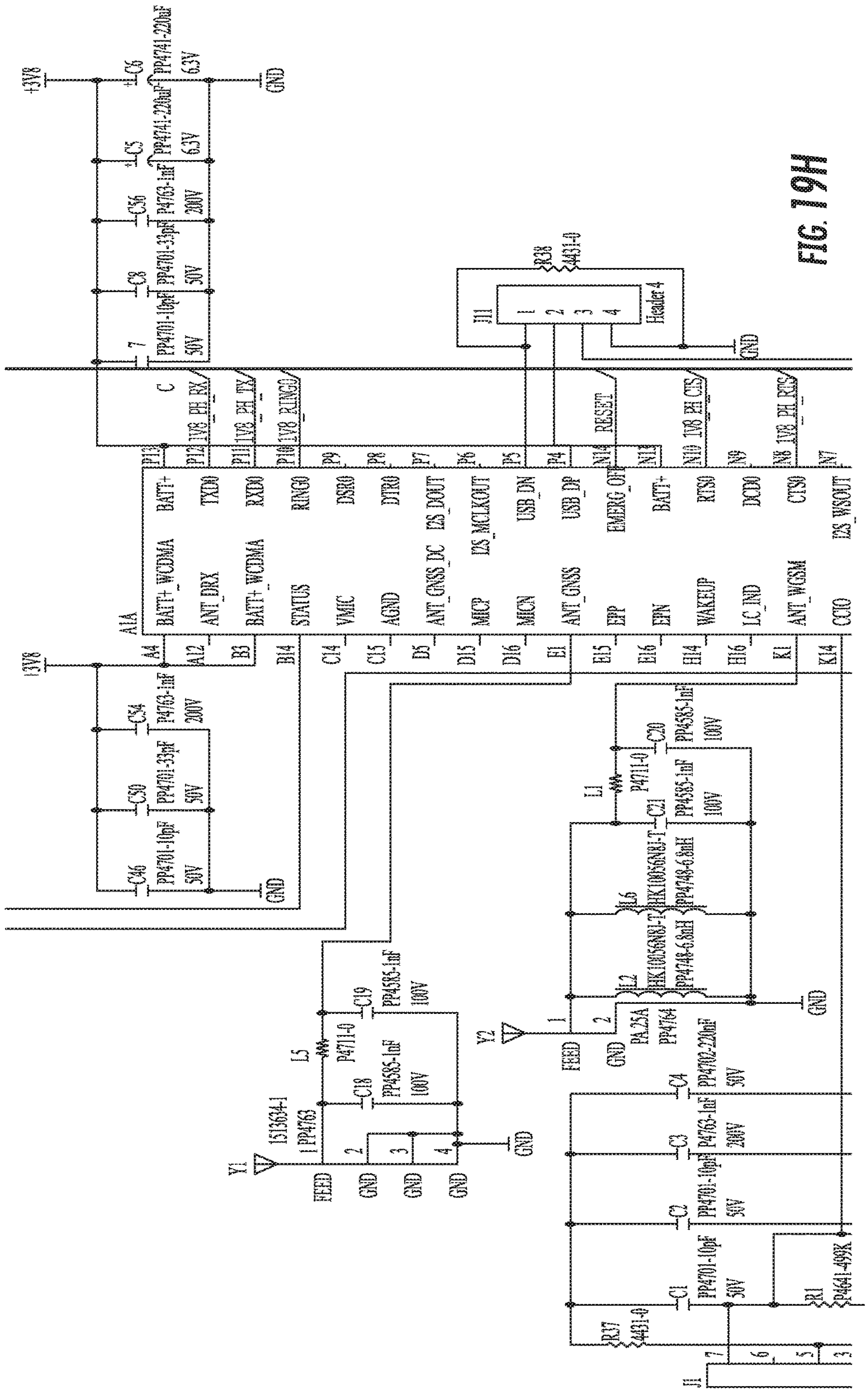
FIG. 19H is a circuit diagram illustrating the cell network modem and related antennae.
Figure 19I:
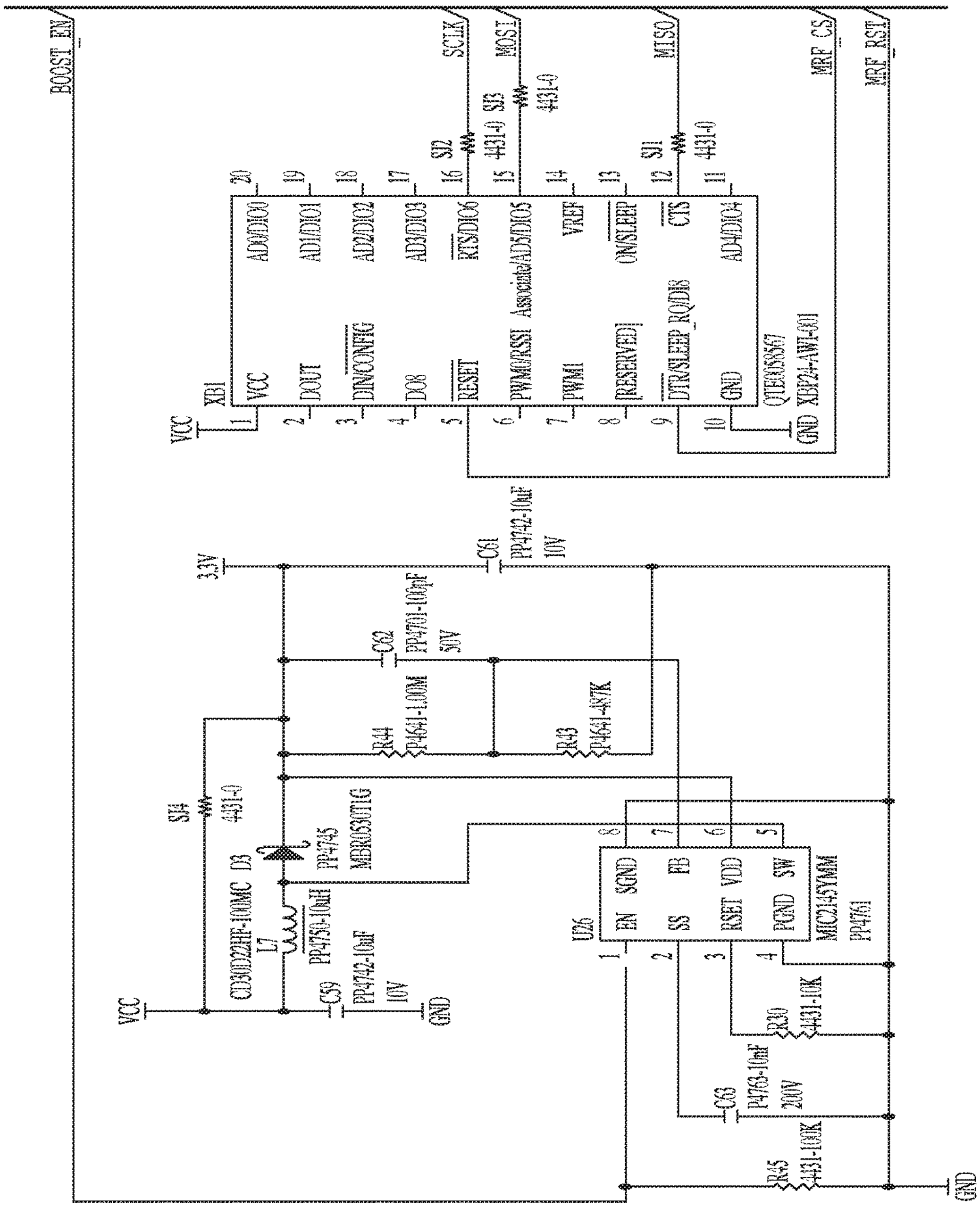
FIG. 19I is a circuit diagram illustrating an element for providing a voltage boost and a transceiver.
Figure 19J:
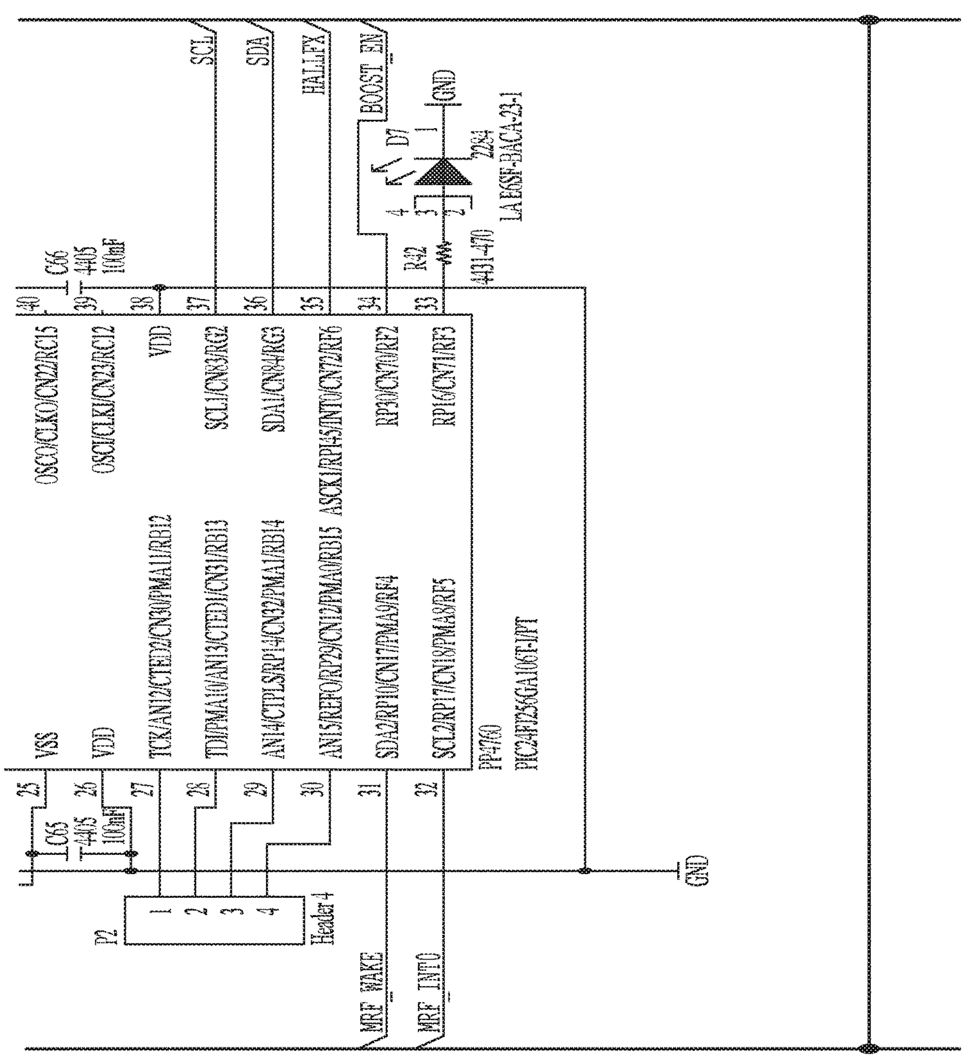
FIG. 19J is a circuit diagram illustrating a controller.
Figure 19K:
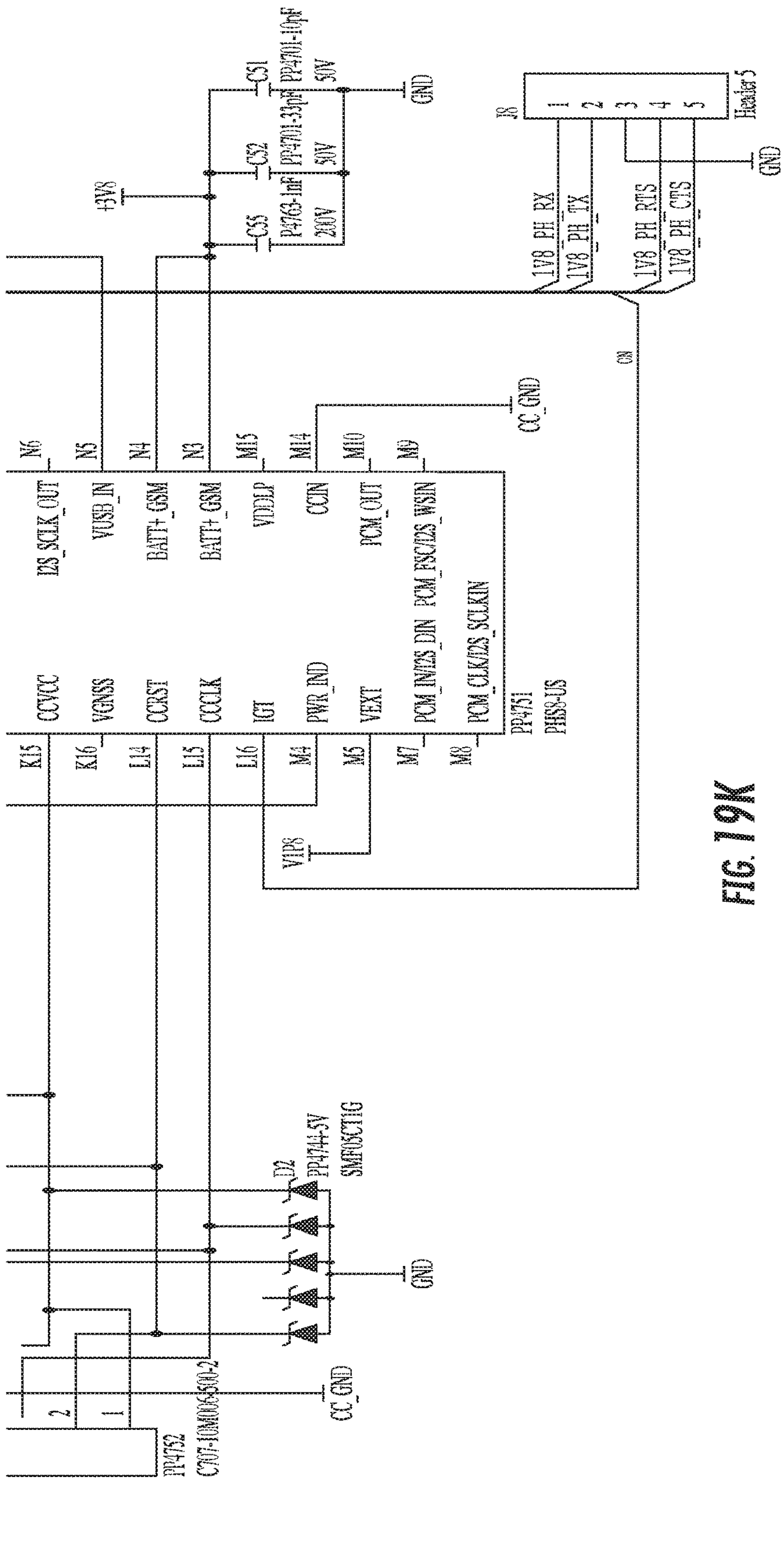
FIG. 19K is an additional circuit diagram illustrating the cell network modem and related antennae.
Figure 19L:
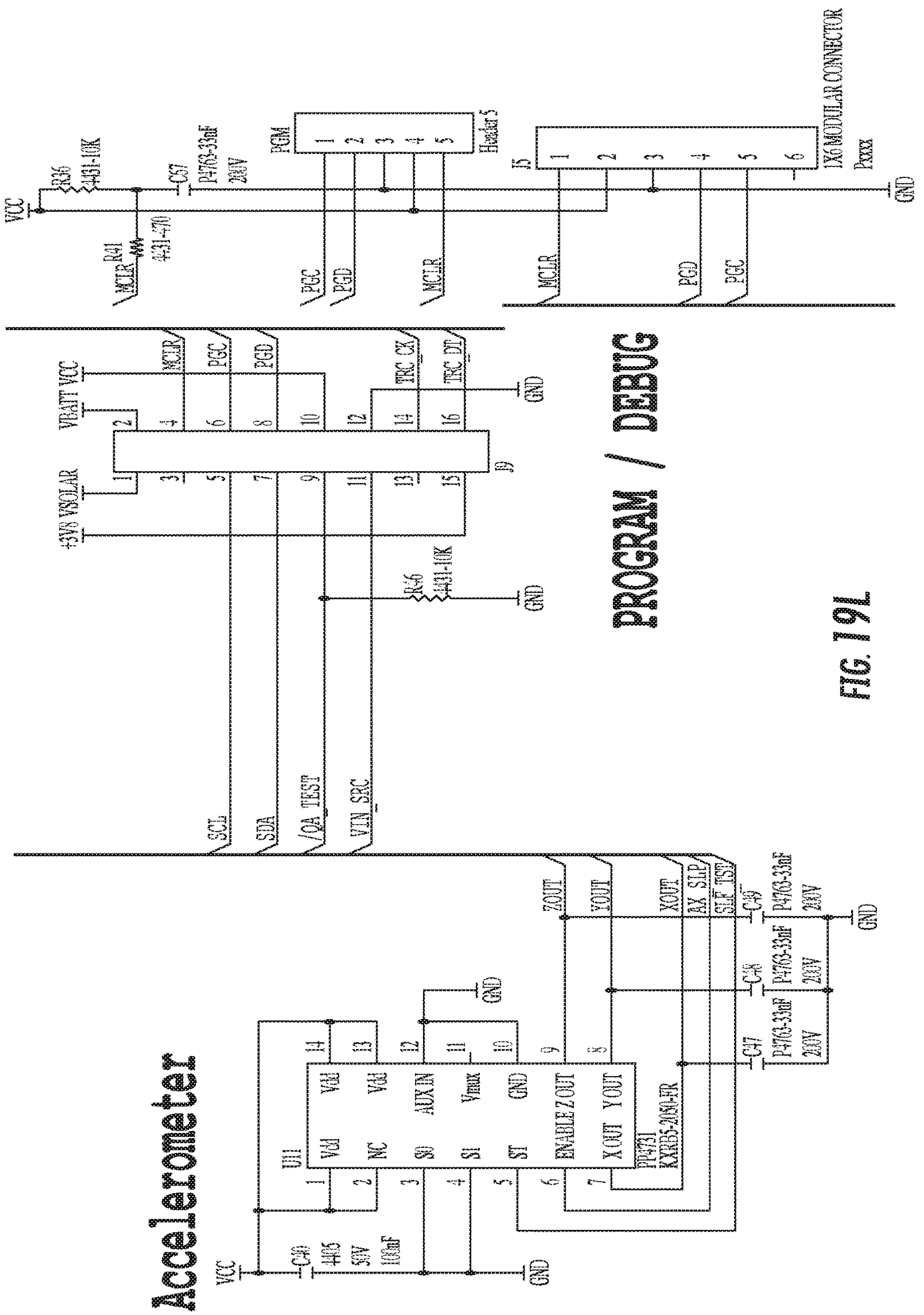
FIG. 19L is a circuit diagram illustrating the cell network modem and related antennae.
Figure 19M:
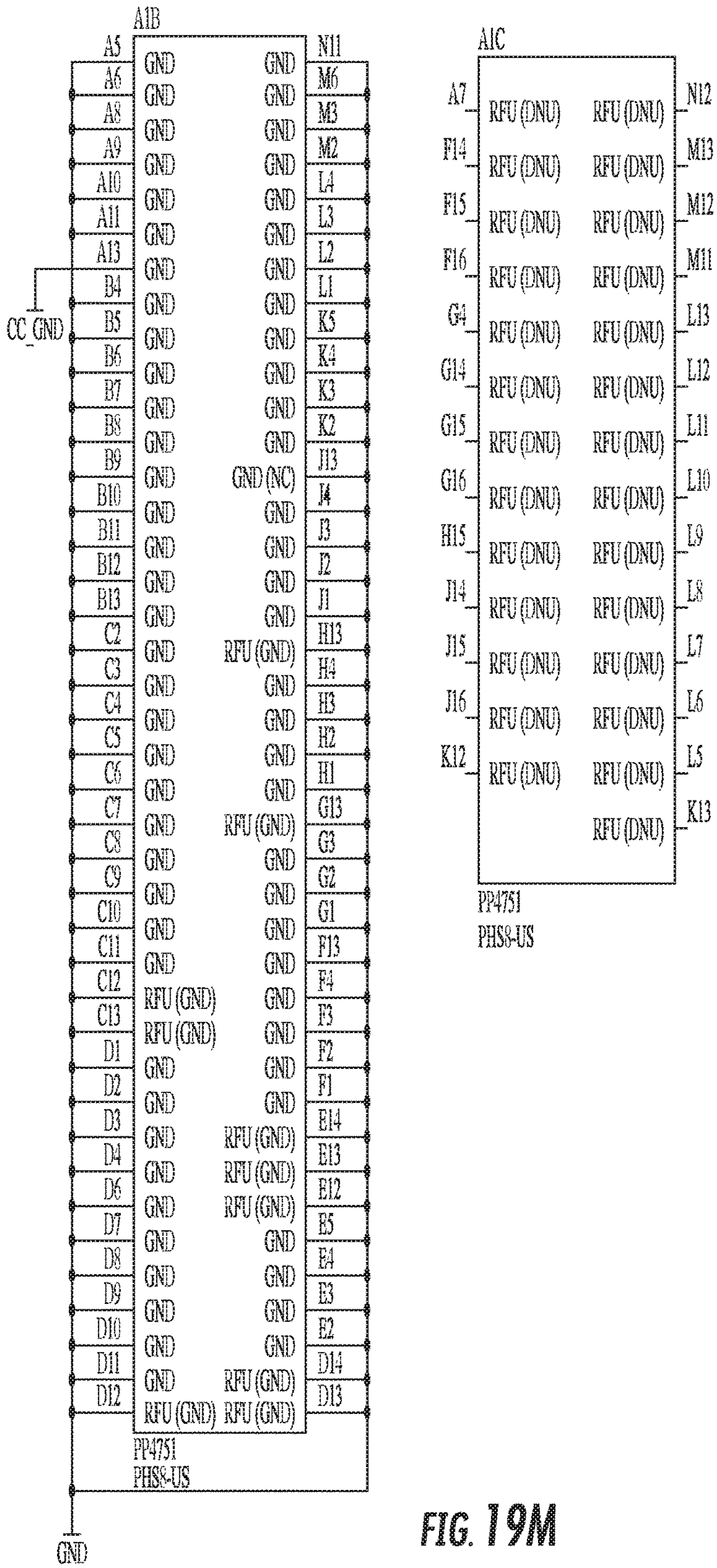
FIG. 19M illustrates cell network modem ground connections and no-connect pins.

FIG. 19E shows a voltage level translation from the controller to the cell network modem and FIG. 19F includes PP4732-3.0 to provide VCC for the controller and system. PP4696-ON is a magnet sensor use to power on the device when a magnet is present in a specific location, PP4699 is extra memory for the controller, and PP4714 is the IEEE 802.15.4 transceiver used to communicate on the Zigbee network. FIGS. 19G and 19J are the controller and FIGS. 19H and 19K are the cell network modem and related antennae. FIG. 19I includes PP4761 to provide a voltage boost to 3.3V for system use. QTE0058567 is secondary IEEE 802.15.4 transceiver. Further, FIG. 19L includes an accelerometer PP4731 to indicate that the vehicle is moving. The headers are debugging, programming interfaces for development and production. FIG. 19M illustrates cell network modem ground connections and no-connect pins.

Figure 20A:
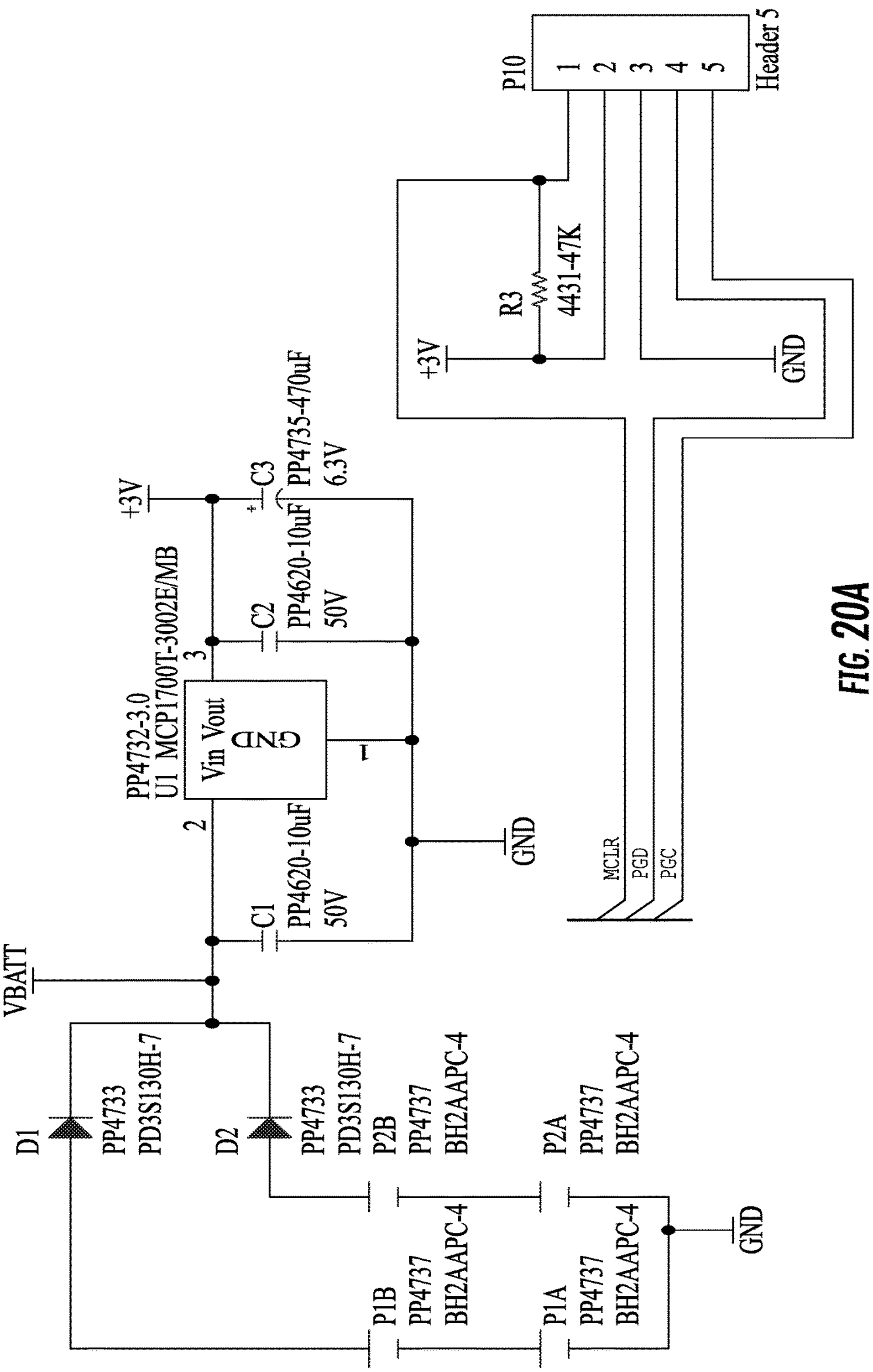
FIG. 20A is a circuit diagram illustrating batteries to power a sensor, which provides regulated 3.0 V power output for system.
Figure 20B:
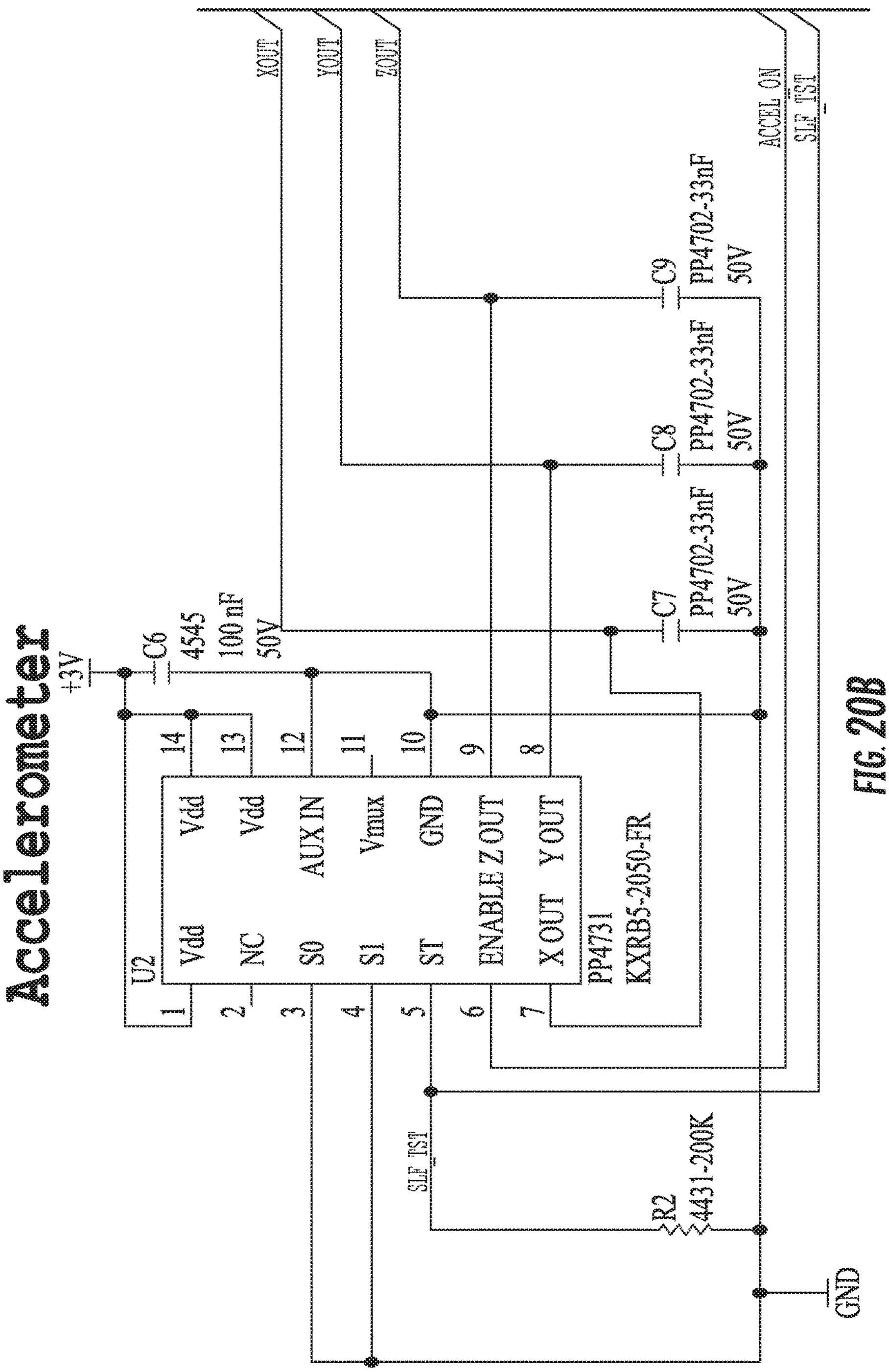
FIG. 20B is a circuit diagram illustrating an accelerometer.
Figure 20C:
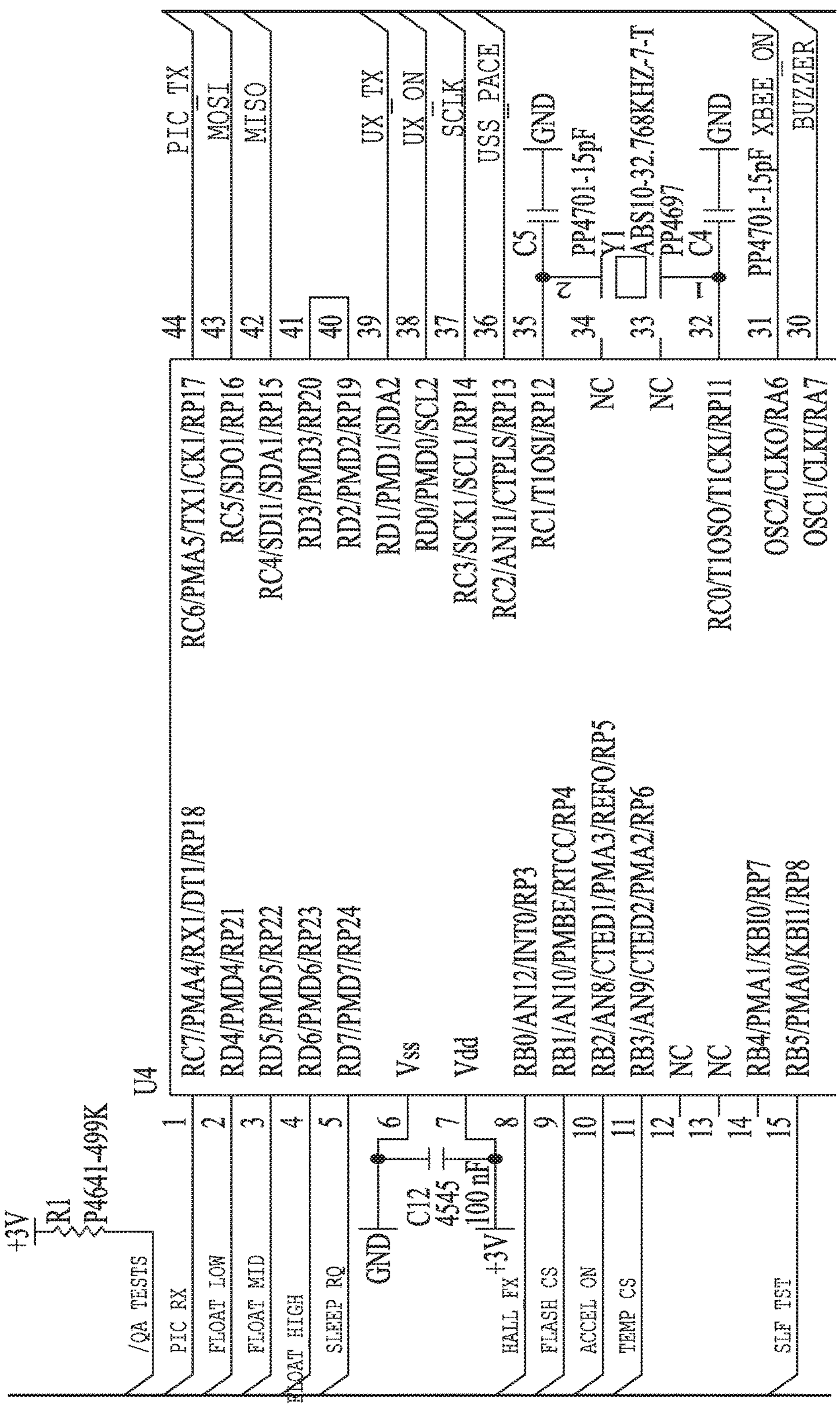
FIG. 20C is a circuit diagram illustrating a controller.
Figure 20D:
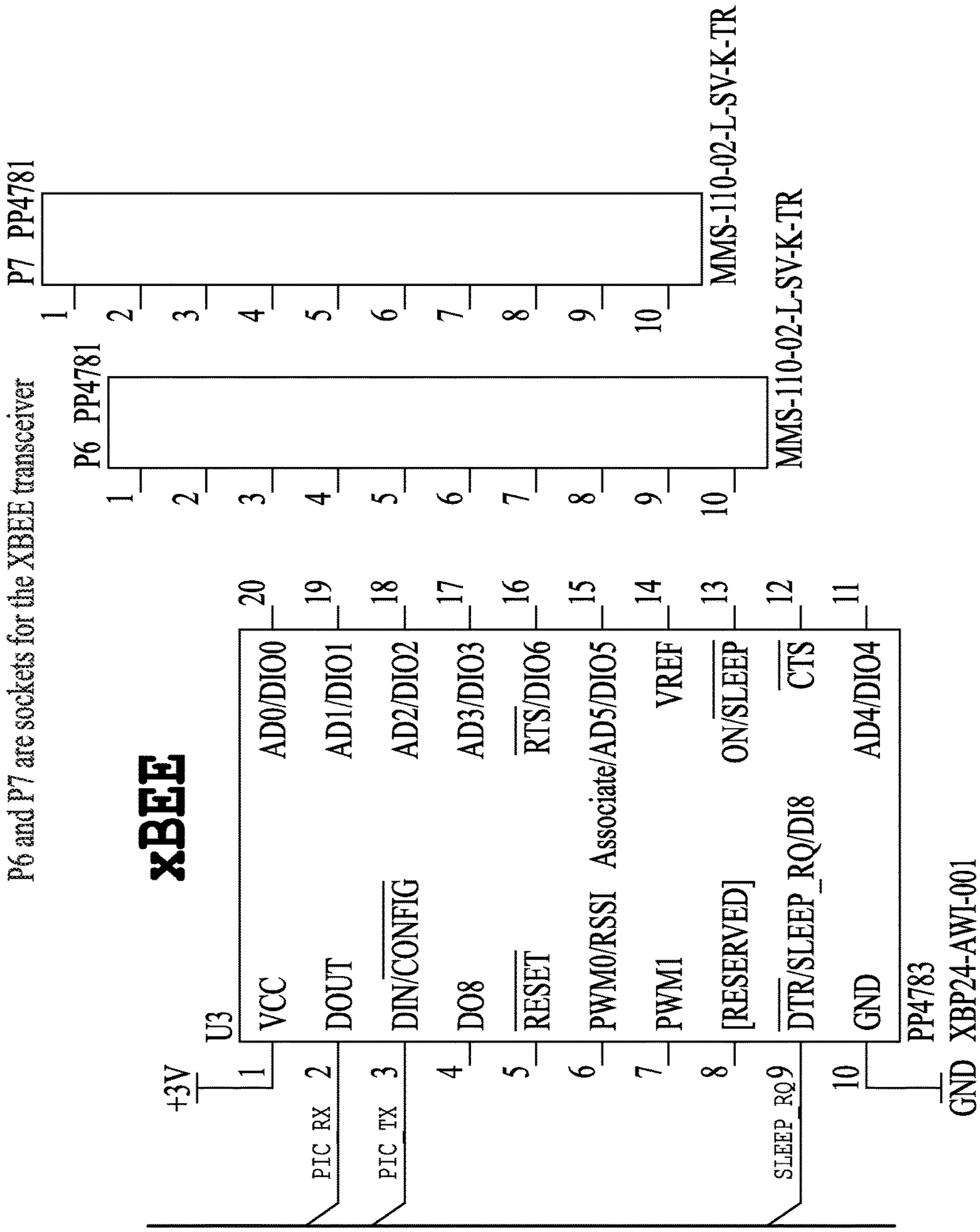
FIG. 20D is a circuit diagram illustrating a transceiver.
Figure 20E:
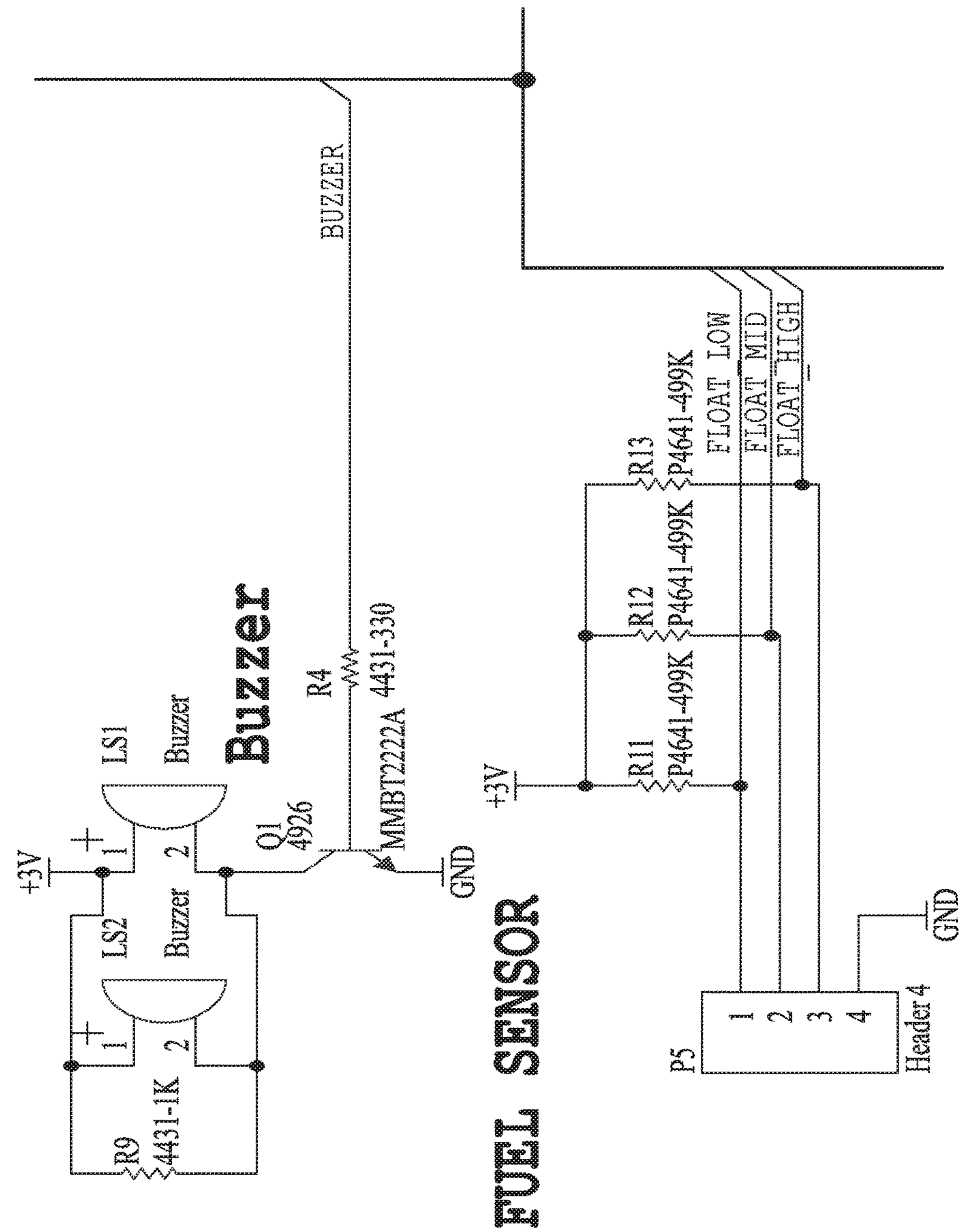
FIG. 20E is a circuit diagram illustrating a buzzer to provide acoustic feedback.
Figure 20F:
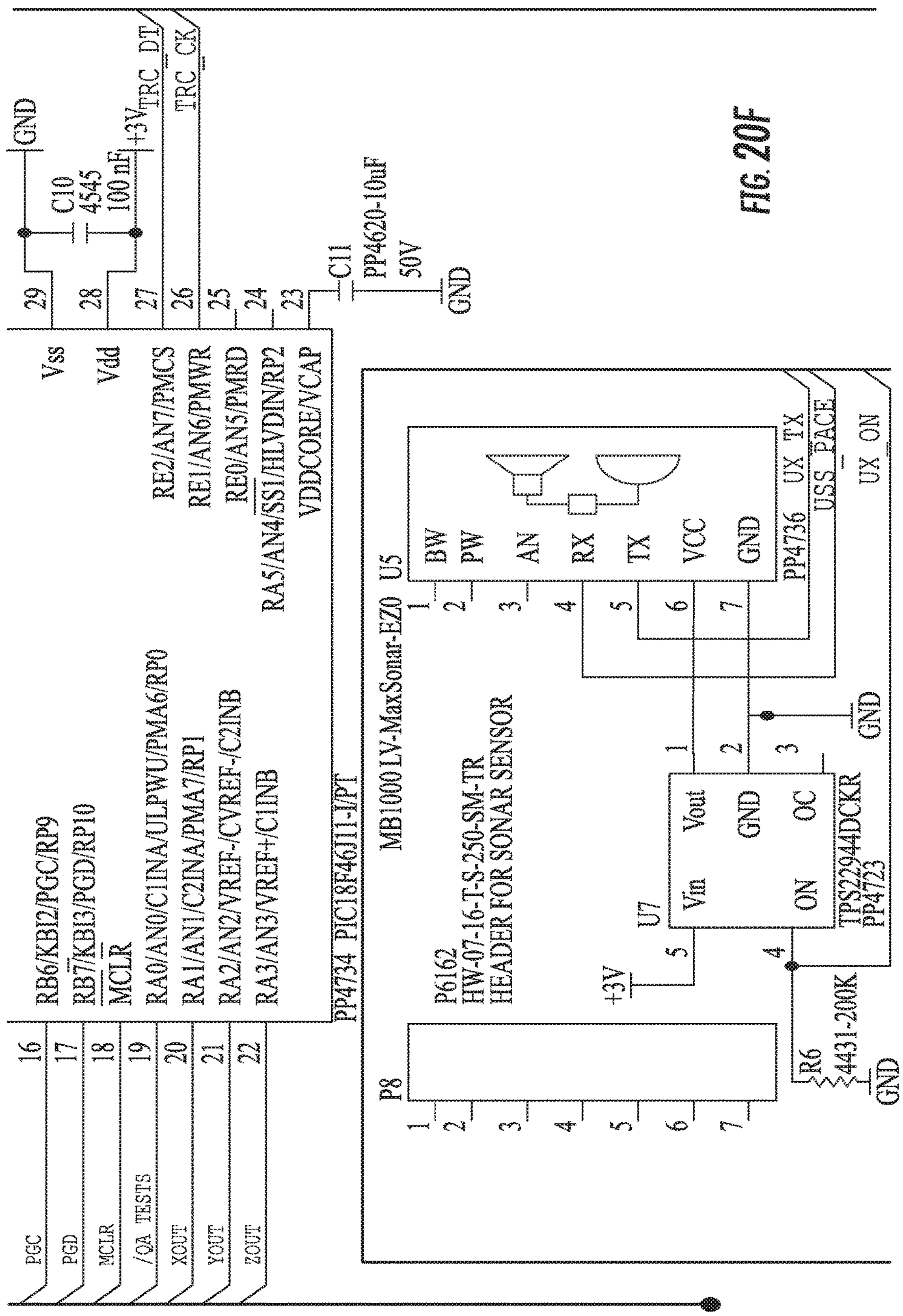
FIG. 20F illustrates a sonar rangefinder used to detect cargo.
Figure 20G:
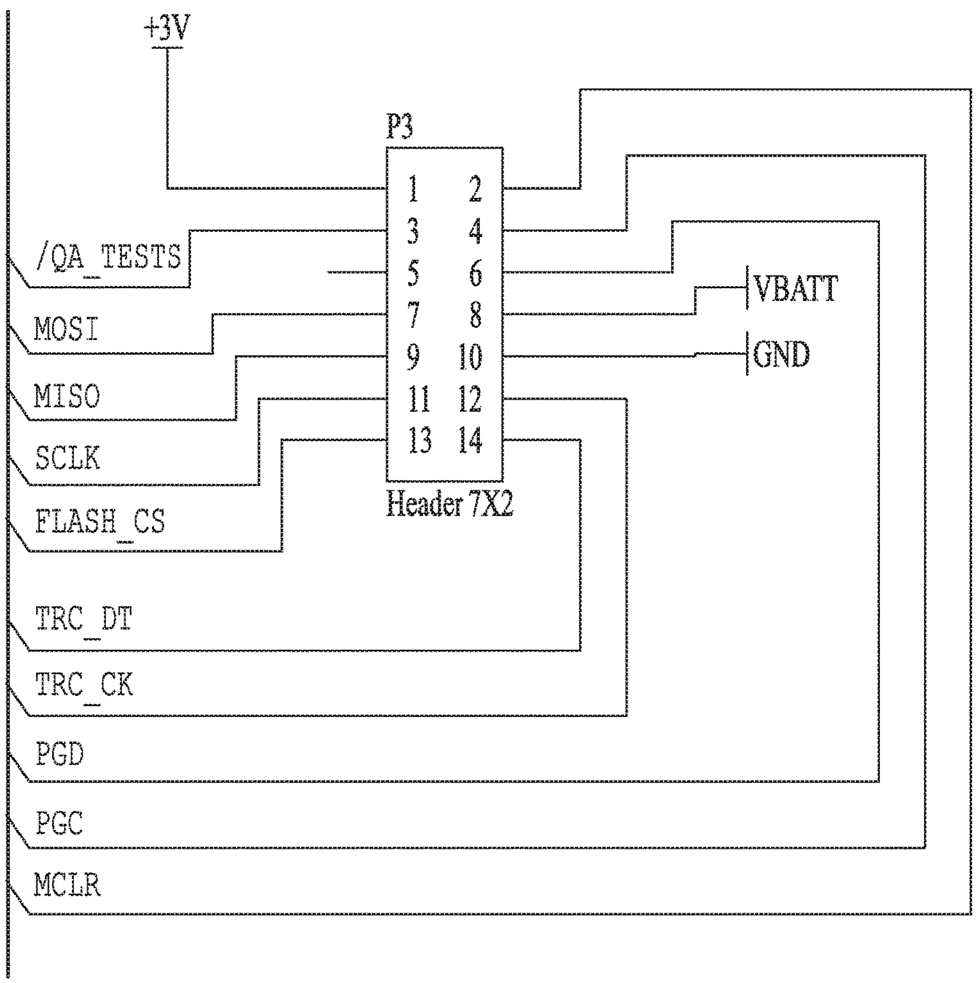
FIG. 20G illustrates circuitry related to production diagnostics and programming.
Figure 20H:
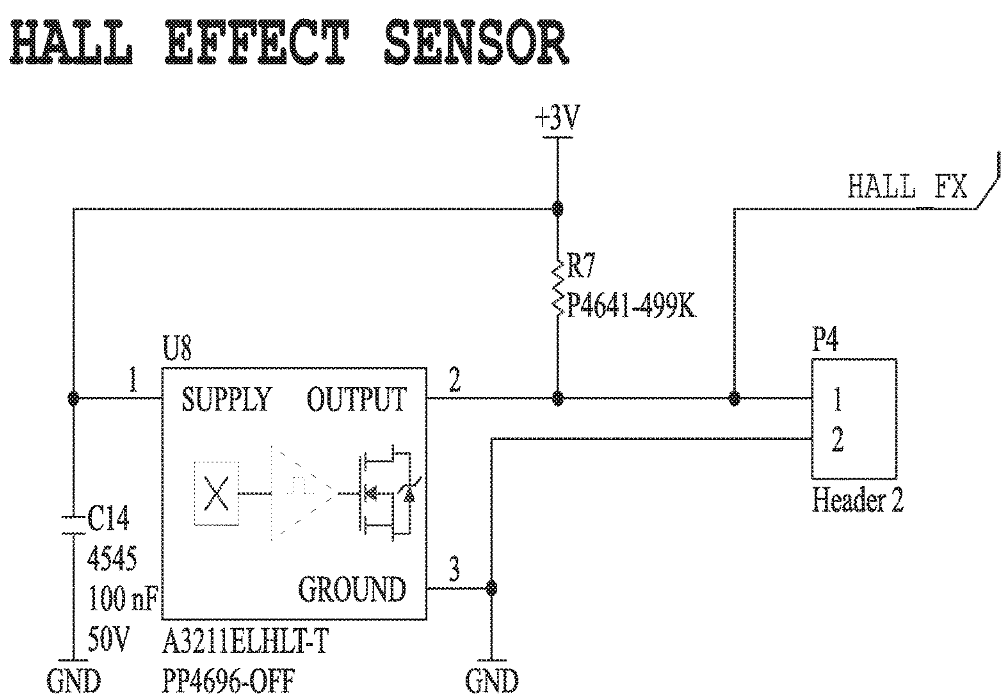
FIG. 20H is a circuit diagram illustrating a magnetic sensor.
Figure 20I:
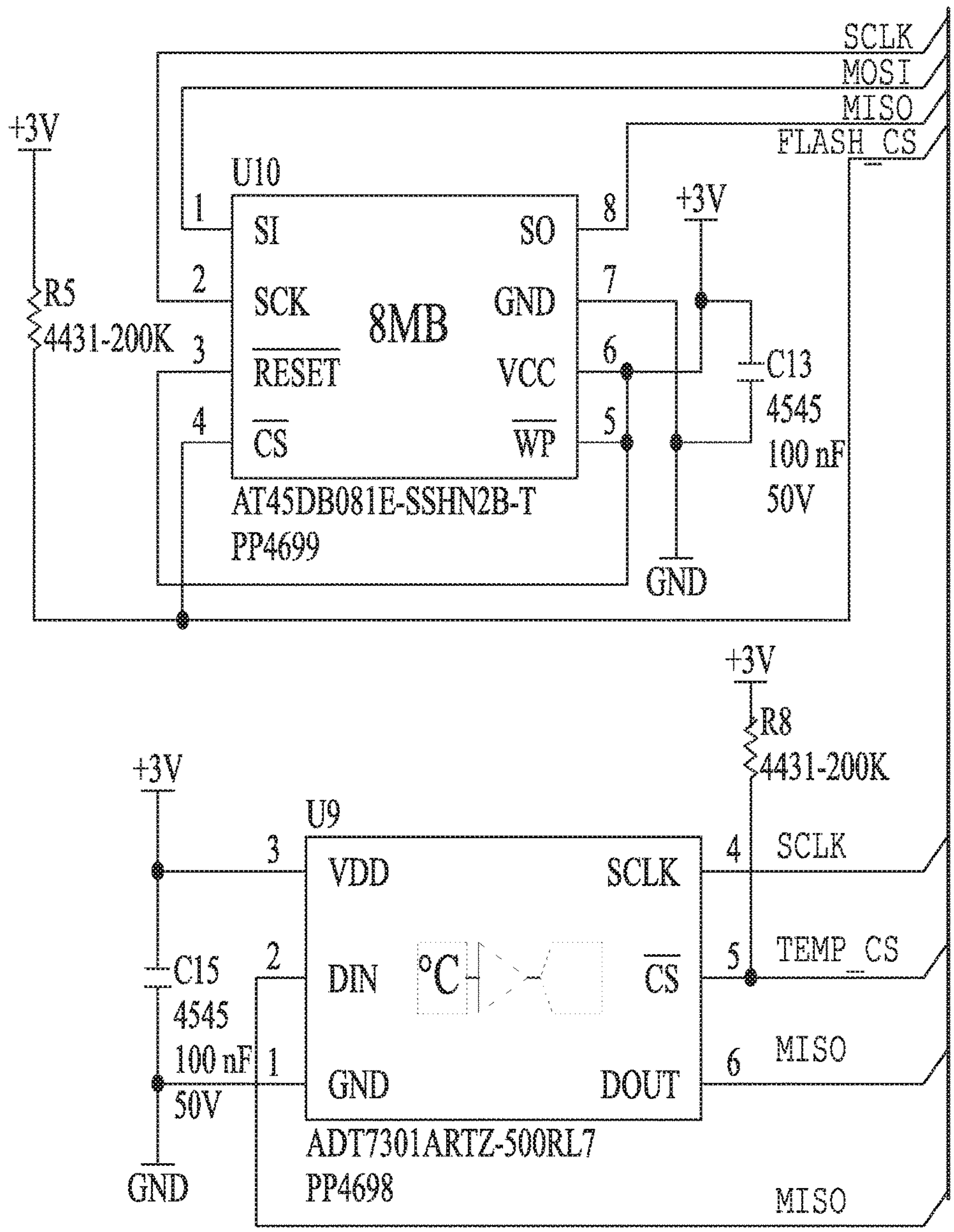
FIG. 20I illustrates a temperature sensor.

FIGS. 20A-20I are circuit diagrams for the sensors (temp, cargo, door, fuel). FIG. 20A shows batteries to power sensor, PP4732 provides, which provides regulated 3.0 V power output for system. Header is for development and production diagnostics. FIG. 20B includes PP4731, which is accelerometer to indicate that vehicle is moving. FIGS. 20C and 20F illustrate the controller and 20F also contains optional sonar rangefinder used to detect cargo in the cargo sensor option. FIG. 20D shows IEEE 802.15.4 transceiver, which is used to communicate on the Zigbee network with the MCU. FIG. 20E illustrates a buzzer to provide acoustic feedback that the device is turned on. Header 4 provides connection to the external fuel sensor. FIG. 20G Header provides production diagnostics and programming. FIG. 20H shows magnetic sensor, PP4696—OFF, which is used to power the device on when magnet is removed from shipping position. FIG. 20I illustrates a temperature sensor for temperature option and PP4699 is extra memory for controller.

Figure 21A:
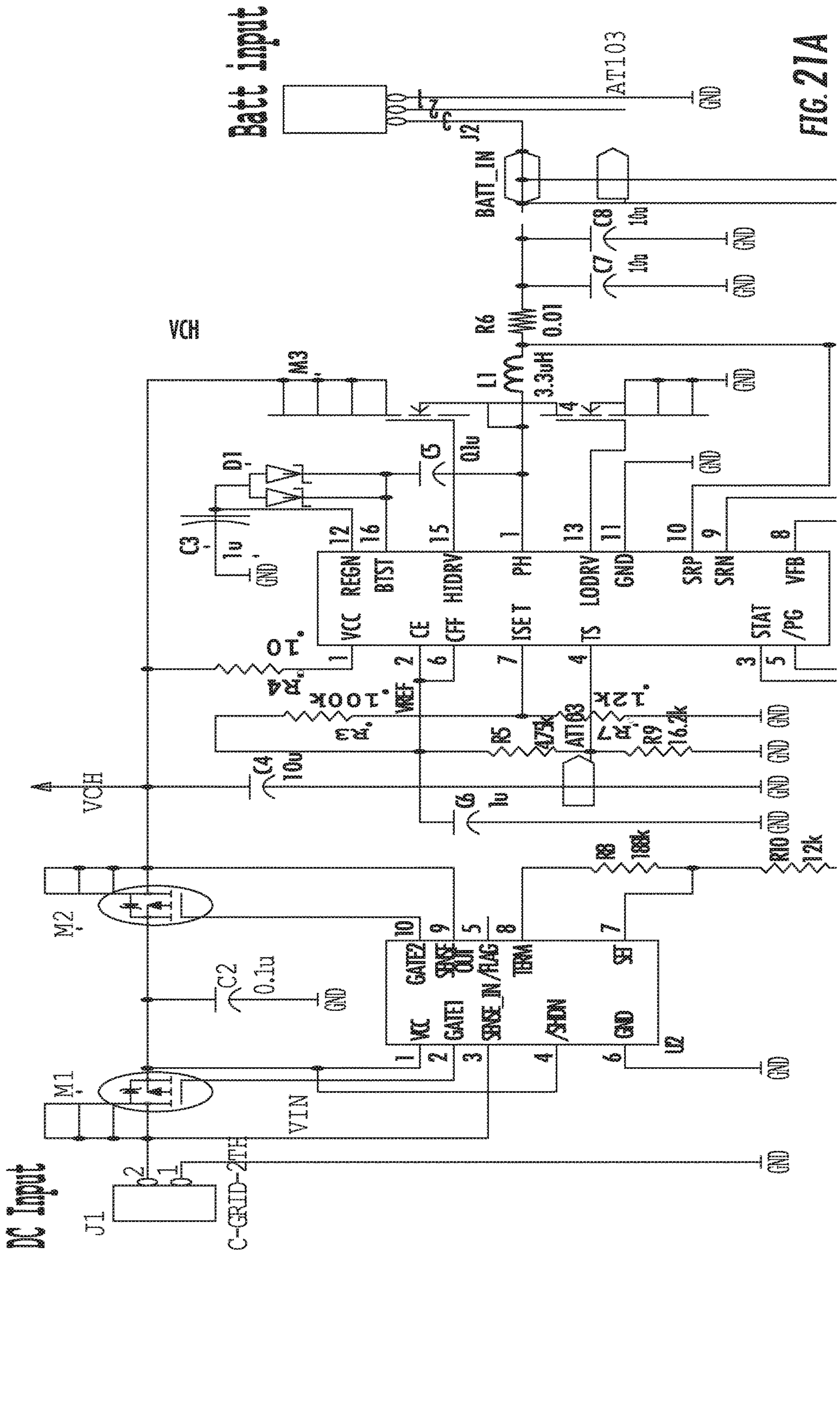
FIG. 21A illustrates an 'ideal diode' circuit to reduce losses.
Figure 21B:
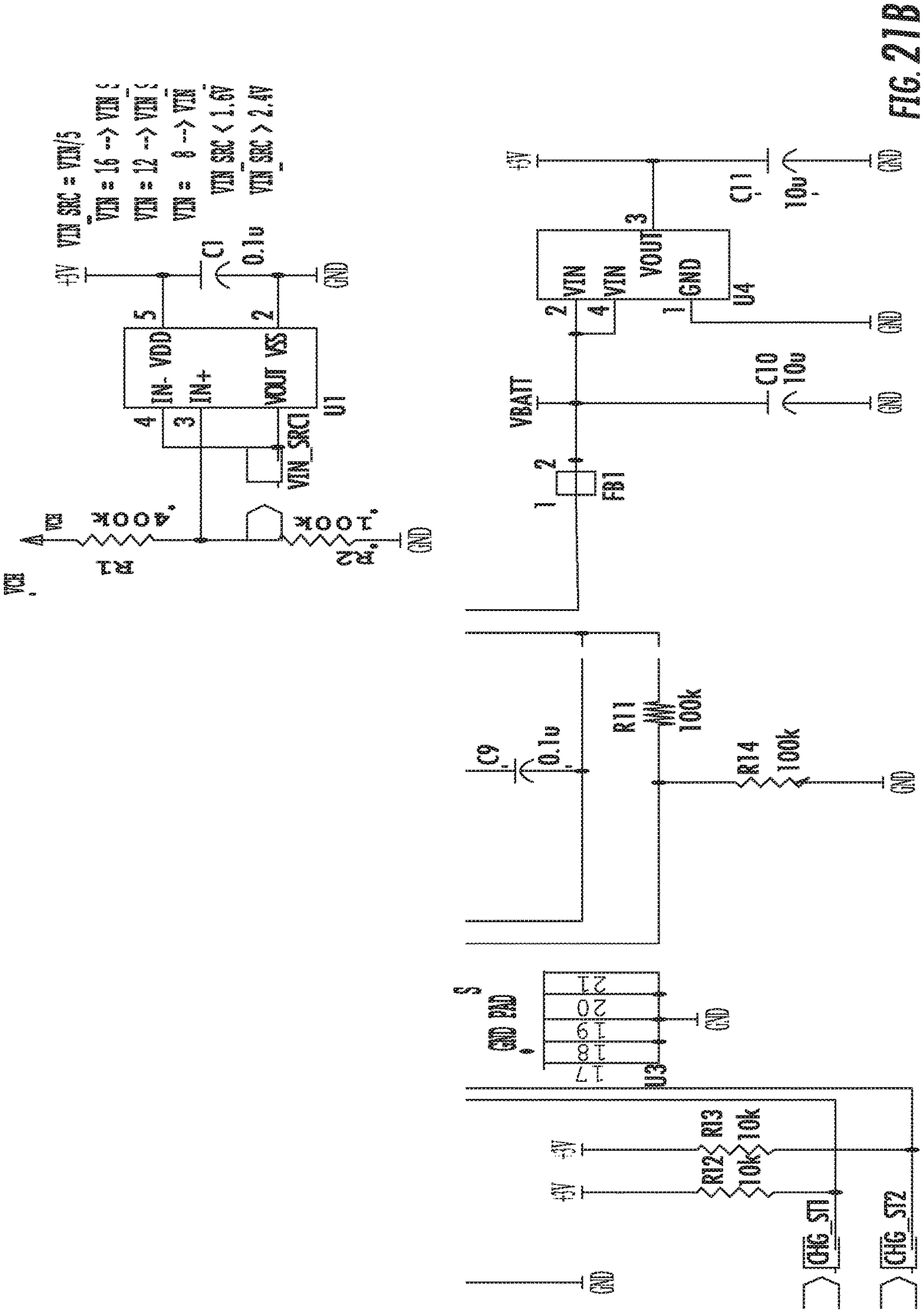
FIG. 21B illustrates OP AMP used to buffer/measure the voltage at a battery as it is charging.
Figure 27C:
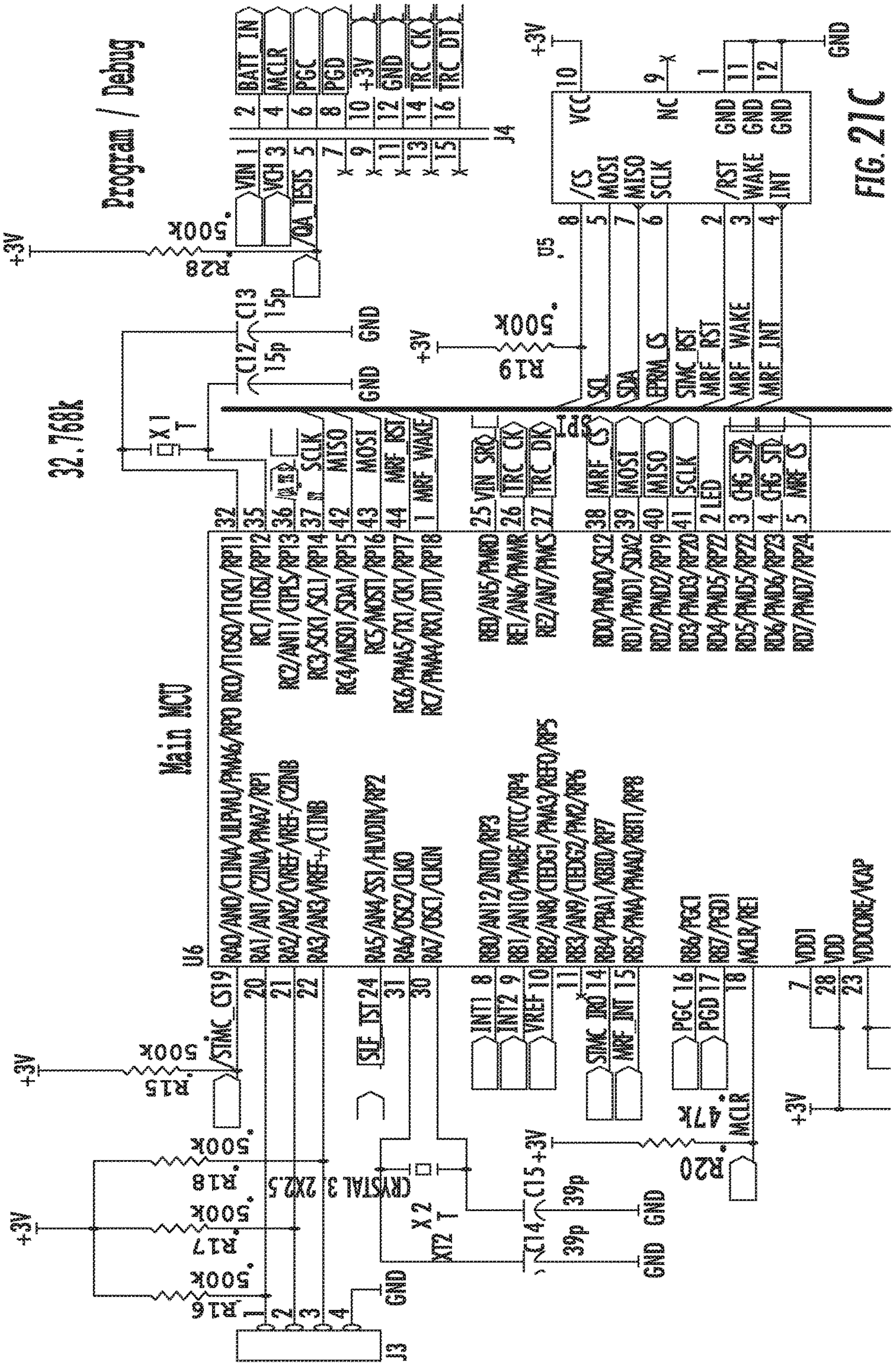
FIG. 27 illustrates a screen shot view of a user interface where the table is expanded and maximized such that the map is minimized at the top right of the screen.
Figure 21D:
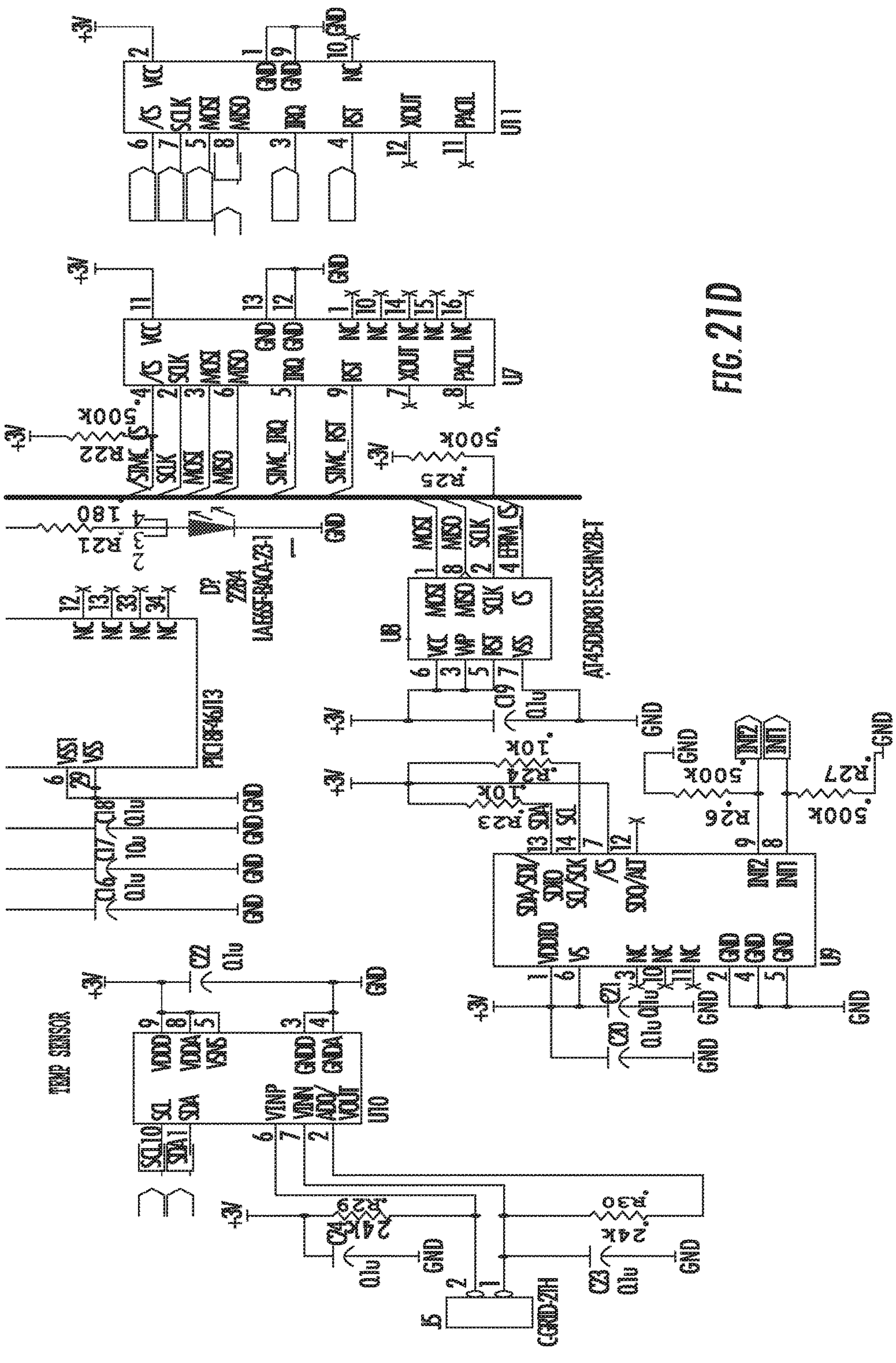
FIG. 21D illustrates a temperature sensor to monitor ambient temperature, an extra memory for controller, a wireless modem for non-Zigbee communication, and an accelerometer.

FIGS. 21A-21D show detailed circuitry for one embodiment of a Smart bridge. FIG. 21A shows U2, which is an 'ideal diode' circuit to reduce losses. The remainder of the circuit provides battery charge current. FIG. 21B shows U1, which is an OP AMP used to buffer/measure the voltage at the battery as it is charging. U4 provides regulated 3V power for the system. FIG. 21C includes main controller (U6), and IEEE 802.15.4 transceiver (U5) for connection to the Zigbee network and communication with the MCU. FIG. 21D includes a temperature sensor to monitor ambient temperature (U10), an extra memory for controller (U8), a 2.4 GHz wireless modem for non-Zigbee communication (U11), and an accelerometer (U9) to detect when the vehicle is in motion.

Figure 22A:
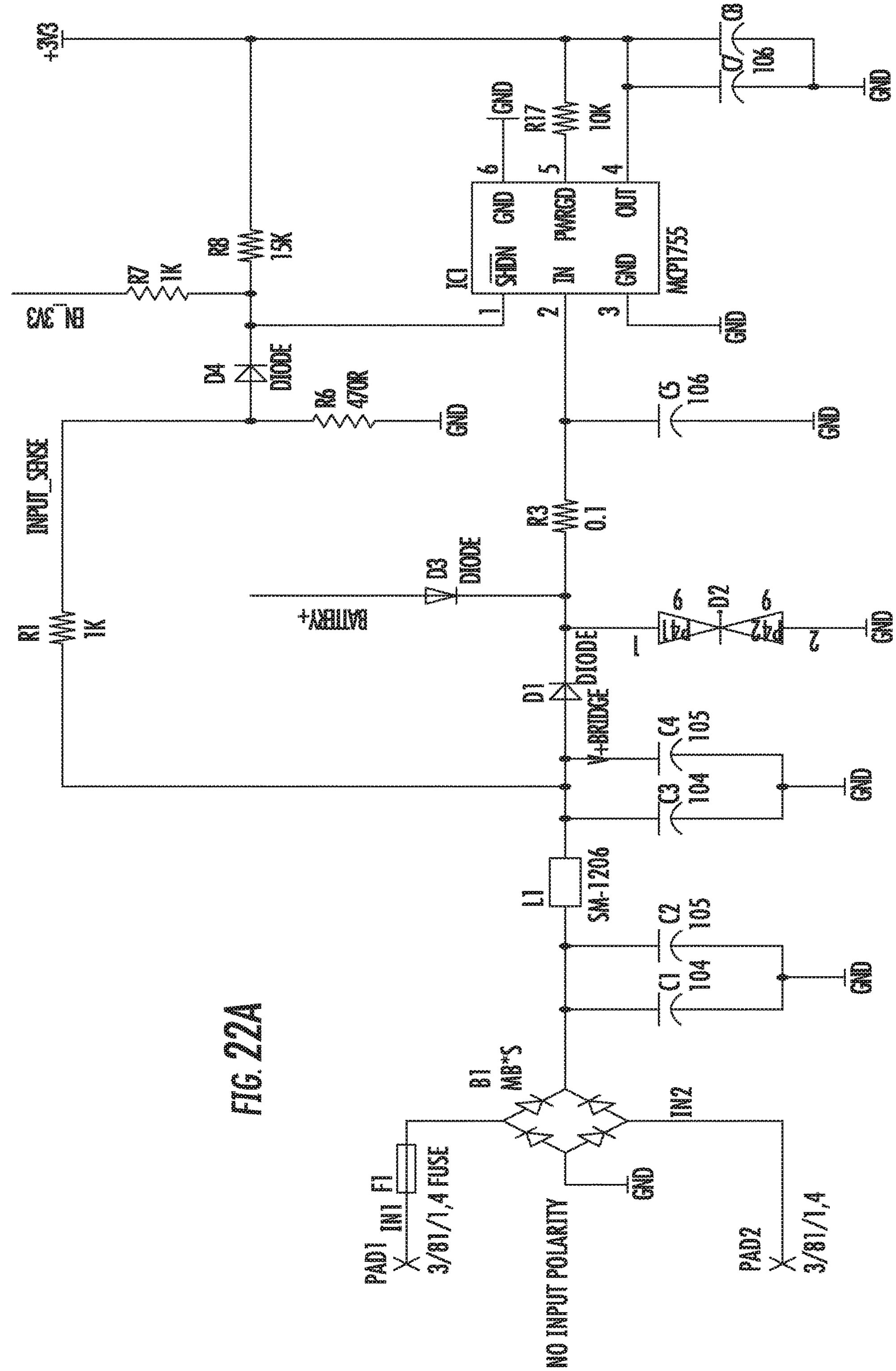
FIG. 22A illustrates a signal conditioning for sensed lamp inputs.
Figure 22B:
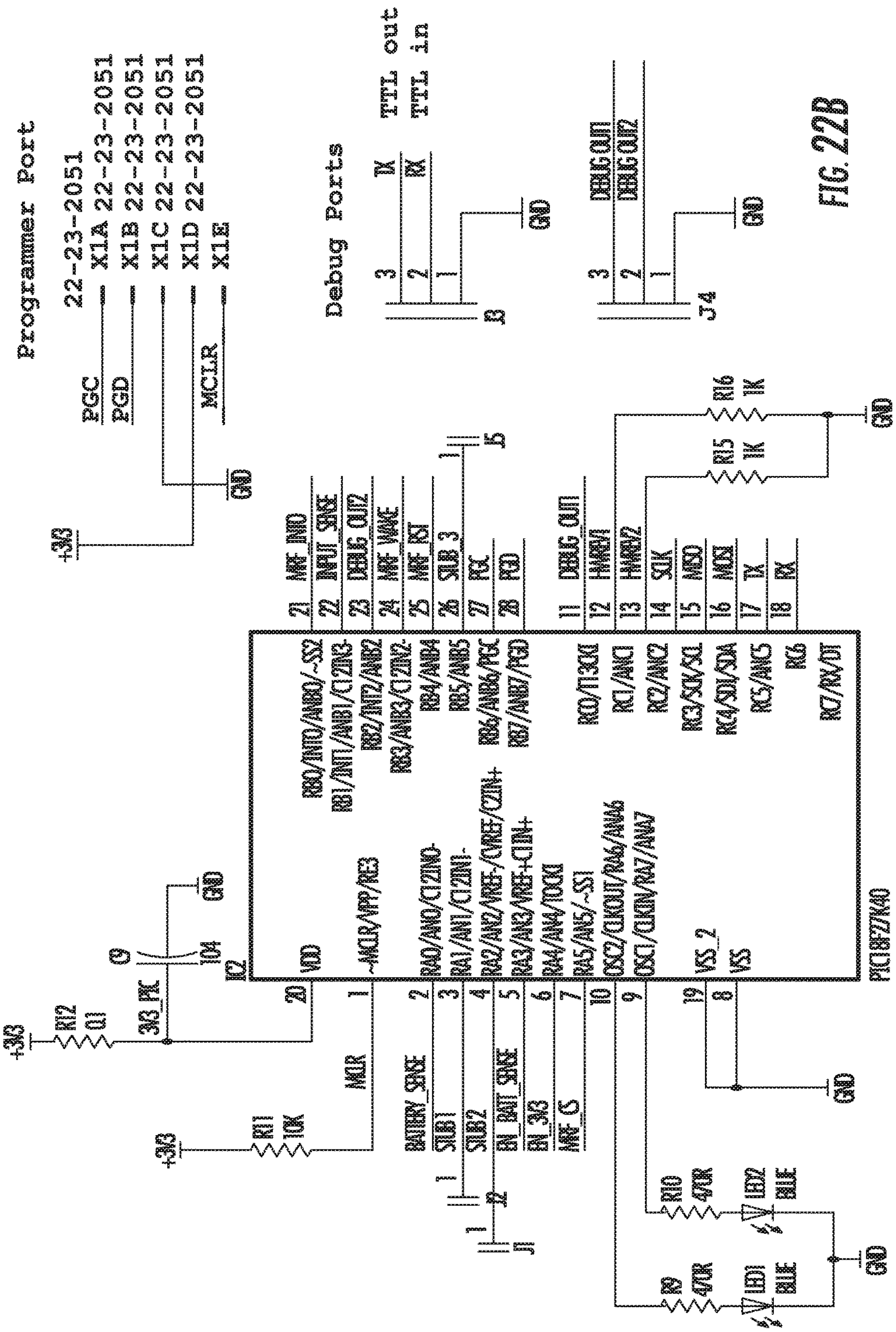
FIG. 22B illustrates a main controller.
Figure 22C:
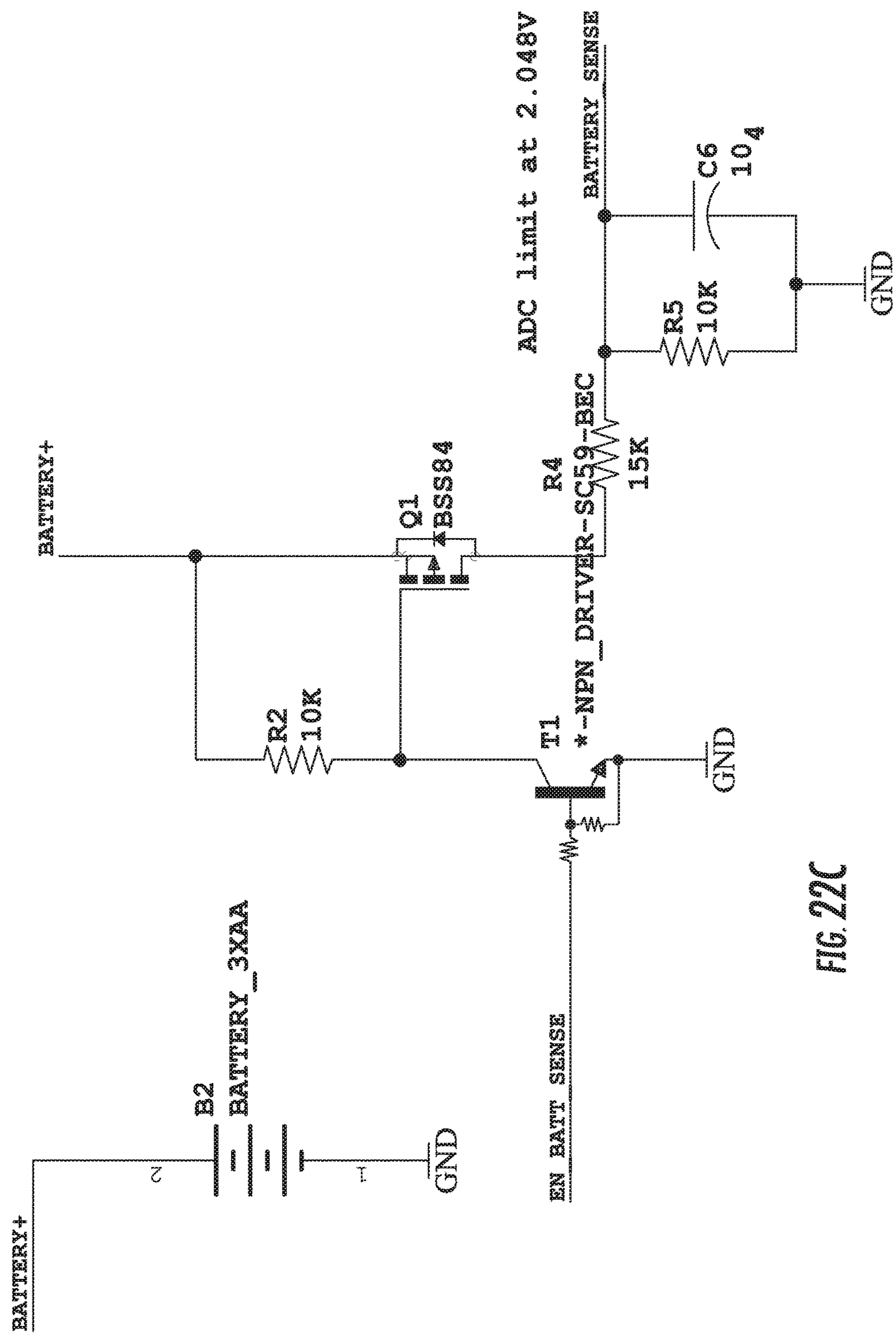
FIG. 22C illustrates a battery to power a sensor.
Figure 22D:
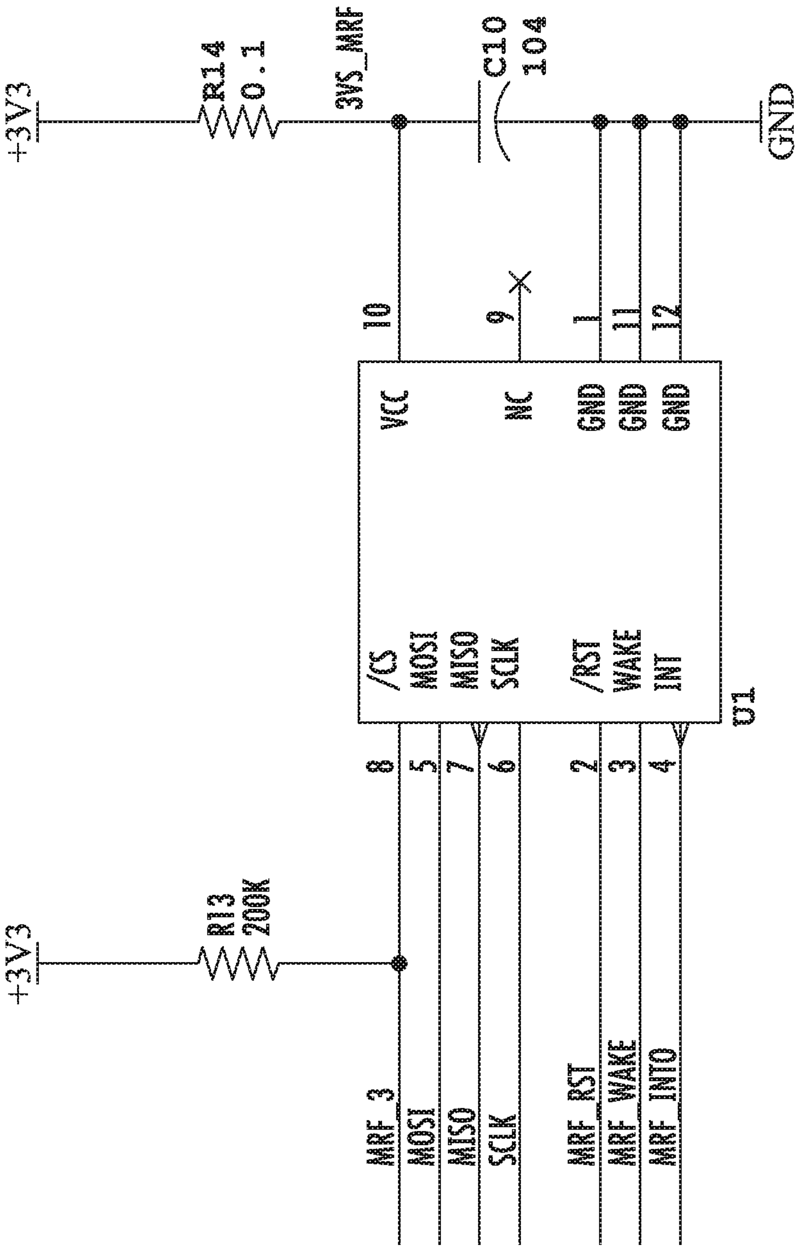
FIG. 22D illustrates a transceiver for communication on a Zigbee network and communication to the MCU.

FIGS. 22A-22D show the circuitry for a warning lamp sensor. FIG. 22A shows signal conditioning for sensed lamp inputs, IC1 provides 3.3V regulated supply for system. FIG. 22B illustrates main controller IC2. FIG. 22C illustrates a battery to power sensor, where the remainder of circuit disconnects battery measurement circuits to preserve battery life when sensor is not active. FIG. 22D shows U1 IEEE 802.15.4 transceiver for communication on Zigbee network and communication to the MCU.

Telematics ready system 500 also includes a user interface or alerts dashboard, which gives a complete fleet overview of any trailer failures. A map of each trailer's location is displayed with written details below. A trailer dashboard gives a complete digital view of the trailer's current status including tethered/untethered, tractor voltage, lighting status, ABS status, tire conditions, temperature of the trailer, cargo status and door position. Examples of the user interface are shown in screen shot FIGS. 23-41.

Figure 23:
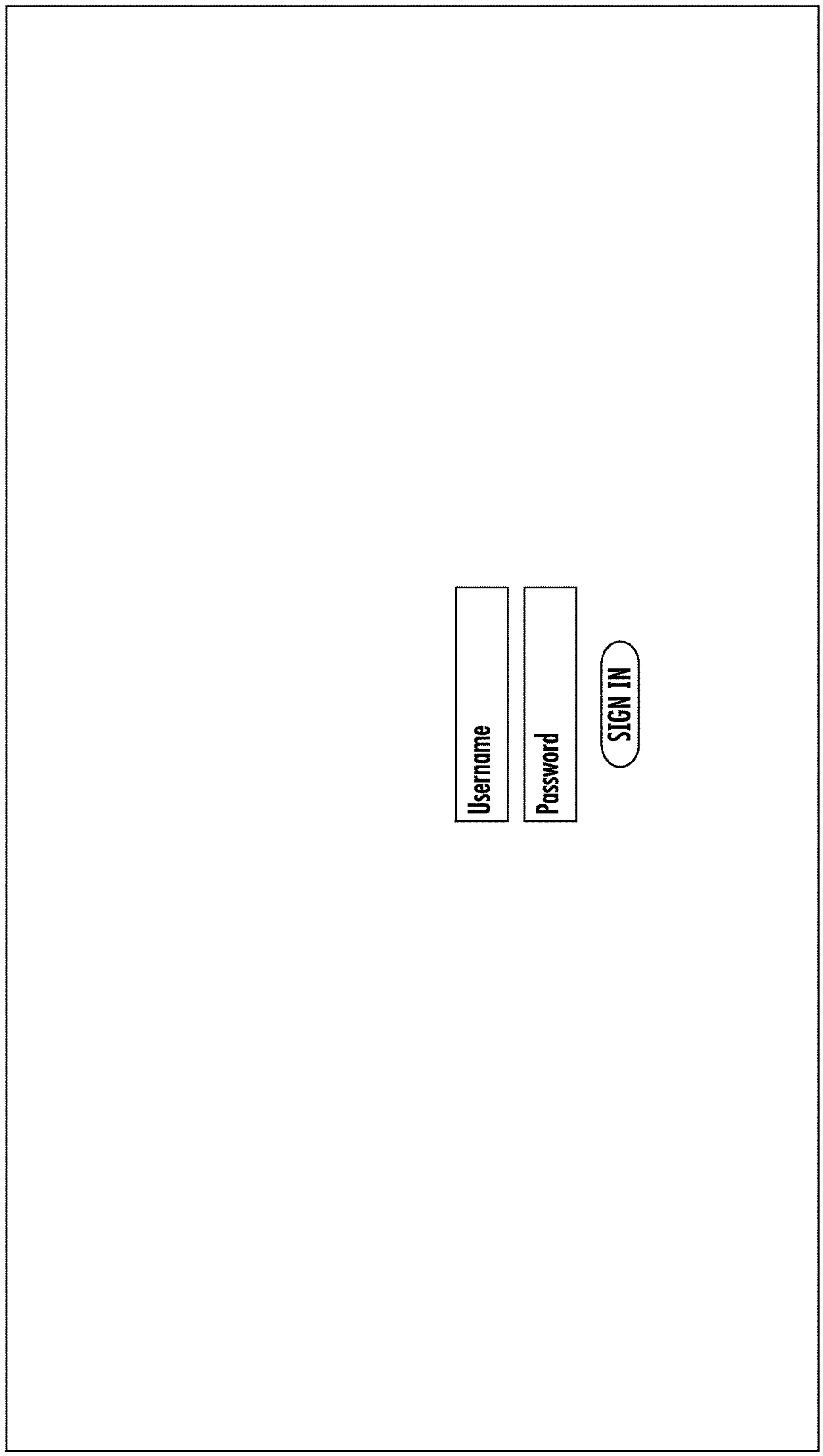
FIG. 23 is a screen shot of a user interface showing a login screen.

FIG. 23 is a login screen wherein a username and password are entered. The Login Screen requires a User Name and Password and is formatted so that individual users within the same company can log into the user interface. Depending on company preferences, a user may have access to partial views of fleets, regional views, national views of the fleet operations, or all views.

Figure 24:
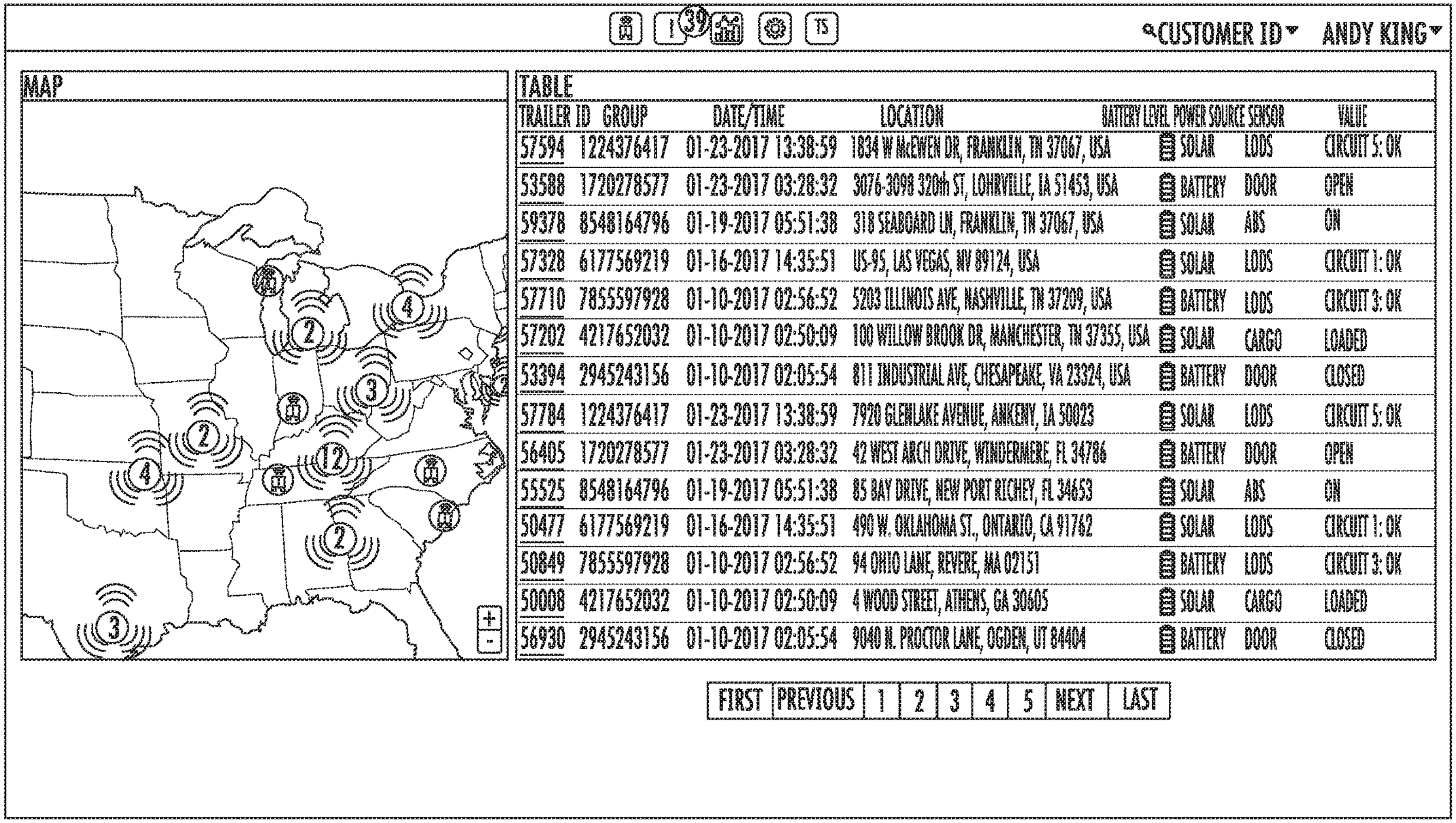
FIG. 24 is a screen shot of a user interface showing an overview screen with an initial view of a fleet GPS location of a particular trailer.
Figure 26:
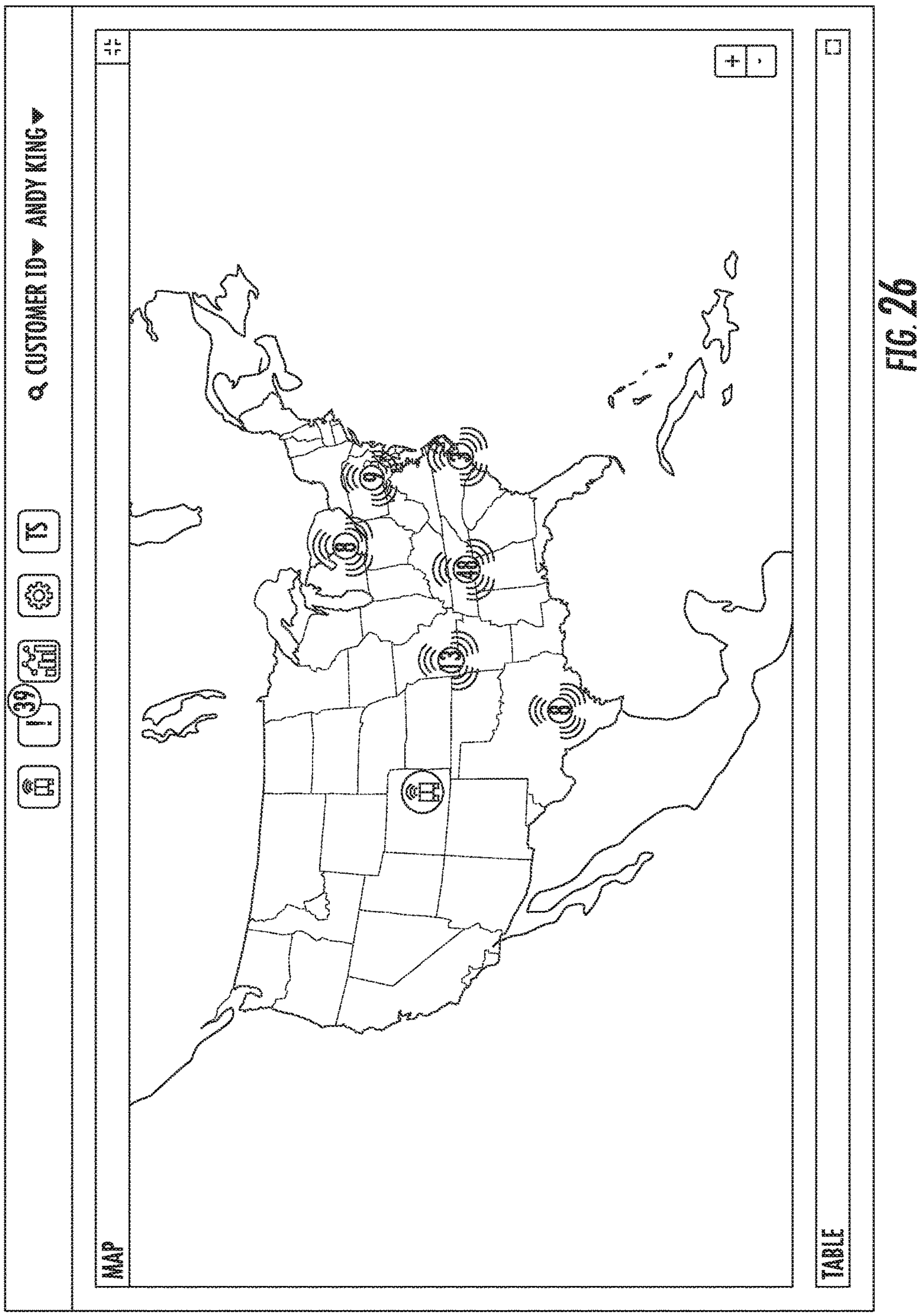
FIG. 26 is a screen shot of a user interface showing the map expanded and maximized and the table minimized.
Figure 27:
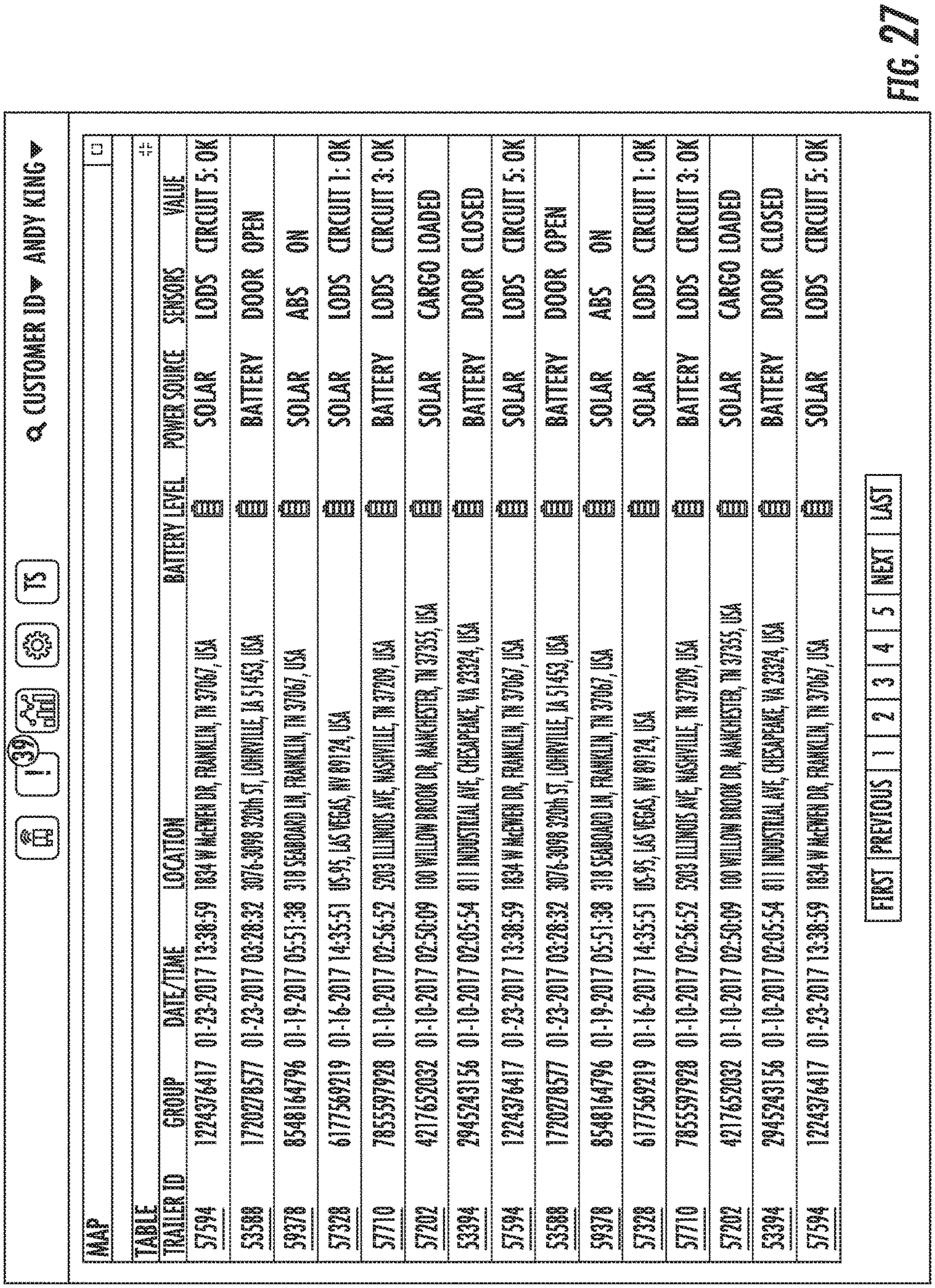

FIG. 24 is an overview screen showing an initial view of the fleet GPS location of a particular trailer. Specifically, a map is shown on the left of the screen, and a table on the right of the screen. Location data of an entire fleet or individual trailer is possible via a Global Positioning Sensor (GPS) located on the trailer. This sensor provides both latitudinal and longitudinal location data, and represents the current address of a particular trailer. A cluster circle having a number, positioned over a certain location (i.e., a "geo area") on the map, indicates a grouping of trailers in that specific location. The user has the option of zooming into a particular geo area and obtaining data related to an individual trailer. FIG. 25 is another overview screen shot showing an alternate view where the map is located at the top of the screen, and the table at the bottom of the screen. FIG. 26 is a screen shot showing the map expanded and maximized and the table minimized to the bottom right of the screen. FIG. 27 illustrates a screen shot view where the table is expanded and maximized such that the map is minimized at the top right of the screen.

FIG. 28 is a screen shot showing a table view of a trailer list. It provides a status report of a trailer identified with that trailer's ID number, group that it associates, the date and time that it last reported, and GPC location of the report. Also shown is sensory data information for each trailer including battery level, power source, the particular sensors, such as the light failure detection system, door, ABS, Cargo sensors and "value" for that sensor. Trailers shown in Red are under an ALERT status, while trailers shown in Green are indicative of all sensors reporting within threshold settings. This screen can also show a cluster of trailers in Red indicating an ALERT status as well as clusters of trailers in Green, indicating all sensors reporting within threshold settings.

Figure 29:
FIG. 29 is a screen shot of a user interface illustrating how a user may zoom into a particular geo area on the map.

FIG. 29 is a screen shot illustrating how a user may zoom into a particular geo area on the map, located at the top of the screen. The bottom of the screen shows a table view of the trailers coinciding with the zoomed location on the map. Specifically, the table provides a status report of each trailer, with the trailer's ID No., group that the trailer is associated with, the date and time that it last reported, GPS location of the report, and sensory data information including battery level, power source, the specific sensor and its value. The trailer data list may be adjusted based on the level of zoom set by operator of the user interface (UI).

Figure 30:
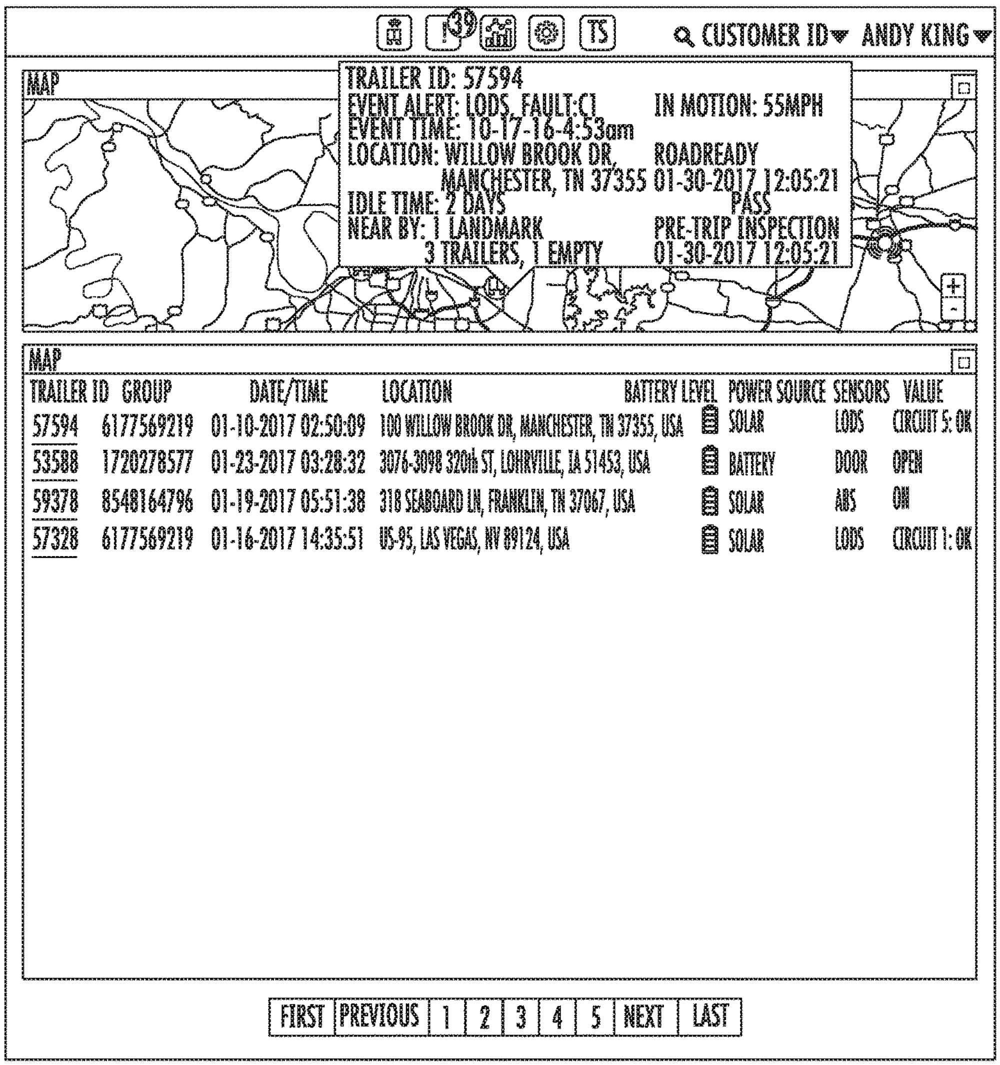
FIG. 30 illustrates the user interface's "Hover-Over" functionality.

FIG. 30 illustrates the user interface's "Hover-Over" functionality. This feature of the user interface allows a user to "click" on a particular location on the map and receive information for a specific trailer ID. Specifically, the Hover-Over functionality provides statistical data of a trailer asset, and lists the following: In-Motion or Park, Speed/velocity, and status if In-Motion. Also, included in this screen, is the table view of the trailer listed. The table provides a status report of each trailer, as listed in the map located above the table, including event alert data, event time, GPS location, idle time for that time period, nearby landmarks if any, nearby roads, and the Ready Status of the trailer. The Ready Status of the trailer refers to the ability of a user to "ping" the trailer from the remote location. After pinging a particular trailer, a report will become available to the user subsequent to the system testing all the sensory devices on the trailer. The testing focuses on the trailer's tires, brakes, and lights. In addition, all other sensory data that the trailer is equipped will report if installed such as temperature, door open, status, and cargo.

Figure 31:
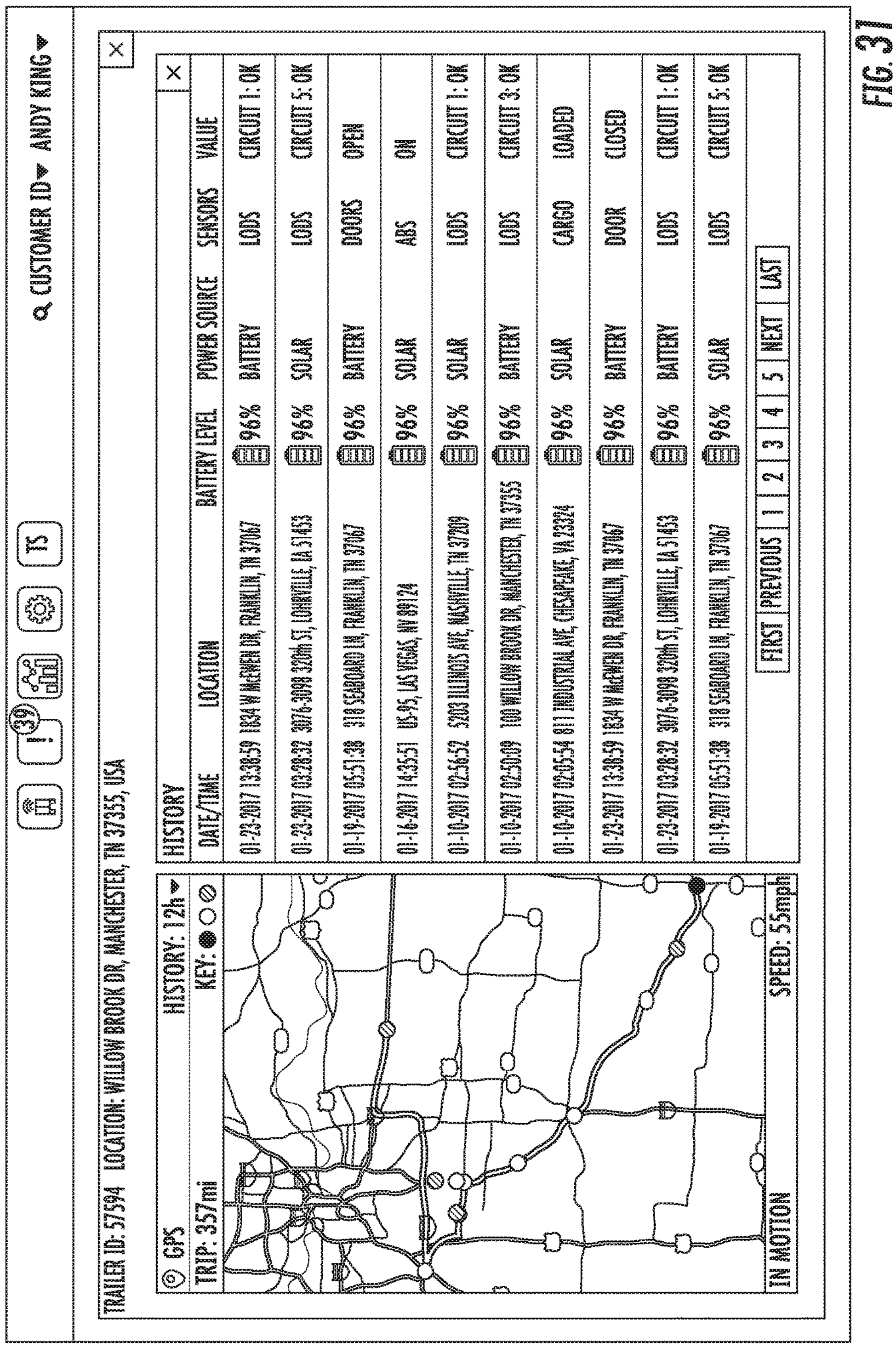
FIG. 31 illustrates a screen shot of user interface showing how a user can zoom in on a particular geo area to see where on the map individual trailers are located via the GPS sensor.

FIG. 31 illustrates how a user can zoom in on a particular geo area to see where on the map individual trailers are located via the GPS sensor. The map view (on the left of the screen) provides the status of each trailer via color-coding where a Red dot indicates an ALERT status for a particular trailer and a Green dot indicates all sensors on a particular trailer reporting within threshold settings.

Figure 32:
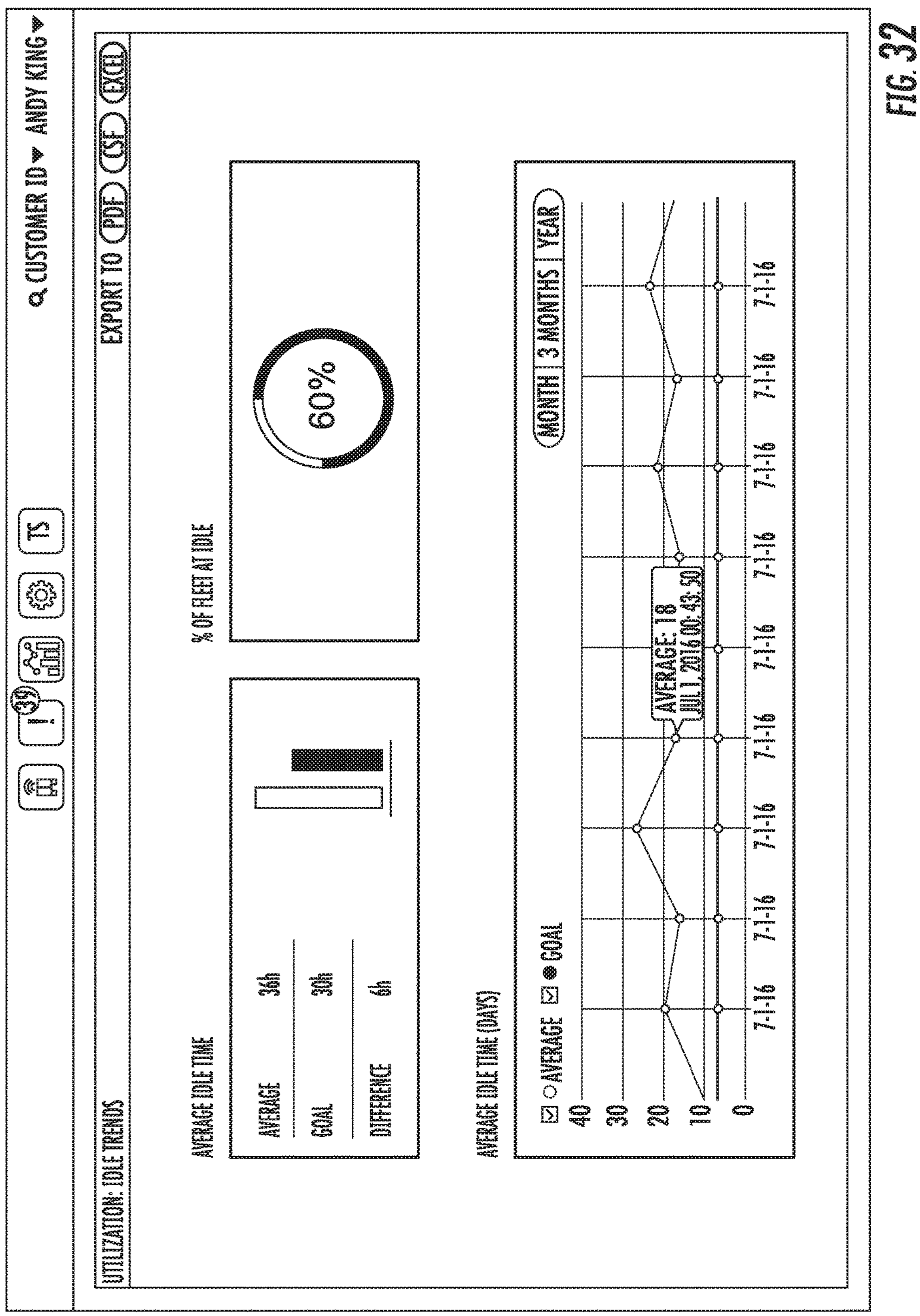
FIG. 32 is statistical screen of a user interface that allows a user to assess efficiency and utilization of time with respect to a fleet of trailers.

FIG. 32 is statistical screen that allows a user to assess efficiency and utilization of time with respect to a fleet of trailers. The bar graph in the top left of the screen shows in Red the goal Idle Time, in Green the actual average Idle Time, as well as the difference between the two. At the top right of the screen a percentage of the fleet that is idle for a given time period is shown (in this case three months). At the bottom of the screen is a graph showing the Average Idle Time in days for a particular time period. This allows the remote facility to easily assess how efficient a fleet is, and to strategize as to how to improve fleet efficiency.

Figure 33:
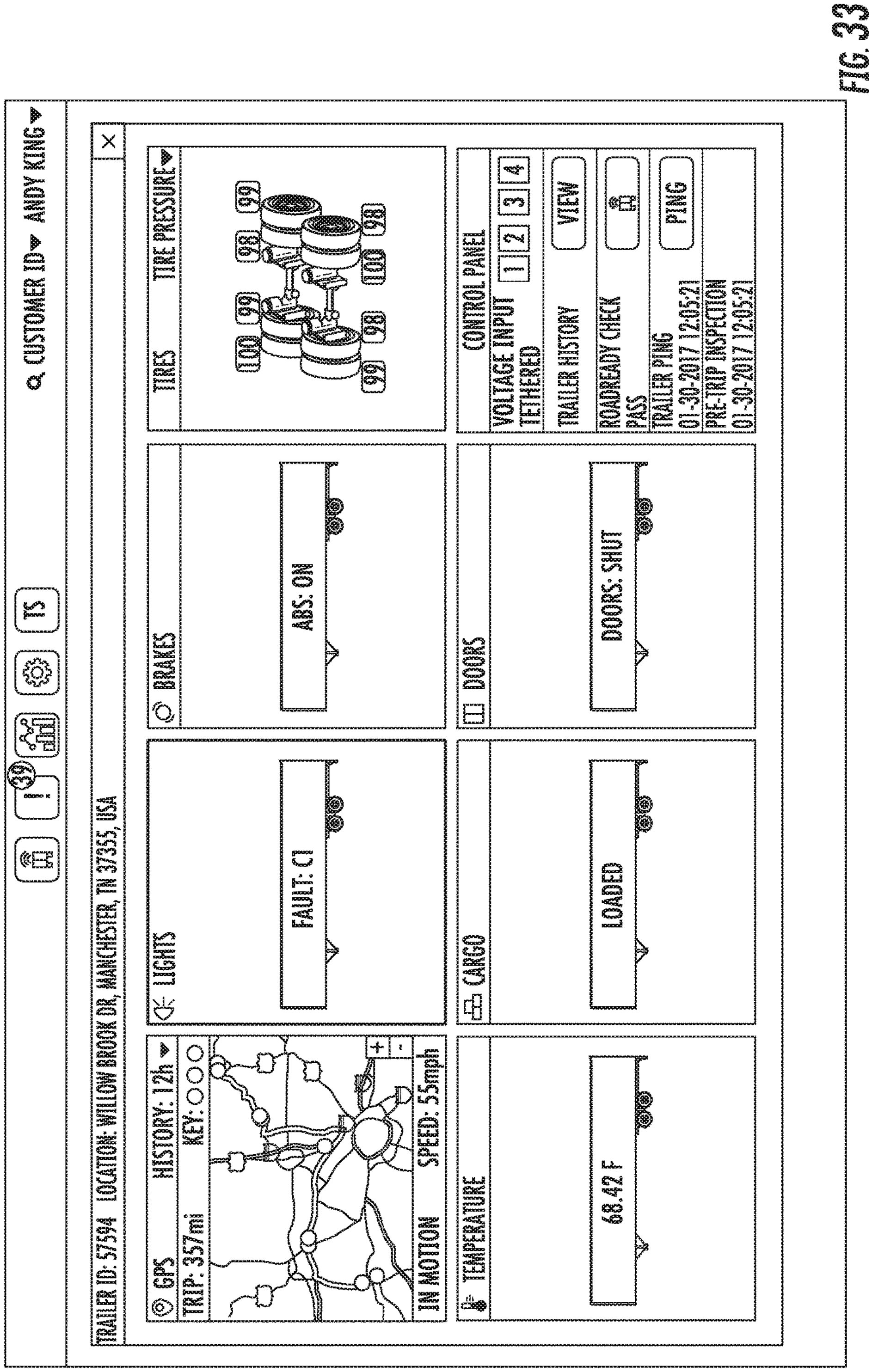
FIG. 33 is a trailer dashboard overview screen shot showing a light failure.

FIG. 33 illustrates a dashboard screen shot wherein a user may utilize GPS data to zoom in and out of a particular location on the map. FIG. 33 also shows how clicking on a trailer icon as shown on an overview screen, allows a user to zoom in on a trailer, which appears as either a Red or Green dot. This can be displayed on the trailer dashboard at the upper left corner of the screen. In addition, the trailer dashboard provides specific sensor data with respect to a particular trailer including: GPS location, light status, brake status, tire pressure, temperature, cargo (loaded or unloaded), and door status.

More particularly, FIG. 33 is a trailer dashboard overview screen showing a light failure fault shown as FAULT:C1. A trip check can be initiated by clicking an icon ROADREADY CHECK. A timestamp of physical pre-trip inspection at trailer location is also indicated in the lower right corner of the screen.

With respect to GPS location data, this information may include: location of the trailer at last report (blue Dot), breadcrumb trail of the trailer for that period of time (12, 24, 36 hours), and speed of the trailer (In-Motion, or parked). If the breadcrumb is shown as a Green dot, this represents a point in time when the trailer reported all sensors within settings. A Red dot on the other hand, represents a trailer report with an alarm status.

FIG. 33 also shows how a user can receive details regarding the status of a specific trailer at a particular reporting time. Specifically, the GPS location function can be utilized to assess trip history and mileage data for the time frame requested. In addition, the user interface provides the capability to adjust the time period as required by the user interface operator. All data originates from the MCU mounted on top of the trailer.

The "LIGHTS" pane will report a light out in the event a light on the trailer has been damaged, has failed electrically, or is missing. The UI data also provides the circuit number associated with the light that is reporting the event. Information concerning trailer lights flows from the light failure detection system 210 including voltage and current, which are monitored in the firmware of the sensor.

The "BRAKES" pane provides information regarding the trailer's ABS brakes. The reporting is attribute data only, meaning information provided concerns whether the brake system is functional or non-functional. The ABS sensor works on the same signal that turns the ABS light on or off on the trailer harness system. Information flows from the warning light sensors.

The "TIRES" pane reports several pieces of data with respect to the trailer's tires including: tire pressure (TPMS), tire inflation, and hub mileage.

The temperature sensor pane reports the present temperature inside the trailer. The temperature sensor utilizes a thermistor to report the temperature inside the trailer. There can be up to three temperature sensors per trailer.

The "CARGO" pane provides data originating from the cargo sensor and reports the present inside cargo status within the trailer. Specifically, this pane reports whether the trailer at issue is loaded or unloaded. The cargo sensor has a radar device that senses objects within a 5-ft. radius of a radar cone.

The "DOORS" pane indicates whether a door is open or closed. The reporting is attribute only. Thus, the door sensor will report that the door is open or closed only. The Door Open Sensor is mounted on the inside of the trailer (ceiling mount).

The "CONTROL PANEL" pane reports the status of several miscellaneous items including: Status of the trailer (tethered or un-tethered), voltage from the power unit, pre-trip inspection data and sensor status.

Figure 34:
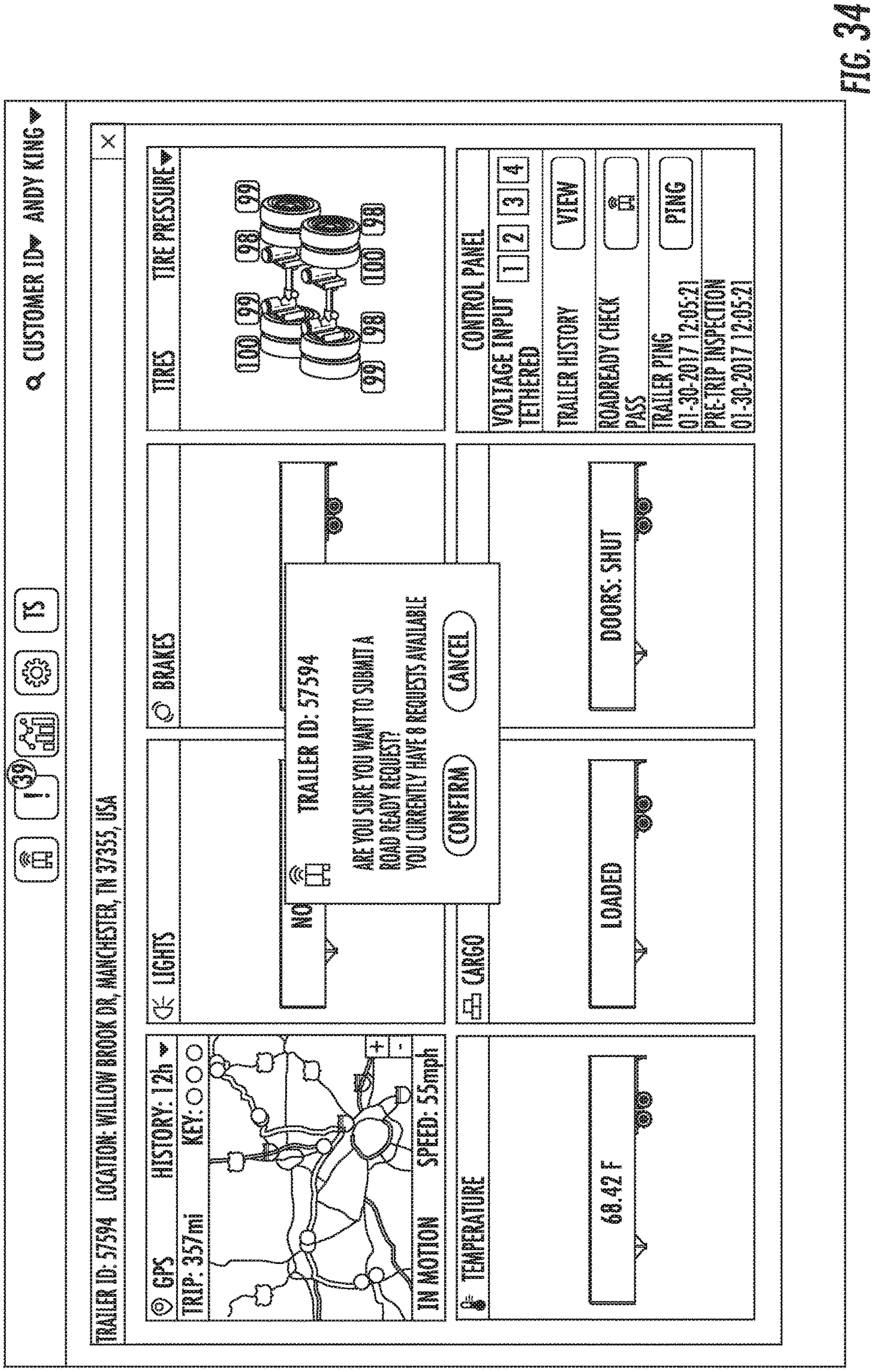
FIG. 34 is a screen shot of a user interface showing further details regarding a Control Panel pane of the user interface.

FIG. 34 provides further detail regarding the Control Panel pane of the user interface. As shown, after a ROADREADY CHECK is initiated by clicking on the appropriate icon, a message will pop up to prompt the user to confirm or cancel the request. This pane has a pinging function such that if a user wants to understand the status of the trailer, they can ping the trailer and get information for that particular trailer regarding: tires, lights, and brakes status. The control panel pane will also report a pass or fail status.

Figure 35:
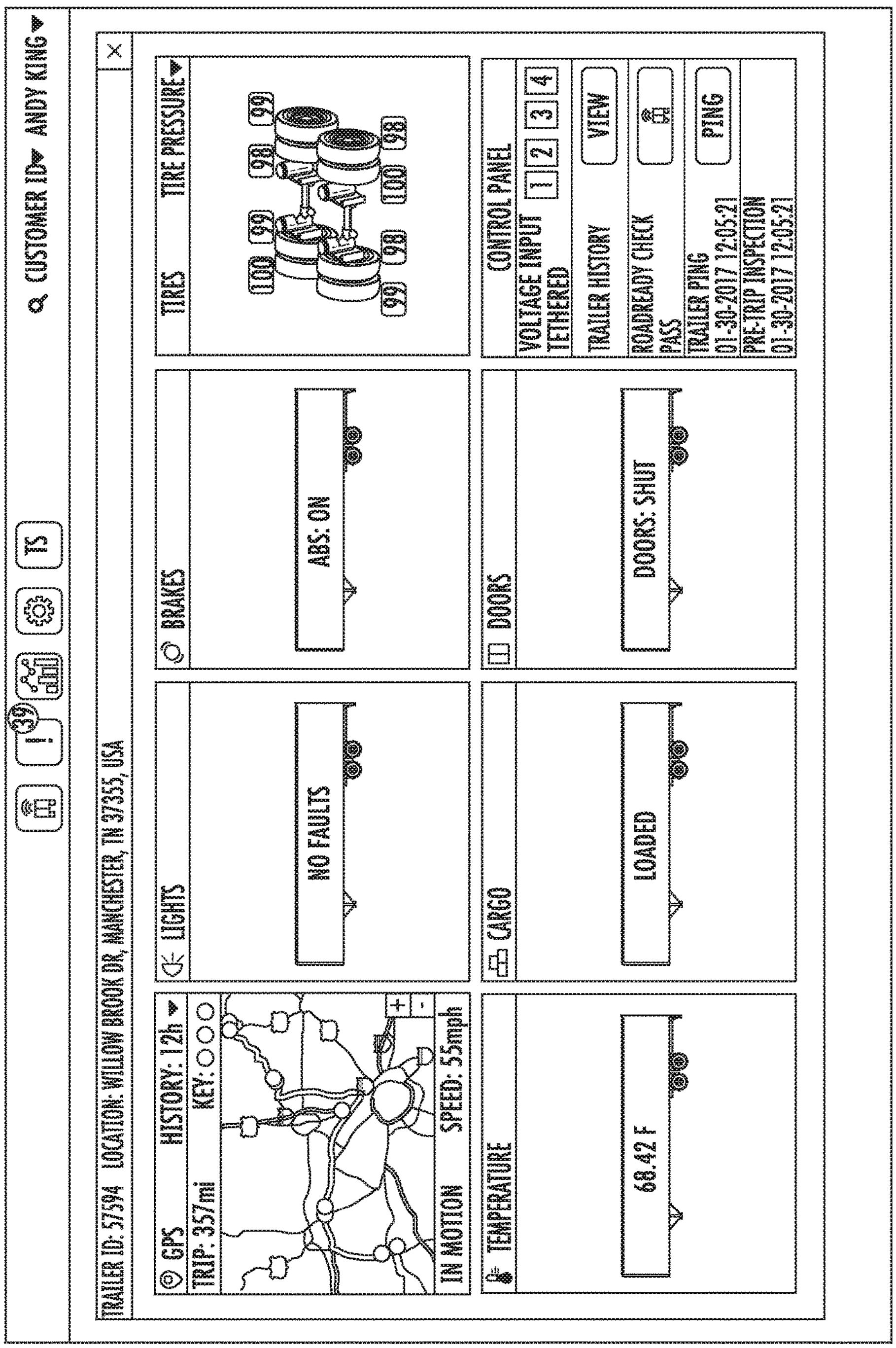
FIGS. 35 and 36 are additional screen shots of a user interface showing a tire pressure monitoring feature.
Figure 36:
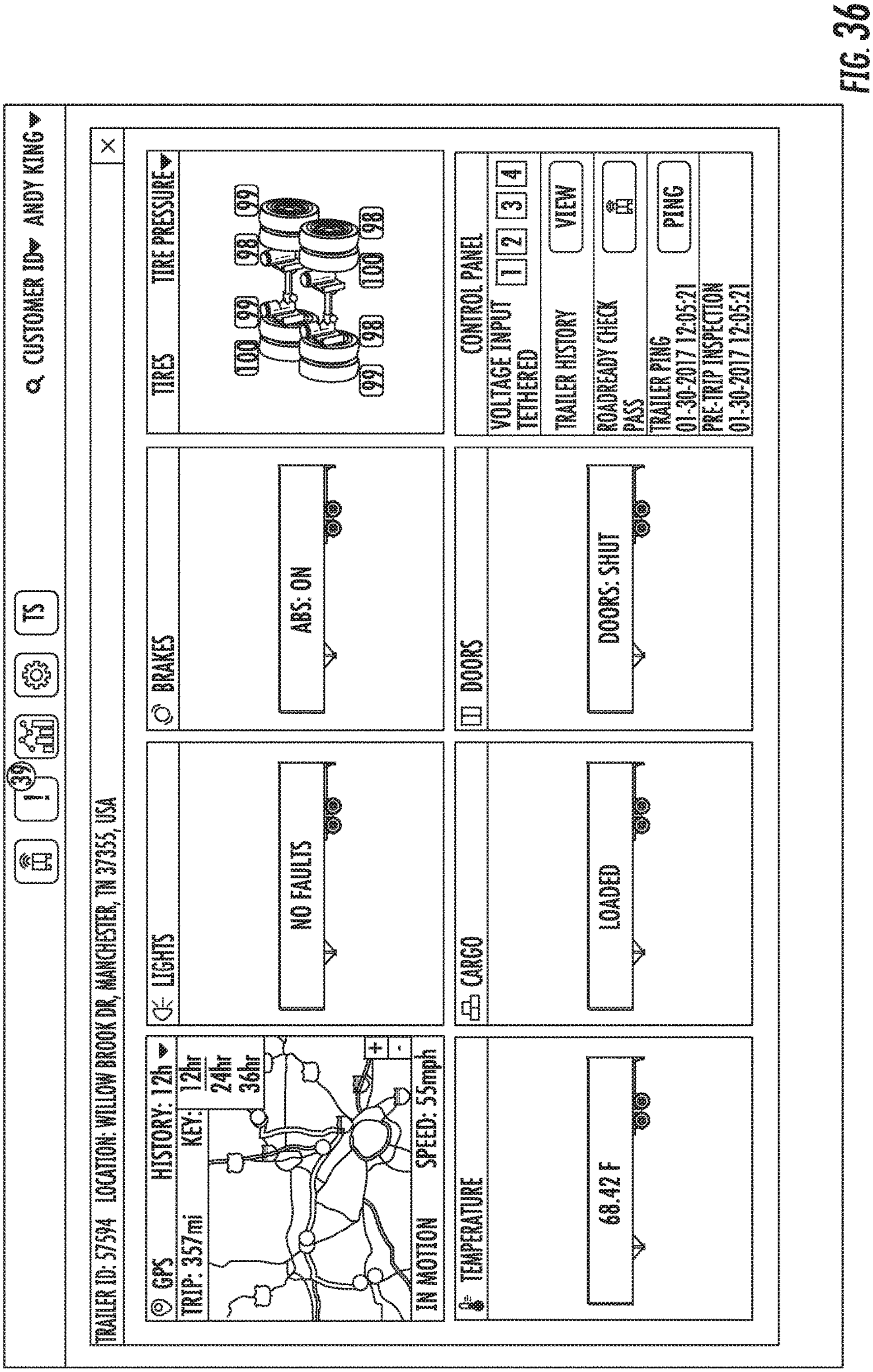

FIGS. 35 and 36 show how the "TIRES" pane can be toggled to utilize tire pressure monitoring (TPMS). This feature operates such that each individual tire pressure in psi can be displayed. In addition, tire pressure threshold can be set by fleet maintenance personnel. Tire pressure is reported in psi and operates from a Bluetooth sensor on the tire and is subsequently relayed to the SMART Bridge box. The "TIRES" panel can be toggled to the "Tire Inflation STEMCO (AERIS)" pane. The inflation system on the trailer will report the following information: no air flow, high air flow, or low air flow. Thresholds are set by fleet personnel to appropriate psi levels. This data represents a total air system feed. In particular, tire inflation is reported as one total psi for all tires, rather inflation data with respect to individual tires.

As before, a SMART Bridge Box mounted in the carriage of the trailer below the floor converts the data to a protocol that the MCU can utilize. Specifically, the STEMCO AERIS sensors report tire inflation data to the Smart Bridge Box wirelessly. Subsequently, the Smart Bridge Box reformats the data into code that is RF, so that the data can be sent to the MCU.

The "TIRES" pane can be toggled to access data related to hub mileage. In particular, the Stemco HubBat sensors will calculate the mileage data and send the data to the Smart Bridge Box. This function is similar to an odometer in a passenger car. That is, utilizing STEMCO HUB Bat sensors, data concerning hub mileage is reported to the Smart Bridge Box wirelessly. Subsequently, the data is reformatted into code that is RF, so that the data can be sent to the MCU.

Figure 37:
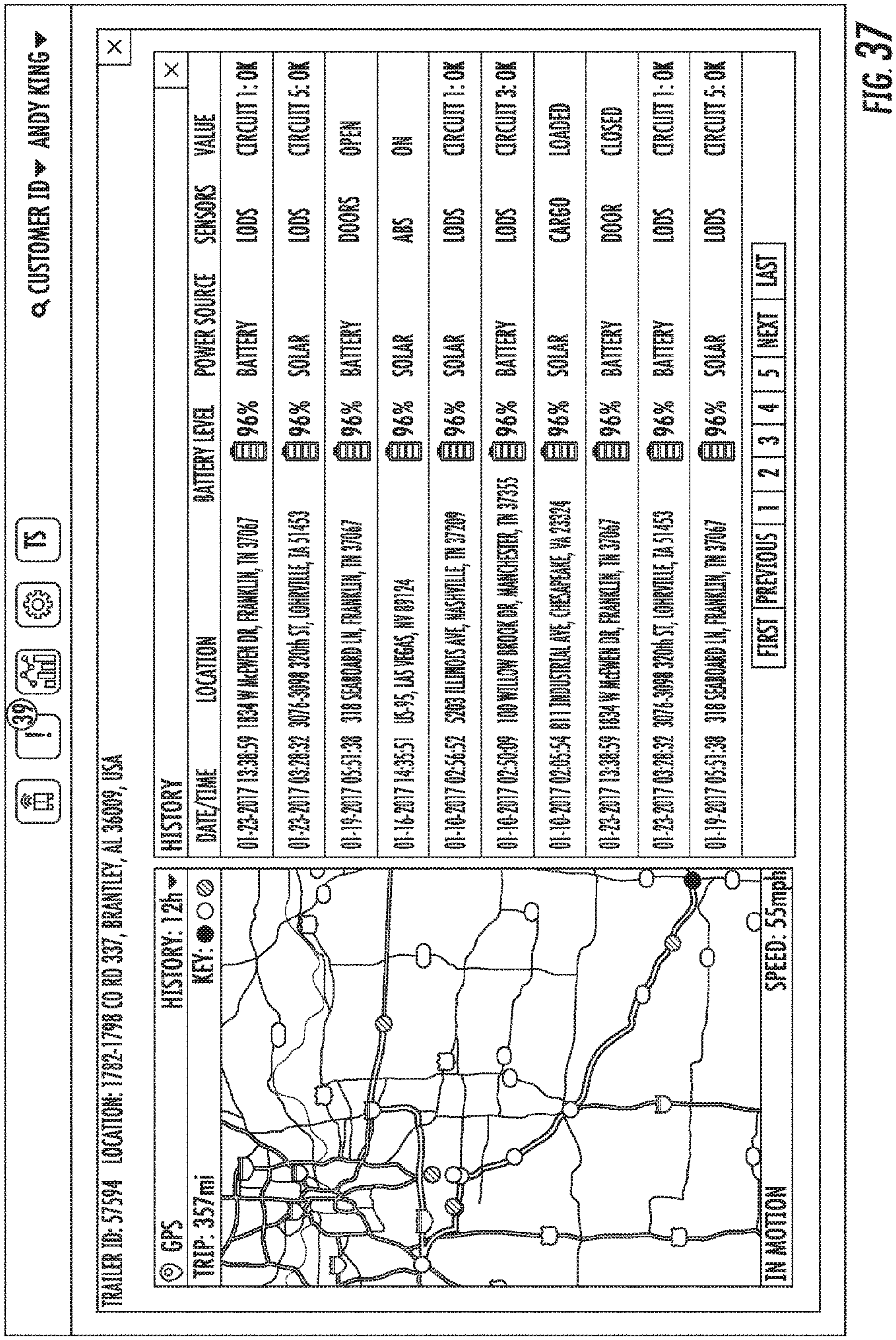
FIG. 37 is a screen shot illustrating showing additional detailed information about a trailer's diagnostic history over various time periods.

FIG. 36 is a screen shot showing the features of the Trailer History feature. In particular, data concerning trailer history may accessed at 12, 24, and 36-hour increments. A user may change a time setting by accessing the Control Panel at the Trailer History link. FIG. 37 shows how the user interface allows a user to access more detailed information about a trailer's diagnostic history over various time periods.

Figure 38:
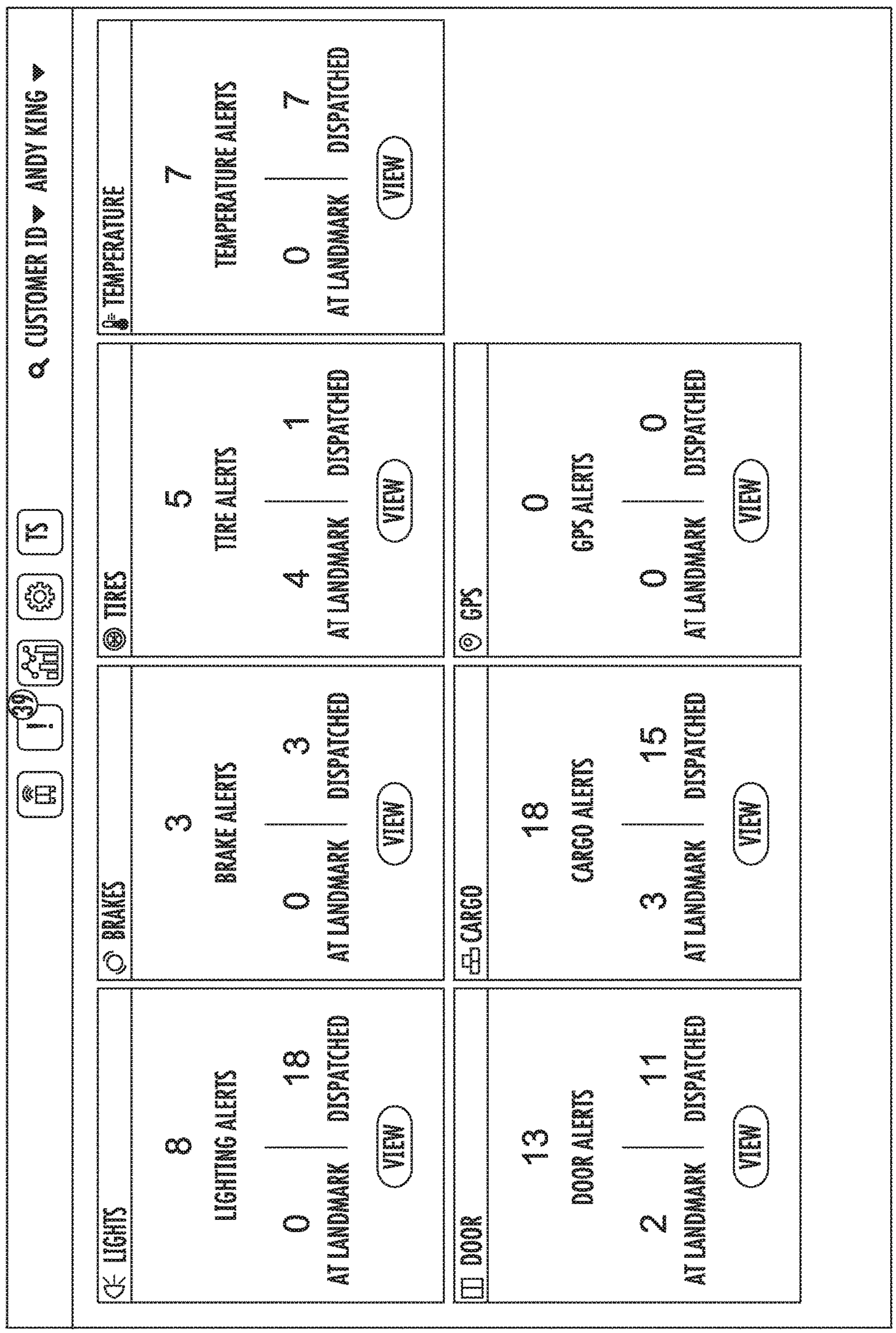
FIG. 38 is a screen shot illustrating alarm data for a particular set of trailers.

FIGS. 37 and 38 show the alarm screens. FIG. 37 is an overview screen for a particular set of trailers. FIG. 38 shows how the UI allows a user to access data concerning a particular alarm (in this case regarding lights via the light failure detection system) for a particular set of trailers. By clicking on an Alarm icon on the overview screens all alarm functions that are being monitored will be displayed including: GPS, lights, brakes, tire status, temperature, cargo, doors, and landmark data with dispatch information. The landmarks are the geofences (i.e. parking lots where trailers are parked). Dispatched trailers are trailers in the field and outside the geofence. Data counts refer to the number of trailers at a landmark/geofenced area and dispatched trailers are outside geofence.

The "GPS Alert" pane lists all alarms for GPS (i.e., non-reporting locations) and accounts for all trailers that are dispatched or at landmarks. The GPS Alarm function provides the user with the option to list all GPS alarms on one screen by a particular trailer, or, by segmented fleet. The UI provides data counts for trailers located at landmarks as well as dispatched trailers.

The "LIGHTING" Alert pane will report a light out in the event the light has been damaged, has failed electrically, or missing. It provides the circuit number that that is reporting the event. Information flows from the light failure detection system. Voltage and current are monitored in the firmware of the sensor. The LIGHTING Alert function provides a user with the option to list all light alarms on one screen by trailer, or by segmented fleet. In addition, a user may access failure mode of the lights by circuit location. The UI provides data counts for trailers located at landmarks as well as dispatched trailers.

The "BRAKES" Alert pane refers to the trailer's ABS brakes, and reports attribute data only (i.e., if the brakes system is functional or non-functional). It works off the same signal that turns the ABS light on or off on the trailer harness system. Information flows from the warning light sensors. The BRAKES Alert function provides the user with the option to list all ABS brake alarms on one screen by trailer, or by segmented fleet. This data is attribute data rather than variable, (i.e., ABS brake on or off). The UI provides data counts for trailers located at landmarks as well as dispatched trailers.

The "TEMPERATURE" Alert pane reports data from the temperature sensor, which senses the present inside temperature of the trailer. The temperature sensor utilizes a thermistor to report the temperature inside the trailer. There can be up to three temperature sensors per trailer. This function provides the user the option to list all temperature alarms on one screen by trailer, or by segmented fleet. Temperature can be set up as a threshold temperature range with HI and LO temperature set points. The UI provides data counts for trailers located at landmarks as well as dispatched trailers.

The "CARGO" Alert pane receives data from the cargo sensor, which senses the present inside cargo status inside the trailer. The CARGO sensor has a radar device that reports objects within a 5-ft. radius of a radar cone. This function provides the user the option to list all cargo alarms on one screen by trailer, or by segmented fleet. This is attribute data rather than variable, object detection under radar. The UI provides data counts for trailers located at landmarks as well as dispatched trailers.

The "DOORS" Alert pane highlights door sensor data by reporting the present status of the trailer doors. The sensor reports attribute data rather than variable (i.e., door open or door close only. This function provides a user the option to list all door open alarms on one screen by trailer, or by segmented fleet. The UI provides data counts for trailers located at landmarks as well as dispatched trailers.

The "TIRES" Alert pane will report several items including Tire Pressure (TPMS) and Tire Inflation alarms.

FIG. 38 shows how the "TIRES" Alert pane can be toggled to access tire pressure monitoring (TPMS). This feature operates such that each individual tire pressure in psi can be displayed. In addition, tire pressure threshold can be set up by the fleet maintenance personnel. Tire Pressure is reported in psi and operates from a Bluetooth sensor on the tire and is subsequently relayed to the SMART Bridge box. The view functionality of the Tire Alert screen gives the user the option to list all TPMS alarms on one screen by trailer or by segmented fleet. This is variable data with pressure in psi.

The "TIRES" Alert panel can also be toggled to the "Tire Inflation STEMCO (AERIS)" pane. The inflation system on the trailer will report the following information: no air flow, high air flow, or low air flow. Thresholds are set by the fleet to appropriate psi levels. This data represents a total air system feed. In particular, tire inflation is reported as one total psi for all tires rather inflation data with respect to individual tires. The view functionality of the Tire Alert screen gives the user the option to list all tire inflation alarms on one screen by trailer, or by segmented fleet. This is attribute data rather than variable. Thus, the Alert data will be provided to the user as tire inflation OFF, high pressure, or low pressure.

Figure 39:
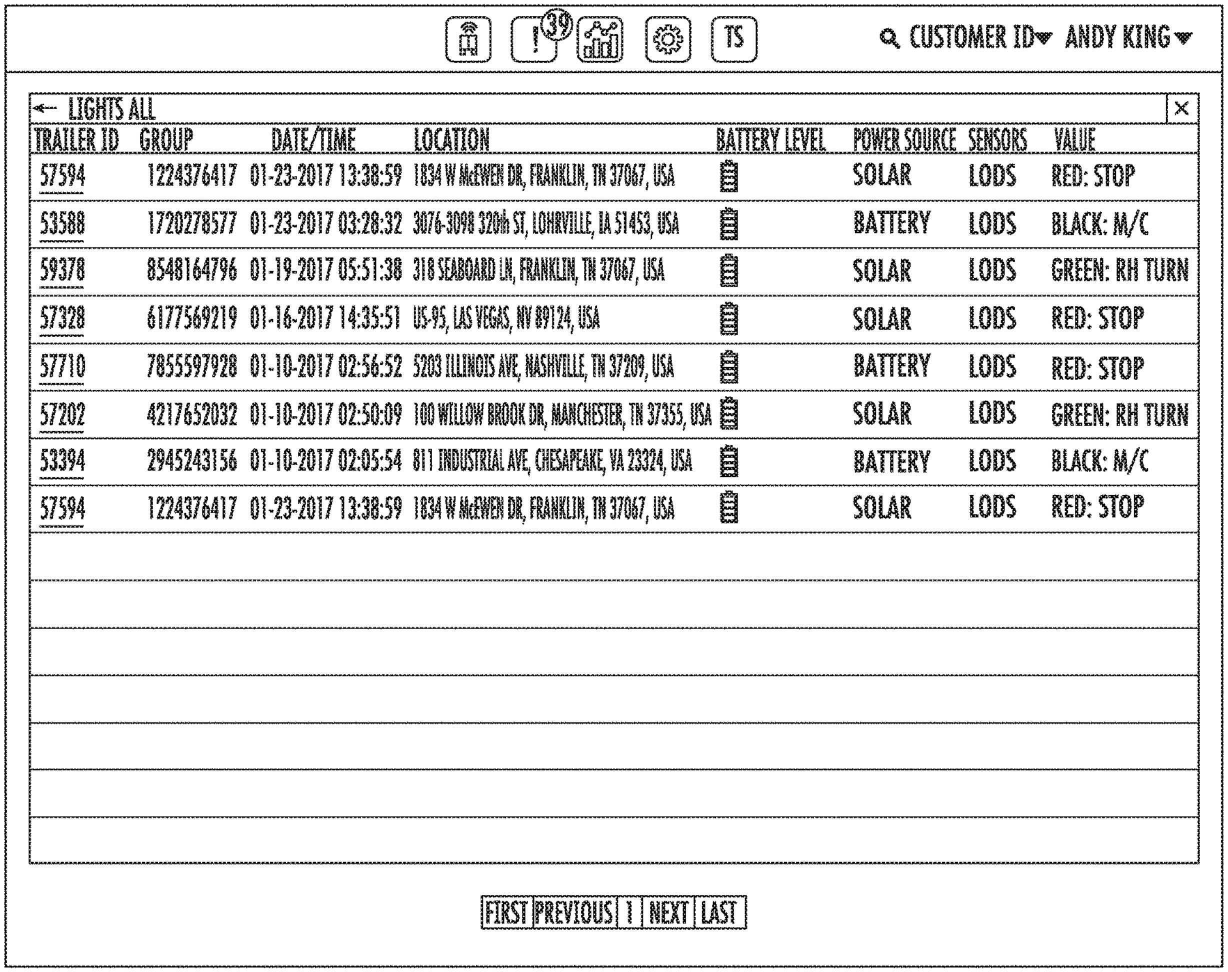
FIG. 39 is a screen shot illustrating the Lighting status from the light failure detection systems of various trailers.

FIG. 39 illustrates the Lighting status from the light failure detection systems of various trailers. The trailer ID, group number, date, time, location, battery level, battery type, sensor type and circuits affected are listed.

Figure 40:
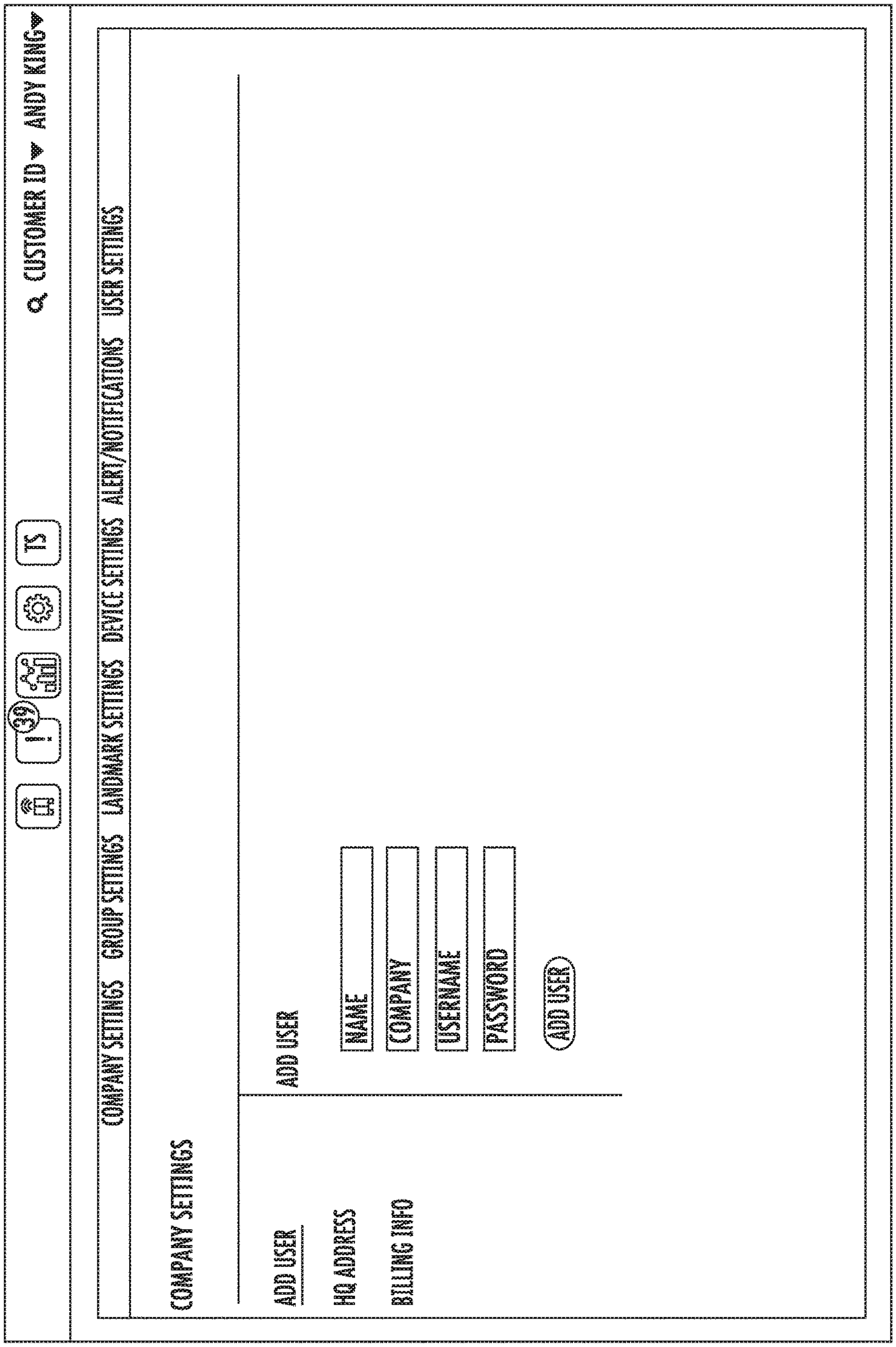
FIG. 40 is a screen shot of a settings screen that allows users to program settings according to company group, or user preferences, or according to landmark, device, or Alert Notifications.
Figure 41:
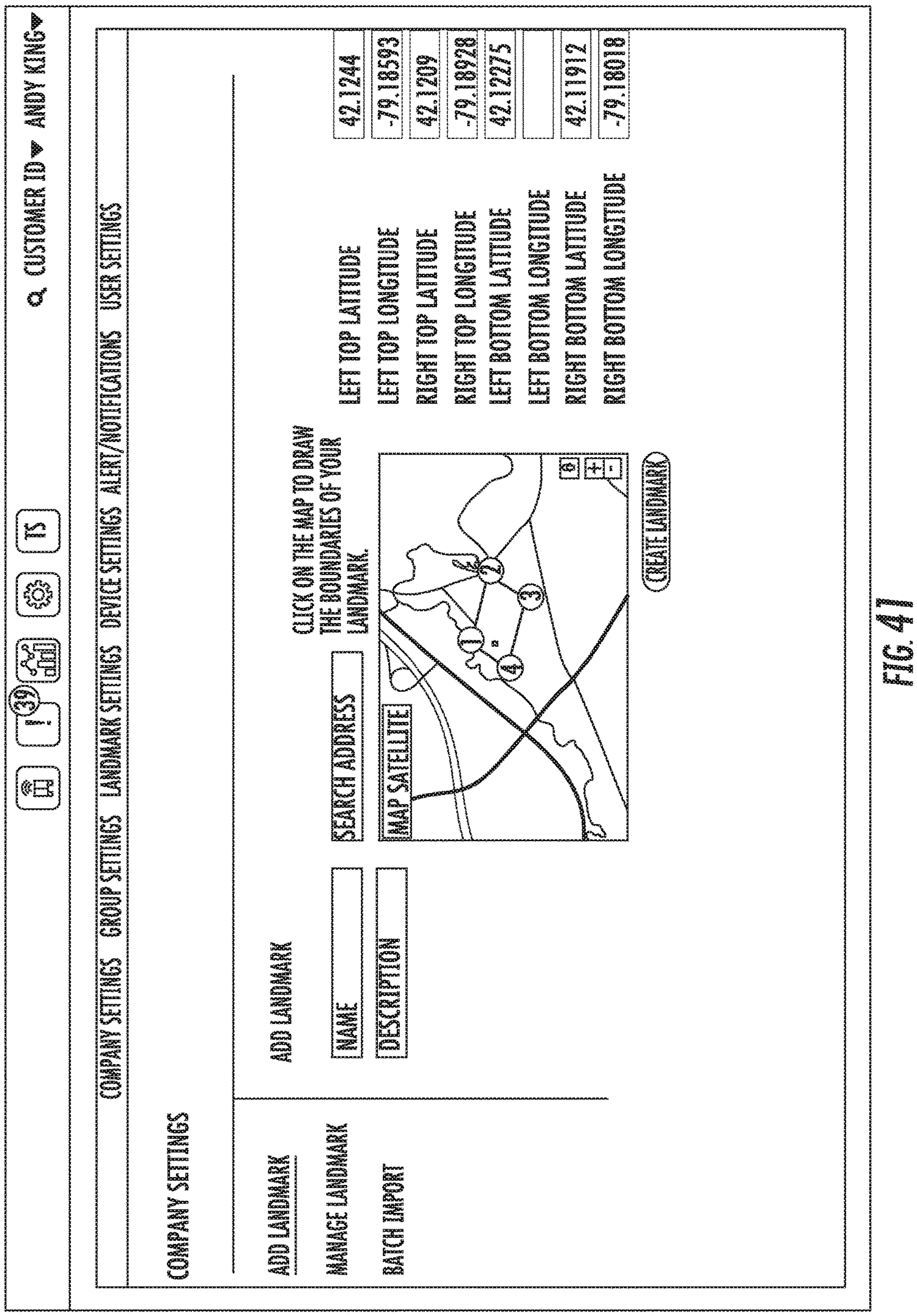
FIG. 41 is a screen shot showing landmark settings showing how landmark settings can be created as well as the management thereof.

FIG. 40 is a settings screen that allows users to program settings according to company group, or user preferences, or according to landmark, device, or Alert Notifications. FIG. 41 is a screen shot showing landmark settings showing how landmark settings can be created as well as the management thereof. The Device Settings allows a user to select the device that is installed on the trailer and to assess and set the threshold limits of the sensory device. With respect to Alerts, the ability to set the alert notifications set points is also provided. Landmarks are created by using the search address field and mapping the landmarks by clicking on the property boundaries. The user then names the landmark with a description and populates the geo-fence coordinates. Managing landmarks entails accessing a list of landmarks that are saved by company. These landmarks can be deleted, added to, or edited.

Setting the threshold limits by user is also possible. This feature is used for variable data sensory devices such as temperature, tire pressure, light failure detection voltage, and tire inflation.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system for monitoring a trailer having a plurality of light emitting diode lighting devices, said system comprising:

a master control unit attached to an outside surface of the trailer, said master control unit including:

a solar panel;

a GPS receiver module for generating trailer location data;

a cellular data transceiver module for communicating with a central tracking computer via a cellular data network interfaced to the Internet;

a local wireless network master transceiver module in wireless communication with a plurality of wireless sensors and a light failure detection system; and a transceiver module microcontroller for controlling said local wireless network master transceiver module to periodically obtain sensor data from said plurality of wireless sensors and said light failure detection system, and for controlling said cellular data transceiver module to transmit said location data and said sensor data;

a remote user interface for receiving and displaying said location data and said sensor data: and wherein said light failure detection system is coupled to the plurality of light emitting diode lighting devices and includes;

a plurality of lighting circuits, each lighting circuit being coupled to a circuit board by an input wire, a plurality of voltage level monitoring circuits on said circuit board, each one of said plurality of voltage level monitoring circuits connected to one of said lighting circuits and adapted to measure the voltage of the one of said light circuits;

a plurality of current monitoring circuits on said circuit board, each one of said plurality of current monitoring circuits connected to one of said lighting circuits and adapted to measure a current draw of the one of said light circuits;

a voltage drop circuit for enabling the plurality of voltage level monitoring circuits and the plurality of current monitoring circuits to measure current and voltage at an adjusted input voltage;

a temperature sensor for sensing a temperature, a switch for placing the light failure detection system into a learn mode;

wherein said lighting circuits are monitored with the plurality of voltage level monitoring circuits and the plurality of current monitoring circuits to determine threshold voltage and current levels for the lighting circuits;

a light out detection microcontroller coupled to the circuit board for storing the threshold voltage and current levels and the temperature sensed by the temperature sensor, said light out detection microcontroller being adapted to calculate an adjusted threshold current based on a voltage sensitivity and the sensed temperature;

a fault indicator for indicating a status of the light failure detection system if a measured current is above or below the adjusted threshold current by a predetermined value; and a transceiver coupled to the circuit board for sending information to said master control unit; and a housing coupled to said trailer at one end thereof and a socket at a second end of said trailer for coupling to a truck tractor with a wiring harness.

2. The system for monitoring a trailer of claim 1 further comprising, an ABS sensor and ABS fault lamp, wherein said fault lamp illuminates when said ABS sensor detects an ABS brake is malfunctioning.

3. The system for monitoring a trailer of claim 2, further comprising an ABS monitoring sensor for monitoring the ABS fault lamp, said ABS monitoring sensor detecting whether said ABS fault lamp illuminates.

4. The system for monitoring a trailer of claim 3, further including a Bluetooth tire pressure sensor coupled to a tire mounted on the trailer, wherein the Bluetooth tire pressure sensor collects tire pressure data and transmits the tire pressure data in psi via Bluetooth to a smart bridge unit.

5. The system for monitoring a trailer of claim 4, wherein tire pressure data from the tire pressure sensor is displayed at said user interface.

6. The system for monitoring a trailer of claim 5, wherein the smart bridge unit converts tire pressure data transmitted from the tire pressure sensor to a protocol compatible with the master control unit.

7. The system for monitoring a trailer of claim 1, wherein said user interface displays location data of an individual trailer or fleet of trailers via said GPS receiver module located on said trailer.

8. The system for monitoring a trailer of claim 7, wherein said user interface is adapted to zoom into a particular geo area on a map in order to obtain data related to individual trailer.

9. The system for monitoring a trailer of claim 7, wherein said user interface displays sensory data information for the individual trailer or for each trailer in the fleet of trailers including battery level, power source, light failure detection, door, ABS brake, cargo sensors, trailer air inflation, and tire pressure.

10. The system for monitoring a trailer of claim 9, wherein said user interface comprises a hover-over function allowing a user to click on a particular location on said map and receive information for a specific trailer ID.

11. The system for monitoring a trailer of claim 10, wherein the over-over functionality provides statistical data of a trailer in order for a user to monitor and compare specific data of said trailer over time.

12. The system for monitoring a trailer of claim 7, wherein said user interface provides a status report of each trailer, as listed in the map, including event alert data, event time, GPS location, idle time for a particular time period, nearby landmarks if any, nearby roads, and the ready status of said trailer.

13. The system for monitoring a trailer of claim 12, wherein said ready status of the trailer refers to the ability of a user to "ping" the trailer from a remote location in order to obtain a report reflecting subsequent testing of all the sensors on said trailer.

14. A system for monitoring a trailer having a plurality of light emitting diode devices including a light failure detection system having a plurality of lighting circuits, each lighting circuit being coupled to a circuit board by an input wire, a plurality of voltage level monitoring circuits on said circuit board for measuring measure a voltage of the one of said light circuits, a plurality of current monitoring circuits on said circuit board for to measure a current draw of the one of said light circuits, a voltage drop circuit for enabling the plurality of voltage level monitoring circuits and the plurality of current monitoring circuits to measure current and voltage at an adjusted input voltage, a temperature sensor for sensing a temperature, and a switch for placing the light failure detection system into a learn mode, wherein said lighting circuits are monitored with the plurality of voltage level monitoring circuits and the plurality of current monitoring circuits to determine threshold voltage and current levels for the lighting circuits, a light out detection microcontroller coupled to the circuit board for storing the threshold voltage and current levels and the temperature sensed by the temperature sensor, said light out detection microcontroller being adapted to calculate an adjusted threshold current based on a voltage sensitivity and the sensed temperature, and a fault indicator for indicating a status of the light failure detection system if a measured current is above or below the adjusted threshold current by a predetermined value, and a transceiver, said system for monitoring a trailer comprising:

a master control unit attached to an outside surface of the trailer, said master control unit including:

a solar panel;

a GPS receiver module for generating trailer location data;

a cellular data transceiver module for communicating with a central tracking computer via a cellular data network interfaced to the Internet;

a local wireless network master transceiver module in wireless communication with a plurality of wireless sensors and a light failure detection system; and a transceiver module microcontroller for controlling said local wireless network master transceiver module to periodically obtain sensor data from said plurality of wireless sensors and said light failure detection system, and for controlling said cellular data transceiver module to transmit said trailer location data and said sensor data;

a remote user interface for receiving and displaying said location data, sensor data and light failure detection data.

* * * * *